US009863567B2

(12) United States Patent
Lehmann et al.

(10) Patent No.: US 9,863,567 B2
(45) Date of Patent: Jan. 9, 2018

(54) QUICK CONNECT AND QUICK DISCONNECT SYSTEM AND METHOD OF MANIPULATING A QUICK CONNECT AND QUICK DISCONNECT SYSTEM

(71) Applicant: Fiskars Oyj Abp, Helsinki (FI)

(72) Inventors: Charles A. Lehmann, Metamora, IL (US); Lawrence P. Heren, East Peoria, IL (US); Robert R. Brimble, Edwards, IL (US)

(73) Assignee: Fiskars Oyj Abp, Helsinki (FI)

( * ) Notice: Subject to any disclaimer, the term of this patent is extended or adjusted under 35 U.S.C. 154(b) by 929 days.

(21) Appl. No.: 13/924,430

(22) Filed: Jun. 21, 2013

(65) Prior Publication Data
US 2014/0001745 A1 Jan. 2, 2014

Related U.S. Application Data

(60) Provisional application No. 61/662,559, filed on Jun. 21, 2012, provisional application No. 61/730,611, (Continued)

(51) Int. Cl.
*F16L 37/22* (2006.01)
*F16L 37/24* (2006.01)
(Continued)

(52) U.S. Cl.
CPC ............ *F16L 37/22* (2013.01); *F16L 37/107* (2013.01); *F16L 37/113* (2013.01); *F16L 37/24* (2013.01);
(Continued)

(58) Field of Classification Search
CPC ..... F16L 37/107; F16L 37/113; F16L 37/248; F16L 37/252; F16L 37/22; F16L 37/24; F16L 37/42
See application file for complete search history.

(56) References Cited

U.S. PATENT DOCUMENTS 643,358 A  2/1900 Konold
796,306 A  8/1905 Exley
(Continued)

FOREIGN PATENT DOCUMENTS

DE  5 08 311   9/1930
DE  5 87 085  10/1933
(Continued)

OTHER PUBLICATIONS

U.S. Office Action, U.S. Appl. No. 13/924,442, 13 pages (dated Sep. 21, 2015).
(Continued)

*Primary Examiner* — James M Hewitt, II
(74) *Attorney, Agent, or Firm* — Foley & Lardner LLP

(57) ABSTRACT

A quick connect/disconnect system includes a male connector and a female connector. The male connector includes a first body having a fixed male protrusion and a first rotating ring assembly rotatably connected to the first body. The female connector includes a first coupling channel including a mouth configured to receive the fixed male protrusion and extending from the mouth toward a seat portion, a shuttle movable within the first coupling channel and including a flange configured to form a seal with the seat portion, and an extending portion extending within the first coupling channel and a biasing member configured to bias the flange into sealing contact with the seat portion such that rotation of the first rotating ring assembly in a first direction forces the fixed male protrusion to move axially into contact with the extending portion thereby moving the shuttle to force the flange away from the seat portion.

14 Claims, 45 Drawing Sheets

Related U.S. Application Data filed on Nov. 28, 2012, provisional application No. 61/790,045, filed on Mar. 15, 2013, provisional application No. 61/790,451, filed on Mar. 15, 2013.

(51) Int. Cl.

| | | |
|---|---|---|
| *F16L 37/252* | (2006.01) | |
| *F16L 37/107* | (2006.01) | |
| *F16L 37/248* | (2006.01) | |
| *F16L 37/113* | (2006.01) | |
| *F16L 37/42* | (2006.01) | |
| *B05B 9/01* | (2006.01) | |

(52) U.S. Cl.
 CPC .......... *F16L 37/248* (2013.01); *F16L 37/252* (2013.01); *F16L 37/42* (2013.01); *B05B 9/01* (2013.01); *Y10T 29/49826* (2015.01); *Y10T 29/49948* (2015.01)

(56) References Cited

U.S. PATENT DOCUMENTS

| | | | |
|---|---|---|---|
| 939,211 | A | 11/1909 | Brown |
| 1,181,060 | A | 4/1916 | Bennett |
| 1,813,581 | A | 7/1931 | Rodrigues |
| 1,845,882 | A | 2/1932 | Litschge |
| 1,885,321 | A | 11/1932 | Benn |
| 1,968,075 | A | 7/1934 | Ewald |
| 2,129,704 | A | 9/1938 | Meyer |
| 2,248,701 | A | 7/1941 | Fowler |
| 2,265,267 | A | 12/1941 | Cowles |
| 2,305,841 | A | 12/1942 | Carlson |
| 2,393,489 | A | 1/1946 | Trautman |
| 2,457,251 | A | 12/1948 | Main, Jr. |
| 2,459,477 | A | 1/1949 | Van Schuyver |
| 2,598,009 | A | 5/1952 | Peeps |
| 2,843,401 | A | 7/1958 | Rogers |
| 2,968,497 | A | 1/1961 | Treleman |
| 3,028,179 | A | 4/1962 | Abramoska |
| 3,100,655 | A | 8/1963 | Work |
| 3,477,688 | A | 11/1969 | Cruse |
| 3,625,251 | A | 12/1971 | Nelson |
| 3,649,052 | A | 3/1972 | Snyder, Jr. |
| 3,650,507 | A | 3/1972 | Nyberg |
| 3,719,918 | A | 3/1973 | Kerr |
| 2,319,015 | A | 5/1973 | Speth |
| 3,961,645 | A | 6/1976 | Kagan |
| 4,290,440 | A | 9/1981 | Sturgis |
| 4,327,770 | A | 5/1982 | Brown et al. |
| 4,332,273 | A | 6/1982 | Boyce |
| 4,366,945 | A | 1/1983 | Blauenstein |
| 4,632,433 | A | 12/1986 | Kimura |
| 4,893,846 | A | 1/1990 | McGraw |
| 4,932,431 | A | 6/1990 | Silagy |
| 5,009,252 | A | 4/1991 | Faughn |
| 5,087,086 | A | 2/1992 | Snedeker |
| 5,143,346 | A | 9/1992 | Chen |
| 5,190,224 | A | 3/1993 | Hamilton |
| 5,255,714 | A | 10/1993 | Mullins |
| 5,280,876 | A | 1/1994 | Atkins |
| 5,285,510 | A | 2/1994 | Slaney |
| 5,485,982 | A | 1/1996 | Gunderson |
| 5,560,548 | A | 10/1996 | Mueller et al. |
| 5,738,143 | A | 4/1998 | Faughn |
| 5,992,895 | A | 11/1999 | Steinkamp |
| 6,029,701 | A | 2/2000 | Chaffardon et al. |
| 6,050,544 | A | 4/2000 | Meronek |
| 6,095,572 | A | 8/2000 | Ford et al. |
| 6,106,026 | A | 8/2000 | Smith, III |
| 6,158,717 | A | 12/2000 | Van Scyoc et al. |
| 6,217,080 | B1 | 4/2001 | Imai |
| 6,354,564 | B1 | 3/2002 | Van Scyoc et al. |
| 6,464,260 | B1 | 10/2002 | Barrier |
| 6,497,435 | B1 | 12/2002 | Luft et al. |
| 6,511,098 | B1 | 1/2003 | Luterstein |
| 6,691,978 | B1 | 2/2004 | Bartos et al. |
| 6,786,131 | B2 | 9/2004 | Tsai |
| 6,866,243 | B2 | 3/2005 | Yang |
| 6,877,778 | B2 | 4/2005 | Froment et al. |
| 6,905,151 | B2 | 6/2005 | Froment et al. |
| 7,401,626 | B1 | 7/2008 | Plattner |
| 7,469,718 | B2 | 12/2008 | Lambert et al. |
| 7,658,420 | B2 | 2/2010 | Harger et al. |
| 8,191,932 | B2 | 6/2012 | Davis |
| 8,439,593 | B2 | 5/2013 | Slater et al. |
| 8,899,550 | B2 | 12/2014 | Tiberghien et al. |
| 2003/0085572 | A1 | 5/2003 | Froment et al. |
| 2004/0251685 | A1 | 12/2004 | Nicolino |
| 2005/0022883 | A1 | 2/2005 | Adams et al. |
| 2005/0109406 | A1 | 5/2005 | Marban et al. |
| 2005/0212289 | A1 | 9/2005 | Weh et al. |
| 2007/0025811 | A1 | 2/2007 | Wilhelm |
| 2007/0236005 | A1 | 10/2007 | Chang |
| 2007/0252101 | A1 | 11/2007 | Khaitov |
| 2011/0030825 | A1 | 2/2011 | Tivelli |
| 2012/0209057 | A1 | 8/2012 | Siess et al. |
| 2013/0320668 | A1 | 12/2013 | Cheon et al. |
| 2013/0327420 | A1 | 12/2013 | Liu |
| 2013/0333767 | A1 | 12/2013 | Schmidt |
| 2014/0001745 | A1 | 1/2014 | Lehmann et al. |

FOREIGN PATENT DOCUMENTS

| | | |
|---|---|---|
| DE | 8 53 994 | 10/1952 |
| DE | 20 50 868 A1 | 6/1972 |
| DE | 1020050 27 297 | 9/2006 |
| FR | 991 346 A | 10/1951 |
| FR | 60 849 E | 1/1955 |
| FR | 1238862 | 8/1960 |
| GB | 0 425 141 | 3/1935 |
| GB | 0 771 968 A | 4/1957 |
| GB | 2 069 083 | 8/1981 |
| GB | 2 093 547 A | 9/1982 |
| WO | WO-94/12826 | 6/1994 |

OTHER PUBLICATIONS

English-language machine translation of DE 10 2005 027 297, Johann Krause Maschinenfabrik GmbH (Sep. 7, 2006).

English-language machine translation of FR 1238862, F.C. Schulz (Aug. 19, 1960).

English-language machine translation of DE 508311, Kurt Dzialoszynski (Sep. 27, 1930).

English-language machine translation of DE 587085, Ernst Hartmetz (Oct. 30, 1933).

English-language machine translation of DE 853994, Chiron Werke GmbH (Oct. 30, 1952).

U.S. Office Action, U.S. Appl. No. 13/924,455, 4 pages (dated Sep. 30, 2015).

International Search Report and Written Opinion corresponding to PCT Application No. PCT/US2013/047188, dated Aug. 28, 2013 (13 pages).

Office Action, U.S. Appl. No. 13/924,445, 11 pages (dated Mar. 7, 2016).

Office Action, U.S. Appl. No. 13/924,455, 8 pages (dated May 13, 2016).

English-language machine translation of DE 20 50 868, Mueanyagfel Dolgozo Vall (Jun. 8, 1972).

International Preliminary Report on Patentability for PCT Application No. PCT/US2013/047188, dated Dec. 23, 2014, 8 pages.

Non-Final Office Action, U.S. Appl. No. 13/924,449, 12 pages (dated Jun. 2, 2016).

Non-Final Office Action on U.S. Appl. No. 13/924,455 dated Mar. 26, 2015, 11 pages.

Office Action, U.S. Appl. No. 14/210,758, 14 pages (dated Jun. 30, 2016).

Office Action, U.S. Appl. No. 13/924,461, 17 pages (dated Jun. 16, 2016).

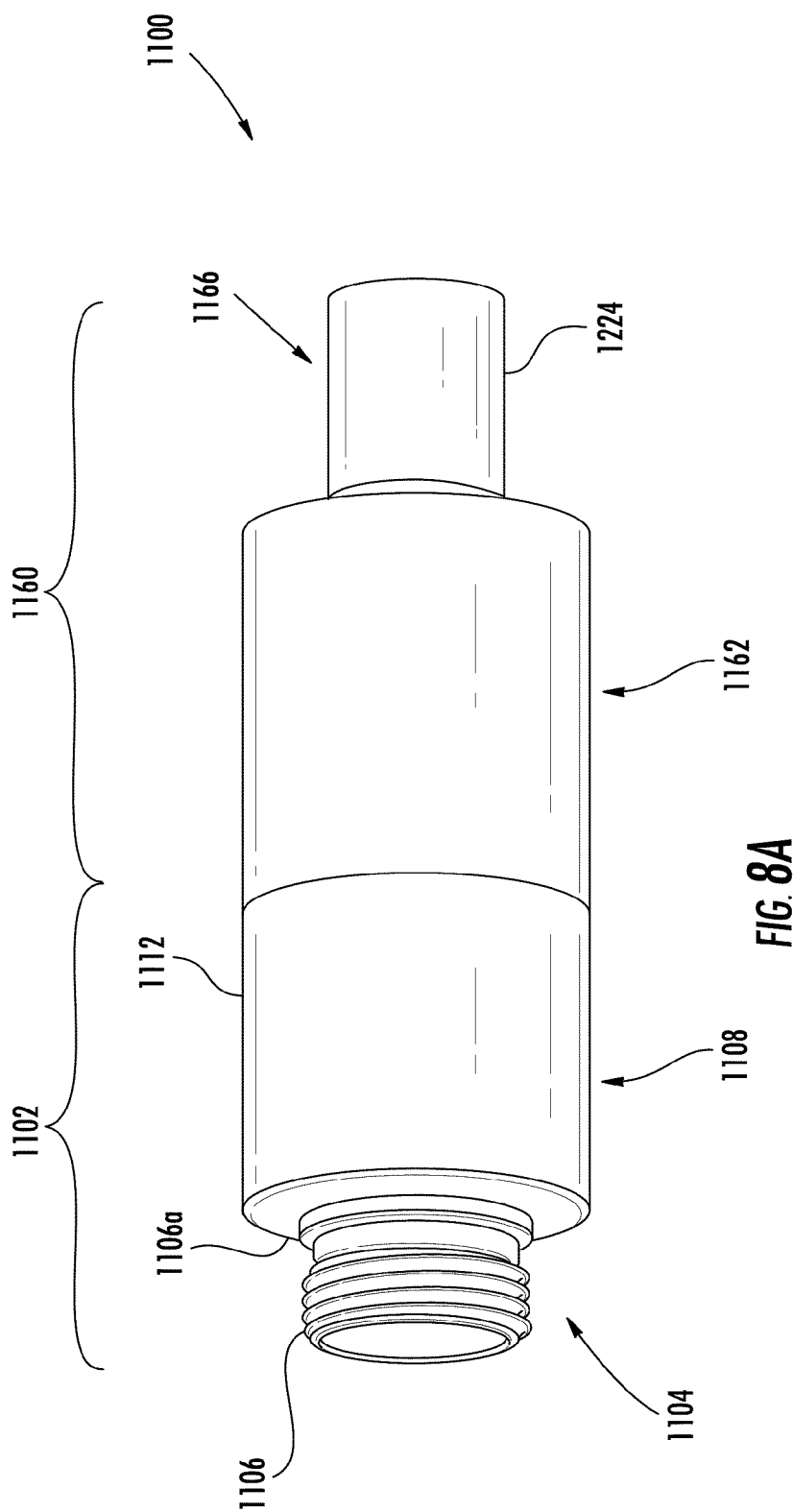

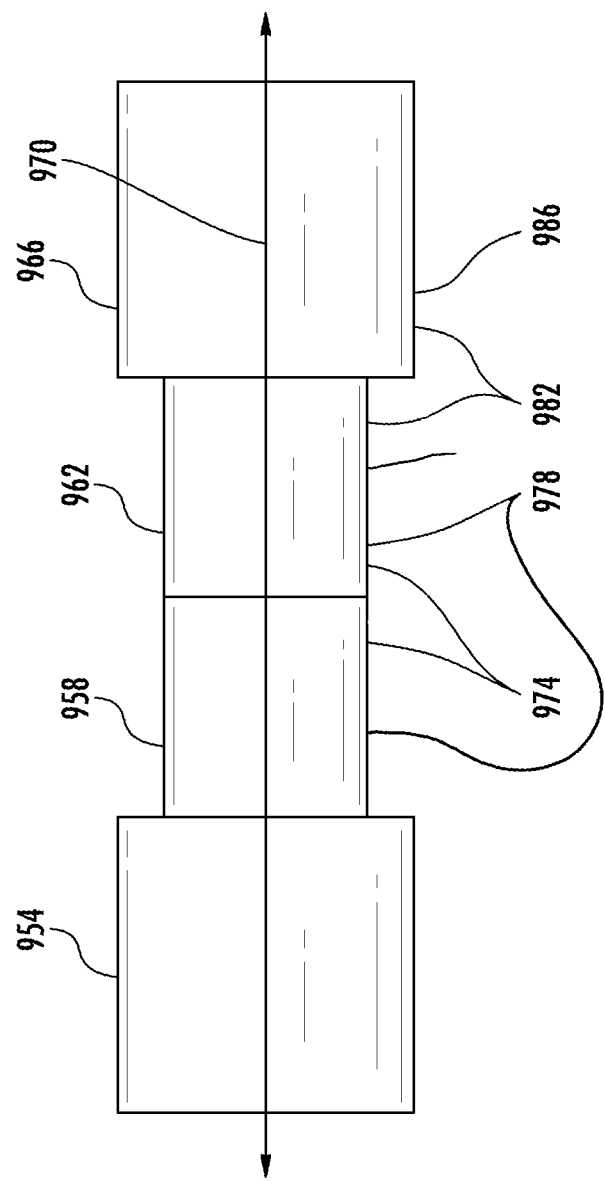

QUICK CONNECT AND QUICK DISCONNECT SYSTEM AND METHOD OF MANIPULATING A QUICK CONNECT AND QUICK DISCONNECT SYSTEM

This application claims the benefit of priority of U.S. provisional application Ser. No. 61/662,559, filed Jun. 21, 2012, U.S. provisional application Ser. No. 61/730,611, filed Nov. 28, 2012, U.S. provisional application Ser. No. 61/790,045, filed Mar. 15, 2013, and U.S. provisional application Ser. No. 61/790,451, filed Mar. 15, 2013 the disclosures which are herein incorporated by reference in its entireties.

FIELD

This disclosure relates generally to connectors for fluid systems and vessels and more particularly to connectors for fluid systems that are quickly connectable and quickly disconnectable from each other.

BACKGROUND

Quick connect and quick disconnect systems, also referred to as coupler systems, are widely utilized in wide variety of industrial, household, medical, hydraulic, pneumatic, and commercial applications. One application for coupler systems are for garden and lawn use. Another application for coupler systems is for automotive nozzles and hoses for fuel delivery, such as gasoline and other petroleum-based products. Yet another application for coupler systems is for vacuum cleaners, power tools, or other devices for collecting debris or dispensing fluid. Fluids, such as beverages, fuels, liquid chemicals, fluid food products, gases, water, and air are also frequently delivered from one vessel to another through a fluid system.

Coupler systems typically include a first connector and a second connector. The first connector is typically associated with a fluid device and the second connector is typically associated with a fluid conductor. For example, a coupler system is configured for use with a fluid device provided as a water spray nozzle and a fluid conductor provided as a hose. The first connector is connected to the spray nozzle and the second connector is connected to the hose. The coupler system simplifies connecting and disconnecting the spray nozzle from the hose, as described below, with reference to a typical connection of a spray nozzle to a hose.

The typical hose includes an internally threaded end portion that is connected to a spigot and an opposite externally threaded end portion to which fluid devices are connectable. To connect a typical spray nozzle to the externally threaded end portion, first the user stops the flow of water through the hose. Next, the user aligns connection threads of the spray nozzle with threads of the externally threaded end portion of the hose. Then the user repeatedly rotates the spray nozzle relative to the hose to mechanically and to fluidly connect the spray nozzle to the hose. Some users require a separate hand tool, such as a wrench, to rotate the spray nozzle or to stabilize the hose during the rotation of the spray nozzle. Hoses available in Europe typically do not require a threaded feature or a barb feature. Instead, the connector is mechanically connected to the hose or the fluid system using a compression fitting method. Of course, other forms of fittings are possible.

The above described process is inconvenient since the supply of water through the hose is stopped before connection of the spray nozzle is made. Second, the process requires sufficient strength and dexterity to rotate the spray nozzle. Third, the connection of the spray nozzle to the hose is subject to leaking.

Coupler systems seek to simplify the above described process by making connection of the spray nozzle to the hose fast and easy. Coupler systems typically include a male connector and a female connector one of which includes a locking feature. To connect the connectors, the male connector is received by the female connector and the locking feature is engaged. To disconnect the connectors, the locking feature is disengaged and the male connector is separated from the female connector. The structure of the male connector and the female connector, as well as the method of operating the locking feature, varies between different models of coupler systems.

Even though coupler systems seek to simplify connection of a fluid device to a fluid conductor, coupler systems typically suffer from numerous problems. First, some coupler systems include a locking feature that is difficult disengage, especially when the fluid in the fluid conductor is under pressure. For example, conventional quick connector products having a shut off feature require significant force to overcome line pressure, thus becoming an issue to the user using the product. Second, some coupler systems are quick to connect and to disconnect, but are prone to leaking. Third, some coupler systems are expensive and time consuming to manufacture. Accordingly, the time savings provided by some coupler systems are at a cost of being difficult to disengage, leaky, and expensive.

For at least the above-described reasons, further developments in the area of quick connect and quick disconnect systems for fluid systems are desirable.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

According to one exemplary embodiment of the disclosure a quick connect/disconnect system includes a first connecting member and a second connecting member. The first connecting member includes (i) a first body defining a first fluid channel therethrough, the first body having a first coupling portion at a first end portion and a second coupling portion at a second end portion, and (ii) a first ring assembly fixedly connected to the first body, the first ring assembly extending about the second end portion and including a first mating feature on an internal surface of the ring assembly. The second connecting member includes (i) a third end portion defining a third coupling portion with a second fluid channel, (ii) a fourth end portion defining a fourth coupling portion configured to couple with the second coupling portion, and (iii) a second mating feature on an external surface of the fourth end portion configured to rotatably engage the first mating feature, such that when the fourth coupling portion is coupled with the second coupling portion and the second mating feature is mated with the first mating feature, the first fluid channel is in fluid communication with the second fluid channel.

According to another exemplary embodiment of the disclosure a method of manipulating a quick connect/disconnect system includes connecting a first coupling portion of a first connecting member to a fluid conductor, inserting a second coupling portion of the first connecting member within a third coupling portion of a second connecting member and inserting the third coupling portion within a ring assembly which is fixedly positioned with respect to the first coupling portion. The method further includes engaging a mating feature on an external surface of the third coupling portion with a mating feature on an internal surface of the ring assembly, rotating the ring assembly about the third coupling portion while the first mating feature is engaged with the second mating feature, and forcing the second coupling portion to move further within the third coupling portion by rotation of the ring assembly.

A quick connect/disconnect system including a first connecting member and a second connecting member. The first connecting member includes (i) a first body defining a first fluid channel therethrough, the first body having a first coupling portion at a first end portion and a second coupling portion at a second end portion, and (ii) a first ring assembly fixedly connected to the first body, the first ring assembly extending about the second end portion and including a first mating feature on an internal surface of the ring assembly. The second connecting member including (i) a third end portion defining a third coupling portion with a second fluid channel, (ii) a fourth end portion defining a fourth coupling portion configured to couple with the second coupling portion, and (iii) a second mating feature on an external surface of the fourth end portion configured to rotatably engage the first mating feature, such that when the fourth coupling portion is coupled with the second coupling portion and the second mating feature is mated with the first mating feature, the first fluid channel is in fluid communication with the second fluid channel.

Embodiments of the disclosure related to quick connect/disconnect systems and methods for connecting and disconnecting fluid dispensing devices. The devices can be hoses, faucets, tubes, pipes, sprinklers, nozzles, wands, other hose attachments, fluid supply source for non garden devices, or combination thereof. The fluid supply source can be, for example, a gas pipe, an air pipe, or a valve. The system includes a main body or frame and a locking body abuts to the main body for protecting internal components. The main body and the locking body include an outer wall defining a grip surface as a user interface for releasing or disengaging a male connecting body.

The system further includes a shutoff plug, a first seal member such as an O-ring, a spacer, a male connecting body, and a biasing member. In one example, the locking body includes an annular groove for receiving a first seal member. The locking body is adapted for receiving at least one of the components. The locking body converts rotational motion to linear motion to move a first end of the male connecting body. A helical rotation about the locking body also provides mechanism advantage to the insertion of the male connecting body.

In one embodiment, a second housing may be provided for receiving the male connecting body and protecting other internal components. The locking body engages an outer wall of the second housing further provides protection to the internal components retained in the first and second housings.

The seal secures to an inner connecting wall of the first housing adjacent to the spring. The spacer engaged the inner connecting wall of the first housing is held in place between the seal and the lip seal. In one embodiment of the present disclosure, the seal is a separate piece part and sits on the inner connecting wall of the first housing. In another embodiment of the disclosure, the seal can be pressed fixed or integrated to the first housing as monolithic device.

The shutoff plug is placed into an opening of the spacer and slides freely within the spacer. The shutoff plug and the spacer provide a fluid-tight mating surface to the seal. The shutoff plug and the spacer further provide a fluid-passage to pressurize the lip seal. The seal prevents fluid passage when the plug is in the closed position. Seal prevents leakage between first body and second body.

The male connecting member including a flange integral with an exterior surface of the male connecting member adjacent to the locking member. A retaining member, such as a snap ring engages in flange and retains the locking element to the connecting end of the male connecting member. Snap ring allows for free rotation of the locking member in relation to the connector end of the male connecting member. When the locking member and the retaining member integrated into the fluid dispensing device, the device rotates freely in relation to the male connecting member.

A second seal member, such as a lip seal provides a fluid-tight seal between the spacer and the second body. The lip seal provides a fluid-tight seal between the spacer and the connector end. The lip seal pressurized to provide auxiliary sealing force between fluid passage and connector end. The lip seal may also act as an environmental barrier for any contamination due to debris for the connector end surface.

O-ring provides insertion seal between the connector end and the second body. O-ring provides retraction seal between the connector end and the second body. O-ring provides a secondary seal between the connector end and the second body. Like the lip seal, the O-ring may also act as an environmental barrier for the connector end surface. It will be understood that various configurations or geometry of a seal member may be used in the application and be able to serve the general function.

The first and second seal members are selected from a group consisting of O-ring, a lip seal, a hydrant seal, or a combination thereof.

A coupling assembly, such as a male hose coupling positively engages a fluid dispensing system, such as a hose end product. The male hose coupling provides geometry adequate to retain the snap ring. The male hose coupling provides adequate clearance geometry for the locking ring. The male hose coupling provides adequate sealing surface for O-ring and the lip seal. The male hose coupling provides face to face engagement between the first assembly and the locking member.

A biasing element, such as a spring provides positive no-flow shut-off force. Spring centers the plug. The spring also provides adequate fluid flow to the plug. Yet further, the spring provides low pressure shutoff.

The quick connect/disconnect system is provided for receiving at least one fluid dispensing devices. The system is compact, easy to manufacture, is spray free when connecting to and disconnecting from the pressurized fluid dispensing device. The system is leak free.

BRIEF DESCRIPTION OF THE FIGURES

The above-described features and advantages, as well as others, should become more readily apparent to those of ordinary skill in the art by reference to the following detailed description and the accompanying figures in which:

FIG. 8A is a perspective view illustrating the system, in accordance with various embodiments of the disclosure;

FIG. 40 is block diagram of an adapter for use with the coupler system of the fluid system of FIG. 10.

DETAILED DESCRIPTION

Figure 1:
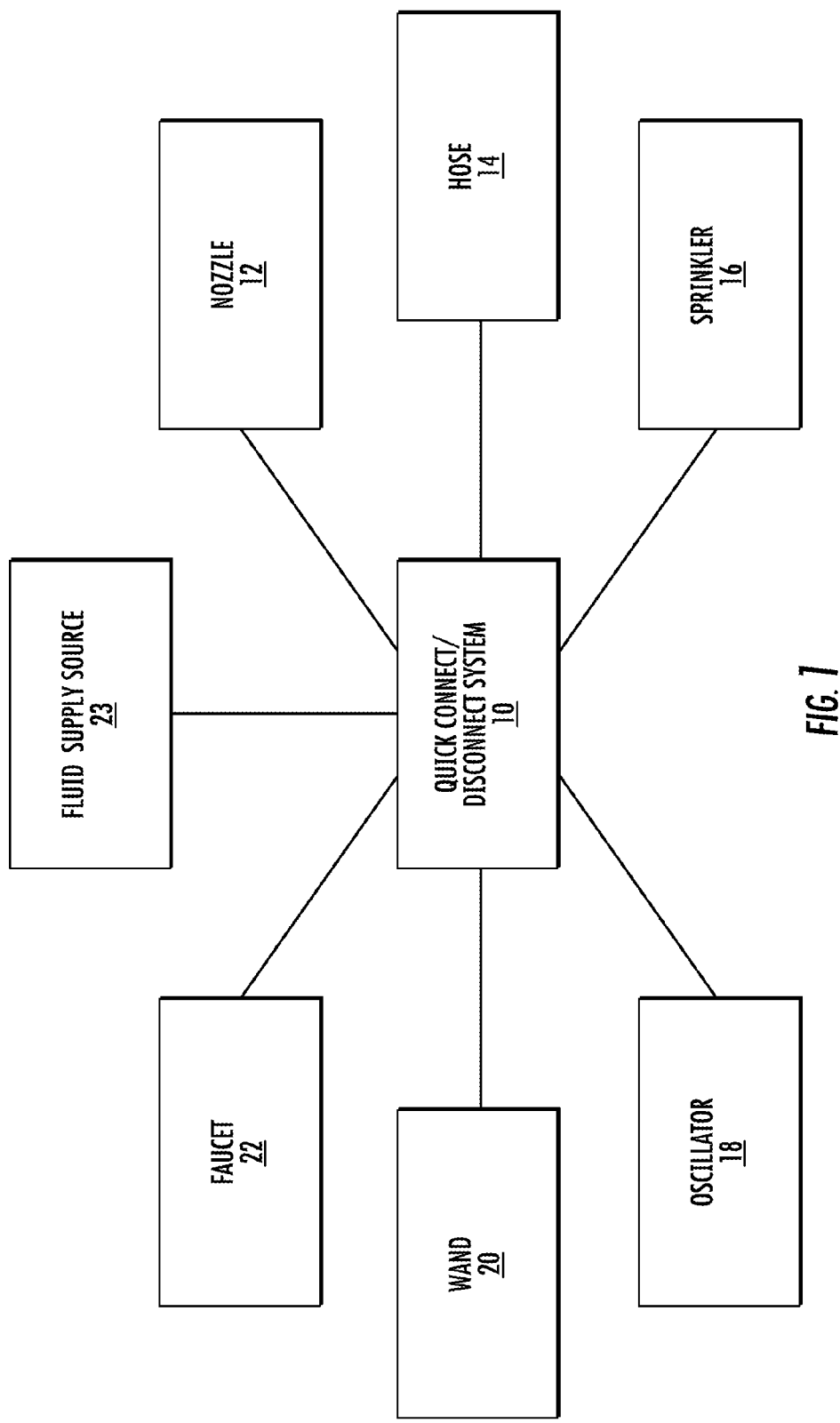
FIG. 1 is a block diagram representing a quick connect/disconnect system configured to perform the techniques disclosed herein, in accordance with an embodiment.

For the purpose of promoting an understanding of the principles of the disclosure, reference will now be made to the embodiments illustrated in the drawings and described in the following written specification. It is understood that no limitation to the scope of the disclosure is thereby intended. It is further understood that this disclosure includes any alterations and modifications to the illustrated embodiments and includes further applications of the principles of the disclosure as would normally occur to one skilled in the art to which this disclosure pertains.

A quick connect/disconnect system may be structured and formed in a variety of different ways. In one example, a quick connect/disconnect system may be formed with an integrated external locking body or frame for receiving a male connecting member. In other example, a quick connect/disconnect system may be formed with an internal locking body or frame having an expansion chamber configured to reduce fluid pressure as an external component is removed or disconnected from the locking body. The external component may be a male connecting member.

Figure 2:
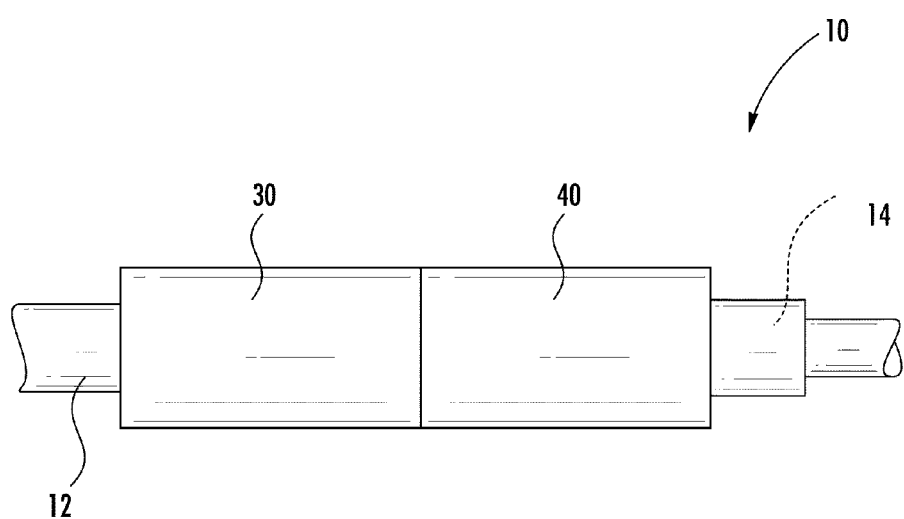
FIG. 2 is a block diagram of FIG. 1, in accordance with an embodiment of the disclosure.

Turning now to the figures, FIGS. 1 and 2 illustrate the flexibility and usefulness of a quick connect/disconnect system 10 in accordance with one or more of the herein described embodiments. The system 10 provides easy connection and disconnection and is leak free. Further, the system significantly reduces or eliminates the spraying of fluid when engaging and disengaging the pressurized fluid dispensing device. The fluid dispensing device can be a nozzle 12, a hose 14, a sprinkler 16, an oscillator 18, a wand 20, a faucet 22, a hose to hose configuration (not shown), other hose attachments, a fluid supply source 23 for non garden devices, or combinations thereof. Other examples of devices are possible.

As depicted in FIG. 2, the system 10 includes a female connecting member 30 and a male connecting member 40 interconnected to the female connecting member, eliminating the need for a separate coupler or an adaptor. A locking member may be implemented or integrated into one of the connecting members 30, 40. The locking member will be described in greater detail below.

In one example, a connecting end of the female connecting member 30 is coupled to the nozzle 12 and a connecting end of the male connecting member 40 is coupled to the hose 14, and vice versa. In other examples, the connecting end of the female connecting member 30 is coupled to the oscillator (not shown). It will be understood that certain combinations and subcombinations are of utility and may be employed without reference to other features and subcombinations. For example, a hose to hose system.

Figure 3:
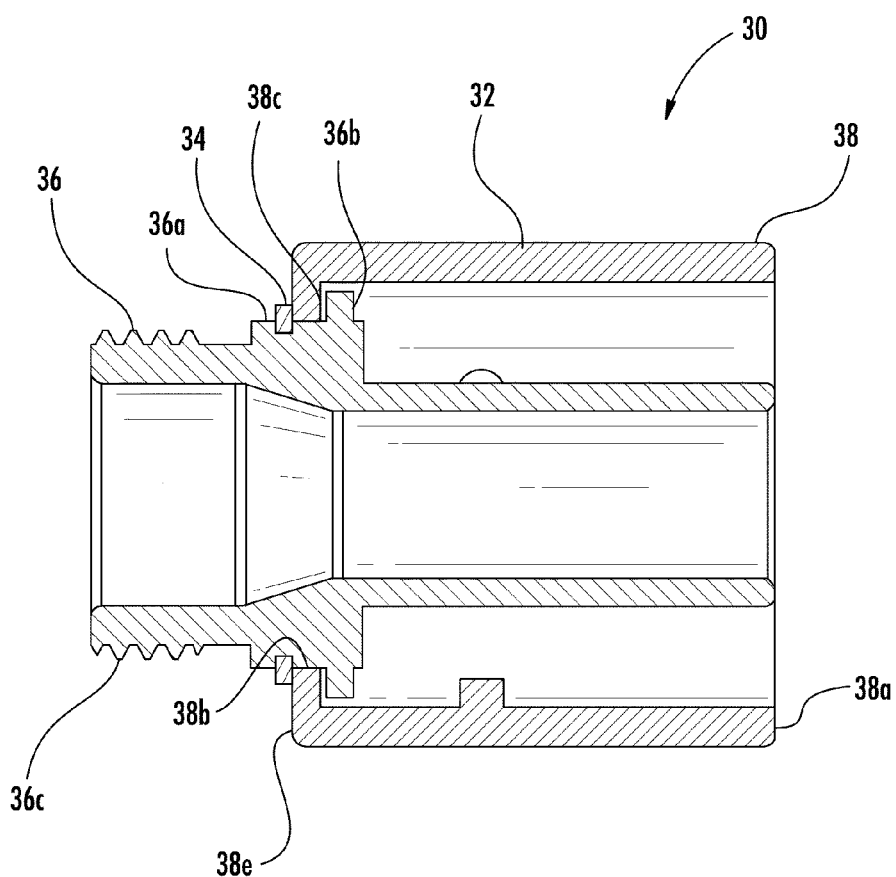
FIG. 3 is a cross-sectional view of a connecting member of FIG. 2, in accordance with an embodiment of the disclosure.
Figure 4:
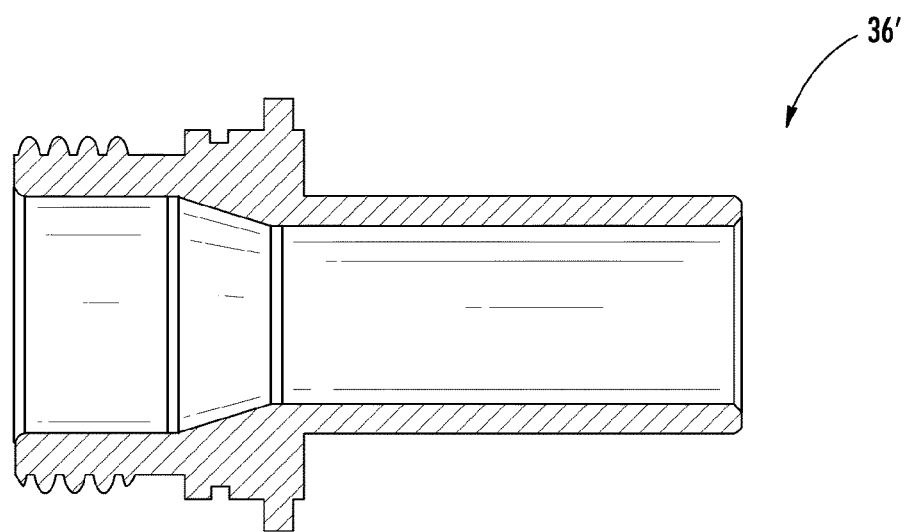
FIG. 4 is a cross-sectional view of a nozzle connector shown in FIG. 3, in accordance with various embodiments of the disclosure.

The connecting ends of the connecting members 30, 40 are shown in detail in FIG. 3-6. The female connecting member 30 includes a female locking sleeve 32, a retaining ring 34, and a connector 36. The locking sleeve 32 having a peripheral wall 38 and terminates at a first distal edge 38a. A through hole 38b is formed on a surface 38e by any known techniques, as illustrated in FIG. 3, for receiving the connector 36. A plurality of slots (not shown) communicating with the through hole 38b may be provided within an inner wall surface 38e to receive a pin (not shown). In another embodiment, the pin may be integrated to the slot to retain after receiving parts. Yet in another embodiment, the through hole 38b is formed on an outer wall and communicates the outer wall to the inner wall via the pin.

The connector 36 includes at least one flange, two flanges 36a, 36b, are illustrated. The retaining ring 34 is disposed between the flange 36a and the surface 38e adjacent to the through hole 38b. When the connector 36 inserted into the interior of the locking sleeve 32, the flange 38b engages an inner wall 38c of the locking sleeve 32.

Figure 5:
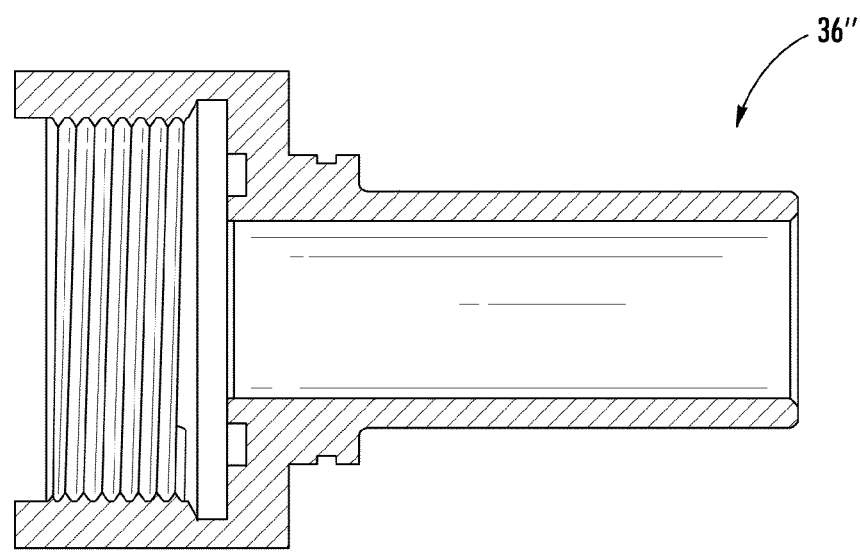
FIG. 5 is a cross-sectional view of an oscillator connector that may be used in the system; in accordance with various embodiments of the disclosure.
Figure 6:
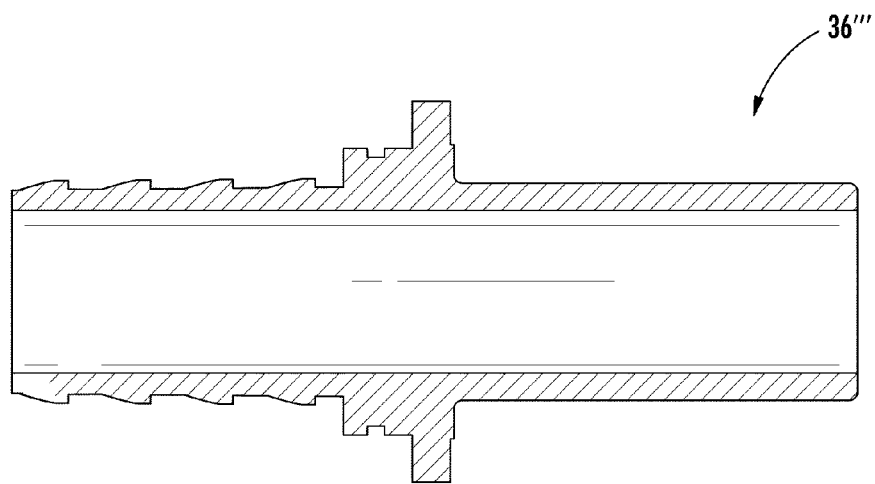
FIG. 6 is a cross-sectional view of a hose connector that may be used in the system; in accordance with various embodiments of the disclosure.

A connecting end 36c of the connector 36 is sized to be substantially conformed to an outer receiving surface of the fluid dispensing device. In one example, the connector is a nozzle connector 36', in FIG. 4. In another example, the connector is an oscillator connector 36", as depicted in FIG. 5. In yet another example, the connector is a hose connector 36''', as shown in FIG. 6. Although the pin and through hole on the device are shown as two separate pieces, other examples such as the pin and the through hole integrated into a single molded element of the device is possible.

The locking sleeve, the retaining ring, and the connector may utilize one or multiple layers. The locking sleeve, the retaining ring, and the connector may be made of aluminum, stainless steel, plastic, polymer, thermoplastic, or of any similar material.

Although the system 10 shown as two assemblies 30, 40 separately coupled to the fluid dispensing devices, it should be understood that numerous variations to the configuration of the system are possible. For instance, the connector 36 may be formed as part of or integrated into one of the connecting members 30, 40. In another example, at least one of the connecting members 30, 40 may be formed as part of or integrated into the fluid dispensing device. Since the system 10 is relatively simple in construction and easy to manufacture, manufacturing cost is reduced and reliability is enhanced. More details about the formation of the system are described in the present disclosure.

Figure 7A:
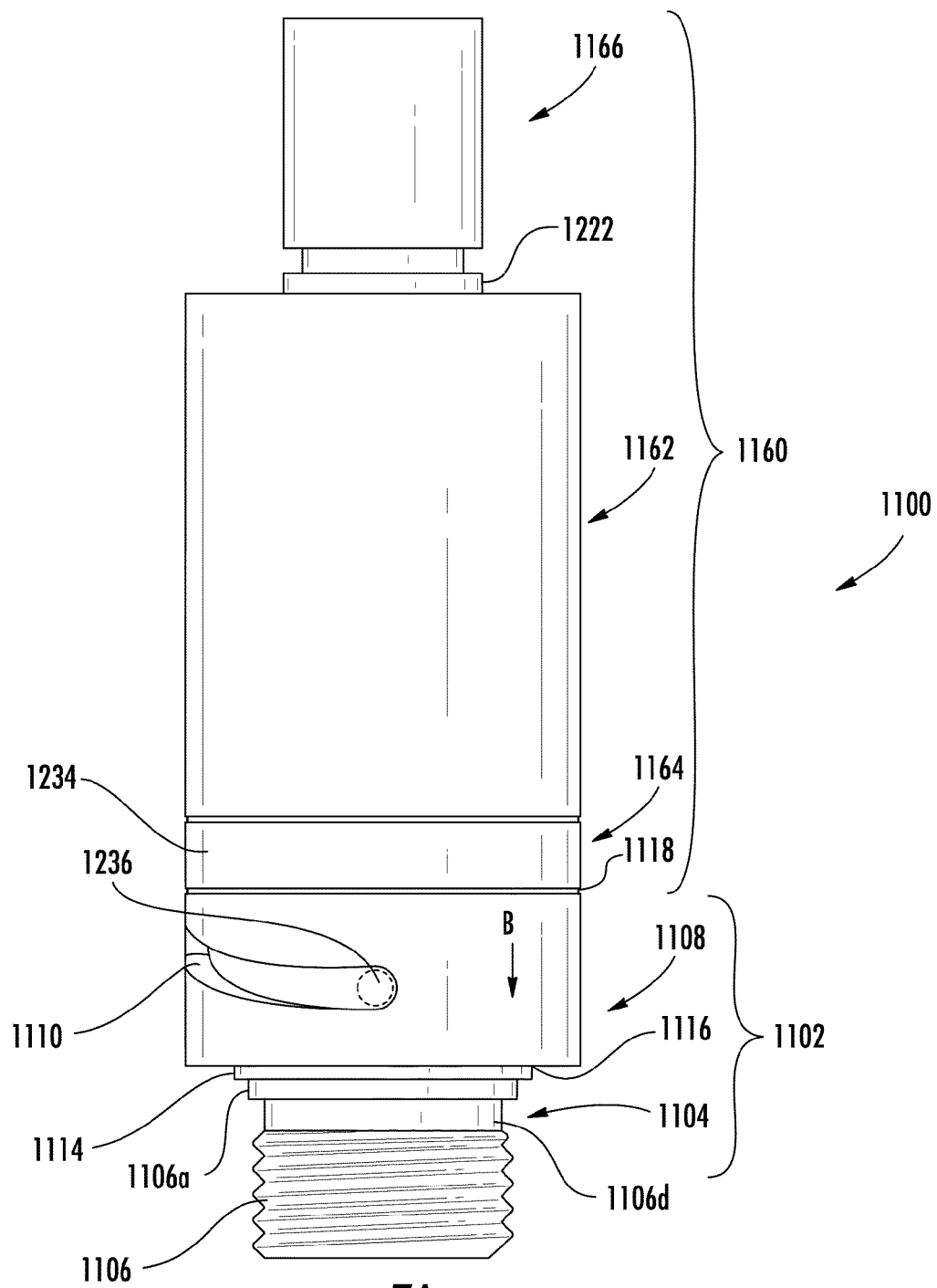
FIG. 7A is a side view illustrating the system, in accordance with various embodiments of the disclosure.
Figure 7B:
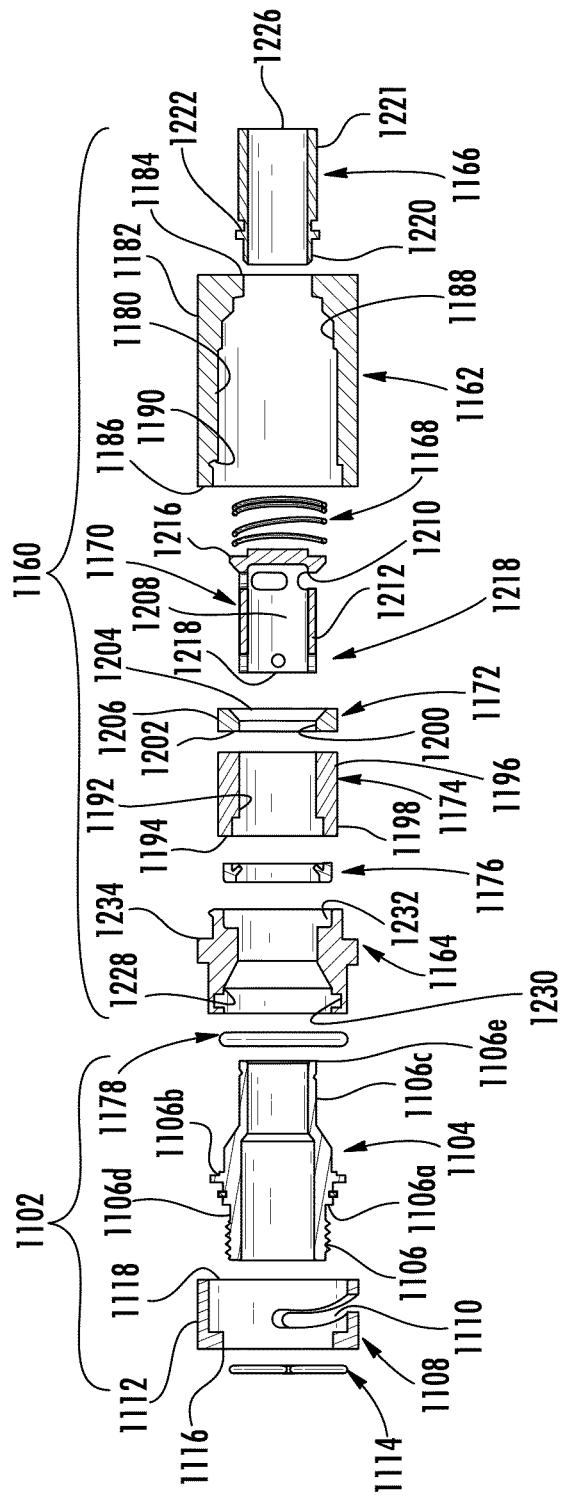
FIG. 7B is an exploded view illustrating of FIG. 7A, in accordance with various embodiments of the disclosure.
Figure 7C:
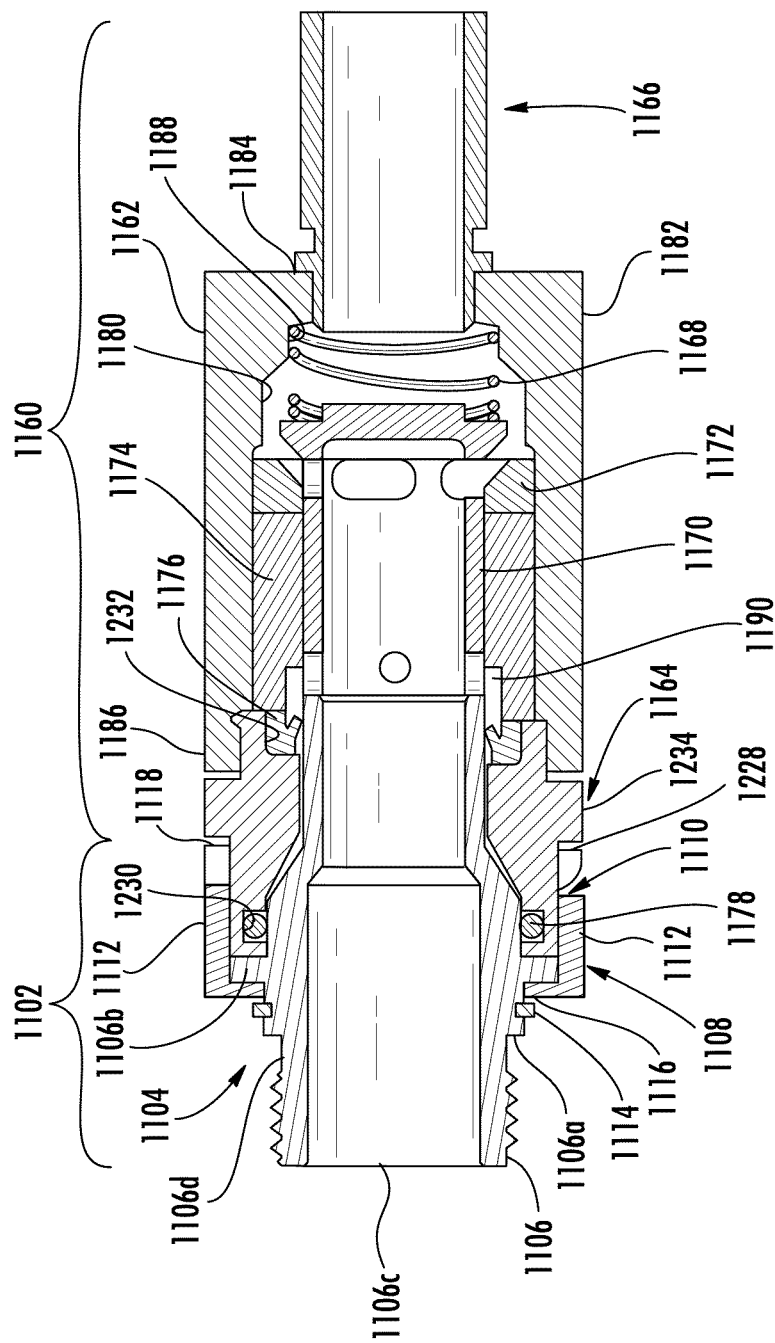
FIG. 7C is a cross-sectional view of FIG. 7B, in accordance with various embodiments of the disclosure.

In many of these embodiments, a system 1100 includes a first assembly 1102 and a second assembly 1160. As illustrated in FIGS. 7A-7C, the first assembly 1102 includes a connector 1104 having a connector end 1106 for receiving a nozzle, for instance. The connector 1104 further includes an axial passageway 1106c and flanges 1106a, 1106b formed on an outer peripheral wall 1106d. The first assembly 1102 further includes a locking member 1108 having a slot or slit 1110 on a peripheral wall 1112 and an anti-locking feature.

A through hole 1116 is formed on one end of the peripheral wall 1112 and a distal edge 1118 connected to the through hole 1116 via the peripheral wall 1112 is formed on the opposite end of the through hole 1116. A retaining ring 1114 is disposed between the flange 1106a of the connector 1104 and the peripheral wall 1112 of the locking member 1108 to retain the connector 1104 in a free rotating position. The second flange 1106b of the connector 1104 engages an inner wall of the locking member 1108 further retains the connector 1104 in the free rotating position. The second flange 1106 also provides abutment stop to the connector 1104 from pulling out of the locking member 1108.

The second assembly 1160 includes a first housing 1162 having an annular chamber 1180, an outer peripheral wall 1182, and two receiving ends 1184, 1186 opposed to each other. The first housing 1162 further includes an annular biasing element groove 1188 adjacent to the receiving end 1184 for receiving a biasing element 1168. An inner groove 1190 of the first housing is formed by any known techniques to held a second housing 1164 in place after the biasing element 1168, a plug 1170, a sealing ring 1172, a spacer 1174, and a lip seal 1176, collectively encapsulated within the annular chamber 1180 of the first housing 1162.

The receiving end 1184 is dimensioned to be substantially the same as the size of a cylindrical end 1220 of a connector 1166. A flange 1222 extends integrally and outwardly from an outer surface 1224 and acts as an abutment stop for the connector 1166. The spacer 1174 and the sealing ring 1172 having inner cylindrical walls 1192, 1200 to snugly receive the plug 1170. The spacer 1174 includes two ends 1194, 1196 and an outer cylindrical wall 1198. The sealing ring 1172 also includes two ends 1202, 1204 and an outer cylindrical wall 1206. As shown in FIG. 7C, the spacer engages the annular chamber 1180 of the first housing 1162 is held in place by the sealing ring 1172 and the lip seal 1176, wherein the distal ends 1196, 1202 of the spacer 1174 and the sealing ring 1172 abut to each other, and the distal end 1194 of the spacer 1174 and the lip seal 1196 abut to each other.

The plug 1170 includes an axial passageway 1208, a plurality of openings 1210, 1212 communicatively coupled the axial passageway 1208 to an outer surface 1214 to allow fluid to flow through without restriction. A plurality of openings 1211 having a dimension smaller than a dimension of the openings 1210, 1212 are provided, therefore to allow fluid to flow behind the lip seal to enhance shutoff. The plug 1170 further includes a flange 1216 extends outwardly from the outer surface 1214 and engages biasing element 1168. The flange 1216 serves as an abutment stop for the biasing element 1168 into the spacer 1174. The biasing element 1168, for example, is a spring and is provided to center the plug 1170 once the plug 1170 engages the spring. The plug 1170 is placed into the spacer 1174 and permits the plug 1170 to slide freely within the spacer 1174. The plug 1170 and the spacer 1174 further effect a fluid tight matting surface to the sealing ring 1172. In this manner, the biasing element, the spring as illustrated, provides positive no-flow shut off force in closed position and permits adequate fluid flow to the plug 1170 in open position. When the plug 1170 is in a closed position, the sealing ring 1172 prevents fluid passage through the plug 1170. A distal end 1218 adjacent to the opening 1212 is formed and engages a transverse receiving end 1106e of the connector 1104. In one embodiment, a magnetic member to hold the assemblies together. An optional sensor may be integrated into the system to shut off the system in closed position.

The second housing 1164 includes an inner surface 1228 that is sized to be substantially the same or greater than the size of the outer peripheral wall 1106d of the connector 1104. The second housing 1164 also includes an O-ring groove 1230 on the inner surface 1228 for carrying the O-ring 1178. In the manner, the O-ring 1178 not only provides an insertion seal between the spacer connector 1104 and the second housing 1164, the O-ring 1178 also provides retraction seal between the connector 1104 and the second housing 1164. A lip seal groove 1232 serves to receive the lip seal 1176 is also formed on the inner surface 1228 and opposed to the O-ring groove 1230. The lip seal 1176 provides a fluid tight seal between the spacer 1174 and the second housing 1164 so as to effect an auxiliary sealing force between fluid passage and the connector 1104. In another embodiment, the second housing 1164 may be completely covered by the locking member 1108. In yet another embodiment, the locking member 1108 and the second housing 1164 may be integrated into a single system. For example, the locking member and the second housing are molded as a single unit or a coating material may be applied to an internal wall of the locking member. Yet in further embodiment, the locking member 1108 may have a length extended outwardly to accommodate the connector end 1106 and to avoid interference to the seal surface of the connector end 1106.

The second housing 1164 further includes an integral surface 1234 for mating with the distal edge 1118 and the receiving end 1186 of the locking member 1108 and the first housing 1162. The locking member 1108 converts rotational motion to linear motion in order to move the connector 1104. Once the internal components are held in place within the assembly 1102, 1160, the locking ring provides protection for the components. The locking member 1108 further provides interface geometry to the system 1100. As the locking ring disengages the assemblies 1102, 1160, the locking member 1108 is able to discharge or release any inlet pressure build therein, thereby the system significantly reduces or eliminates the spraying of fluid when connecting or disconnecting the pressurized fluid dispensing device.

Figure 8B:
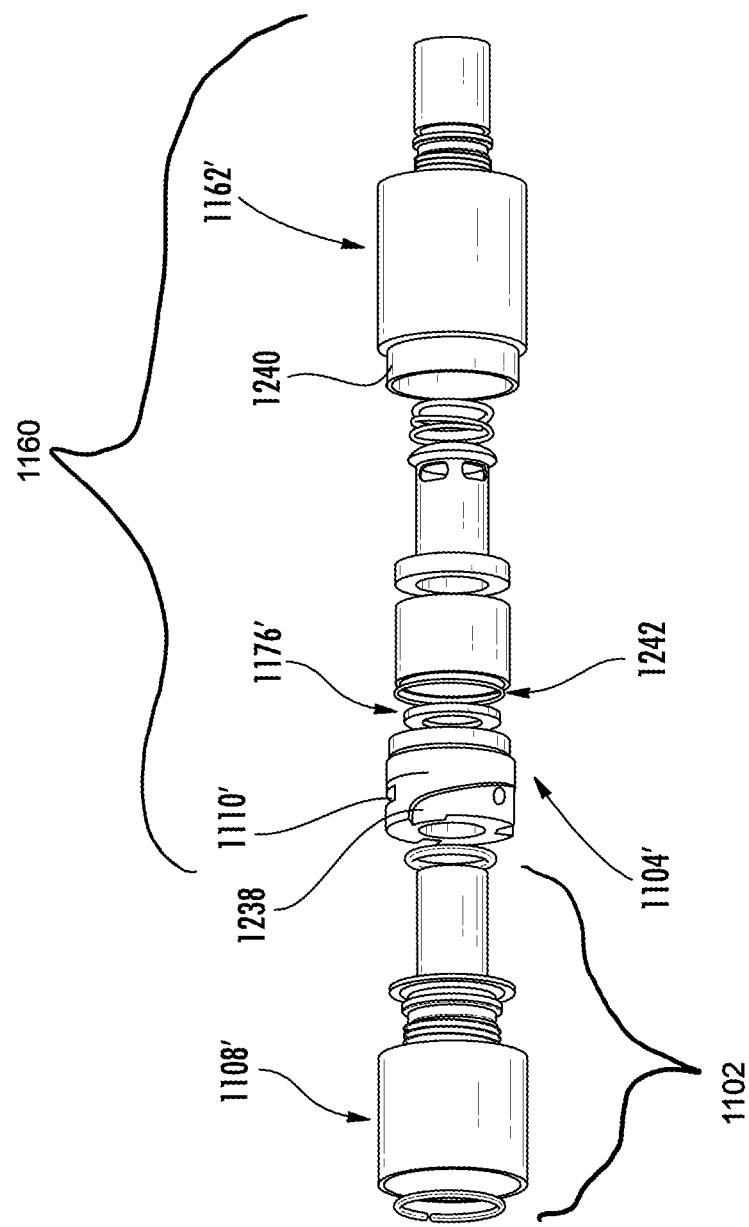
FIG. 8B is an exploded view illustrating of FIG. 8A, in accordance with various embodiments of the disclosure.
Figure 8C:
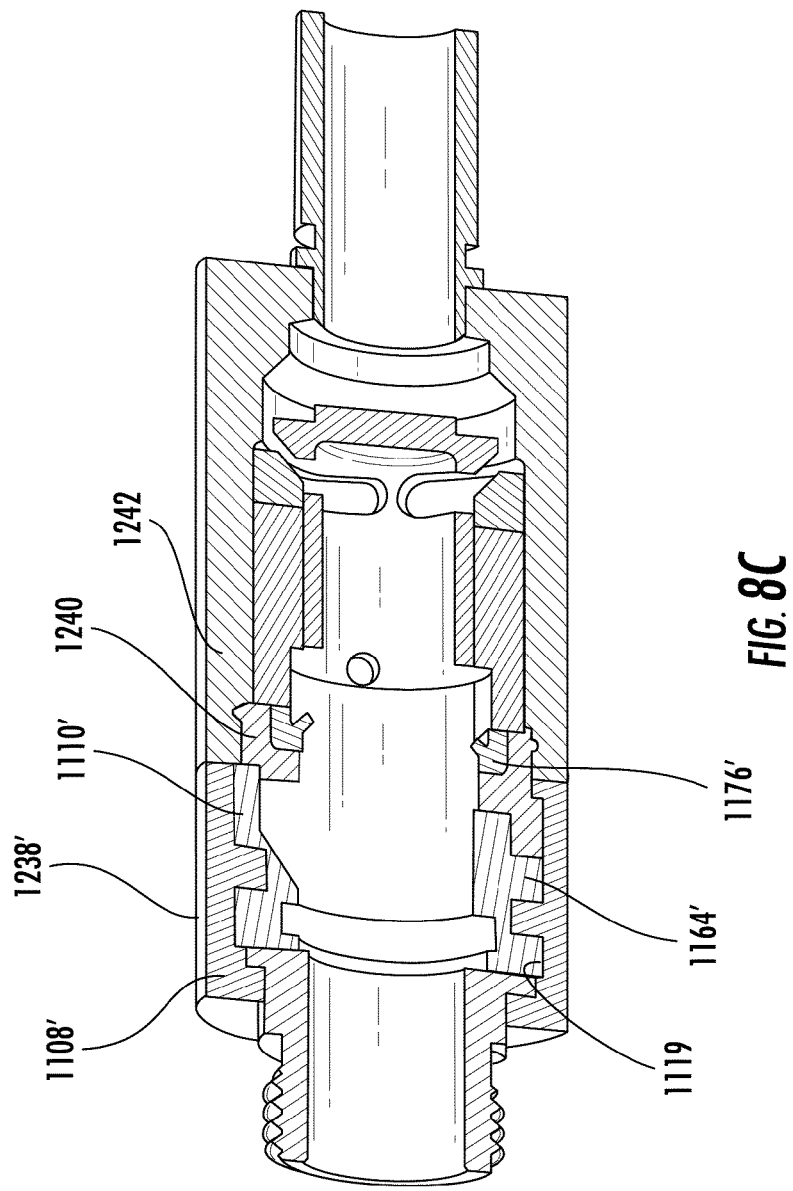
FIG. 8C is a cross-sectional view of FIG. 8B, in accordance with various embodiments of the disclosure.

FIGS. 8A-8C illustrate another embodiment of a quick connect/disconnect system 1100. FIGS. 8A-8C are similar in construction to the system 1100 in FIGS. 7A-7C and like elements are identified with a like reference convention. In this embodiment, a guide groove or slit 1110' is formed on the outer surface 1238 of the second housing 1164' by any known technique. A locking pin 1238' mates with the guide groove 1110' is provided on an inner surface 1119 of the locking member 1108'.

To engage the first assembly 1102 to the second assembly 1160, simply aligns the locking pin 1238' at an entryway of the guide groove 1110' and follows the path of the guide groove 1110' until the pin 1238' reaches the end of the path. Once it is in a locked position, the locking member 1108' and the first housing 1162' abut to each other and held the internal components in place. In this manner, the second housing 1164' is contained in the locking member 1108'.

As shown in FIG. 8C, the first housing 1162' has an elongated portion 1240 extended from the receiving end 1186' to receive the distal end 1118 of the locking member 1108'. The locking member 1108' and the first housing 1162' thereby provide a retention feature for the second housing 1164'. The system 1100 further includes a second retaining ring 1242 and the second retaining ring 1242 is carried in a recess of the second housing 1164 by any known techniques. In one example, the second retaining ring 1242 may be pressed fitted into the recess of the second housing 1164 as a single device. To simply the application, an O-ring 1176' may be provided, instead of a lip seal 1176, to provide a fluid tight seal between the spacer 1174 and the second body 1164. The locking structure may be integrated into the system, such as the first housing, second housing, or the locking member.

Other embodiments may be similar in construction to the system 1100 in FIGS. 8A-8C and may include an expanded volume within the assemblies 1102, 1160 that allows fluid to flow through. It also reduces fluid squirt due to high fluid pressure.

Other embodiments may be similar in construction to the system 1100 in FIGS. 8A-8C and include an internal locking pin 1236' formed therein and a slit 1110' to receive the locking pin 1236'. A lip seal 1176' may be provided with at least two elastic retaining members extending outwardly from an inner wall. In another embodiment, the lip seal 1176' may be pressed fitted into the second housing. As the connector 1106 inserts into the assembly 1102, the two elastic retaining members engage the outer peripheral wall 1106d of the connector 1104, thereby provide a fluid tight seal to the spacer 1174 and the second housing 1164. An optional fastening member, such as nut 1250 may be coupled to the connector 1166 by any attachment methods. The fastening member 1250 and the connector 1166 may be integrated into a single assembly.

The second housing 1164' may include a lip terminated at a distal end and extending outwardly from the outer surface 1238. A recess may be formed on the inner wall 1191 of the first housing 1162 and configured to receive the lip of the second housing 1164'. The second housing 1164' may also include an inner cylinder wall 1228 that is sized to be substantially conformed to the outer wall 1106d of the connector 1104.

Other embodiments are similar in construction to the system 1100 in FIGS. 8A-8C and may include at least one retaining member and a plurality of O-ring 1178', 1178", 1178'''. The first O-ring 1178' may be disposed within the recess of the second housing 1164 to provide an insertion seal between the connector 1104 and the second housing 1164. The second O-ring 1178" may be disposed within and surround a second recess of the second housing 1164 adjacent to the spacer 1174 to further provide an insertion seal between the connector 1104 and the second housing 1164. The third O-ring 1178''' may be carried in a recess of the second housing 1164 to further provide an a fluid tight seal between the spacer 1174 and the second body 1164. The retaining member 1178"" may be integrated into the lip seal or the spacer. A portion of the retaining member 1178'''' may extend outwardly to seal the lip seal and the spacer.

Other embodiments are similar in construction to the system 1100 in the previous figures and the second housing 1164' may include an elongated portion 1240' extended from a receiving end and engages the outer cylindrical wall 1198 of the spacer 1174, to thereby provide a retention feature for the spacer 1164. The lip seal 1176 may be encapsulated into the spacer. In another embodiment, the lip seal is encapsulated into the locking member 1108.

Other embodiments are similar in construction to the system 1100 in the previous figures and include a male connecting member 1118 and a shutoff plunger 1104 that abut one another. A housing 1102 may surround at least one of the male connecting member 1118 and the shutoff plunger 1104. The housing 1102 and the male connecting member 1118 can be stainless steel or other known materials that are leak free.

A locking member 1110 may be coupled to at least one of the male connecting member 1118 and the shutoff plunger 1108. The locking member 1110 may be coupled to an inner wall of the housing 1102. In some cases, a second housing may be provided to couple with the first housing 1102 and to provide position retention features for one of the components 1110, 1102.

The quick connect/disconnect system can further include a lip seal 1176, a spacer 1106, a biasing element 1120, and a shutoff seal 1108, collectively encapsulated within the housing 1102. The lip seal 1114 is configured to join the spacer 1106 to an inner connecting wall of the locking member 1110. The spacer 1106

The locking member 1110, the shutoff plunger 1104, the lip seal 1114, the spacer 1106, the shutoff seal 1108 can be thermoplastic polymer, thermosetting polymer, or any suitable plastic material such as polyethylene, polypropylene (PP), polystyrene (PS), polyvinyl chloride (PVC), polytetrafluoroethylene (PTFE), special polyethylene terephthalate (SPET), alternative polyethylene terephthalate (APET).

Plug slides freely within the spacer. Plug provides a fluid-tight matting surface to the seal. Plug centers the spring to itself. Plug provides a fluid-passage to pressurize the lip seal.

Spacer provides compression to the seal. Spacer centers and supports the lip seal. Spacer provides a journal for the plug. Spacer provides a water-passage to the lip seal.

Seal prevents fluid passage when the plug is in the closed position. Seal prevents leakage between first body and second body.

First body provides a positive retention feature for second body. First body provides a position (assembly) stop for second body. First body provides a fluid-tight seal for the seal. First body provides a centering feature for the spring. First body provides a leak-free interface to the hose. First body provides an adequate grip surface. First body provides adequate protection for internal components.

Locking ring converts rotational motion to linear motion to move the connector end. Locking ring provides locking mechanism for the assembly. Locking ring provides adequate protection for internal components. Locking ring provides a grip surface. Locking ring provides adequate interface geometry to the connector end. Locking ring provides (male) mechanism advantage to overcome inlet pressure.

Snap ring retains the locking to the connector end. Snap ring allows for free rotation of the locking ring in relation to the connector end.

Lip seal provides a fluid-tight seal between the spacer and the second body. Lip seal provides a fluid-tight seal between the spacer and the connector end. Lip seal pressurized to provide auxiliary sealing force between fluid passage and connector end. Lip seal provides a wiper for the connector end surface.

O-ring provides insertion seal between the connector end and the second body. O-ring provides retraction seal between the connector end and the second body. O-ring provides a secondary seal between the connector end and the second body. O-ring provides a secondary wiper for the connector end surface.

Male hose coupling positively engages the hose end product. Male hose coupling provides geometry adequate to retain the snap ring. Male hose coupling provides adequate clearance geometry for the locking ring. Male hose coupling provides adequate sealing surface for O-ring and the lip seal. Male hose coupling provides connect engagement surface at the plug interface.

Spring provides positive no-flow shut-off force. Spring centers the plug. Spring provides adequate fluid flow to the plug.

Second body provides adequate secondary force to the seal. Second body provides geometry adequate to connect to first body. Second body provides an adequate journal for the spacer. Second body provides an adequate seal for the spacer. Second body provides an adequate journal for the connector end. Second body provides a water-tight seal surface for O-ring. Second body provides an adequate journal for the locking ring. Second body provides (female) mechanism advantage to overcome inlet pressure.

Figure 9:
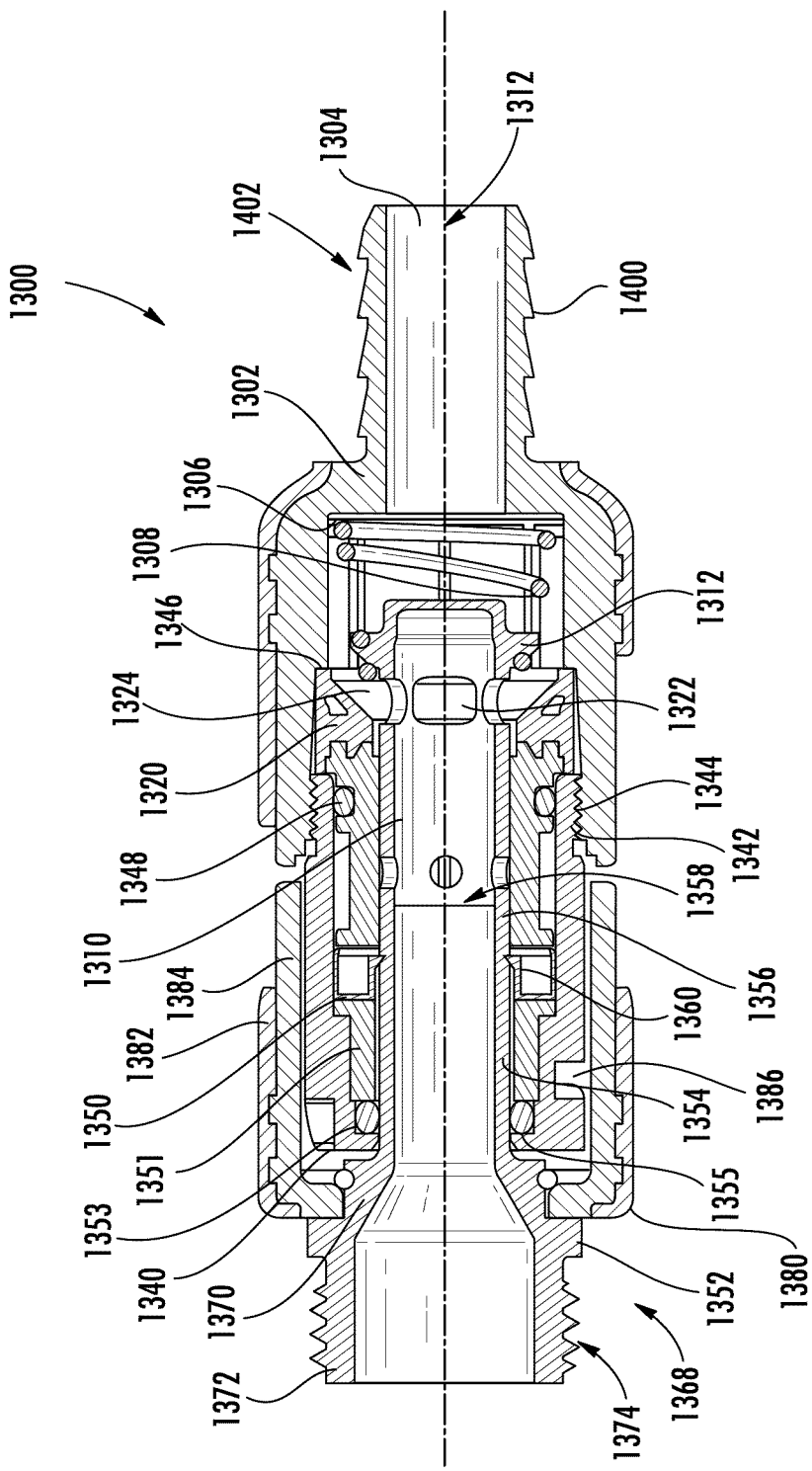
FIG. 9 is a cross-sectional view of another embodiment of a quick connect/disconnect system of the present invention.

FIG. 9 is a cross-sectional view of another embodiment of a quick connect/disconnect system 1300. The system 1300 includes a first body 1302 disposed at a first end of the system 1300 and includes an internal channel 1304 which extends from one end of the first body 1302 to another end of the first body 1302 for a fluid, such as water, to pass therethrough. The first body 1302 includes a shoulder 1306 upon which a spring 1308 can be disposed. A shuttle 1310 is disposed within the channel of the first body 1302 and is configured for sliding movement along a longitudinal axis 1312 which extends longitudinally through the system 1300. The shuttle 1310 includes a flange 1312 extending laterally from the longitudinal axis 1312 which provides a contacting surface for the spring 1308.

A seal assembly 1320 is disposed about an outer surface of the shuttle 1310 and is formed of an elastomeric material which is configured to provide seal between an interior surface of the first body 1302 and an exterior surface of the shuttle 1310. The shuttle 1310 and the seal assembly 1320 are configured to provide a flow of fluid through a path defined by one or more apertures 1322, defined in the shuttle 1310, and an angled surface 1324 defined by the seal assembly 1320. As can be seen in FIG. 9, the angled surface 1324 directs a fluid flow either into or away from the apertures 1322 of the shuttle 1310.

A second body 1340 is partially disposed within the channel 1304 of the first body 1302 and includes threads 1342 to threadingly engage threads 1344 of the first body. Engagement of the threads 1342 with the threads 1344 holds the seal assembly 1320 at a predetermined position within the channel 1304 at least partly defined by a shoulder 1346 of the first body 1302. An O-ring 1348, disposed within a channel defined in the seal assembly 1320, provides a fluidtight seal between the second body 1340 and the seal assembly 1320.

A seal 1350 is disposed at an end of the seal assembly 1320 opposite the end at which the angled surface 1324 is located. The seal 1350 defines a channel in which a male coupling 1352 is disposed. The male coupling 1352 includes a first portion 1354 which is generally cylindrical and defines an interior channel disposed along the longitudinal axis 1312. A terminating end 1356 of the first portion 1354 abuts a terminating end 1358 of the shuttle 1312. The seal 1350 encircles the first portion 1354 and includes a projection portion 1360 which projects into the channel defined by the seal 1350 and which contacts an external surface of the first portion 1354. The male coupling 1352 includes a second portion 1368 having a neck portion 1370 disposed between the first portion 1354 and a threaded portion 1372 which defines a channel having an interior diameter larger than the interior diameter of the first portion 1354. Threads 1374 are defined on an exterior surface of the threaded portion 1372. The first portion 1354 is disposed adjacent to a spacer 1351 which is substantially cylindrical and which defines a channel through which the first portion 1354 is inserted. The spacer 1351 at one end abuts the seal 1350 and at a second end contacts an O-ring 1353 which is disposed between an end of the spacer and an internally projecting flange 1355 of the second body 1340. A retaining ring assembly 1380 includes a first part 1382 surrounding a second part 1384. The second part 1384 includes a projection which engages a groove 1386 defined in an external surface of the second body 1340.

The first body 1302 of the quick connect/disconnect system of FIG. 9 may include a configured or undulating surface 1400 located on an end portion 1402 of the first body. The end portion 1402 can be inserted into a hose, for instance, and contact of the configured surface engages an interior surface of the hose to keep the end portion 1402 fixed to the hose.

The seal assembly 1320 of the quick connect/disconnect system of FIG. 9 may be an overmolded seal or an O ring. Of course, other member with sealing capability is possible.

Figure 10:
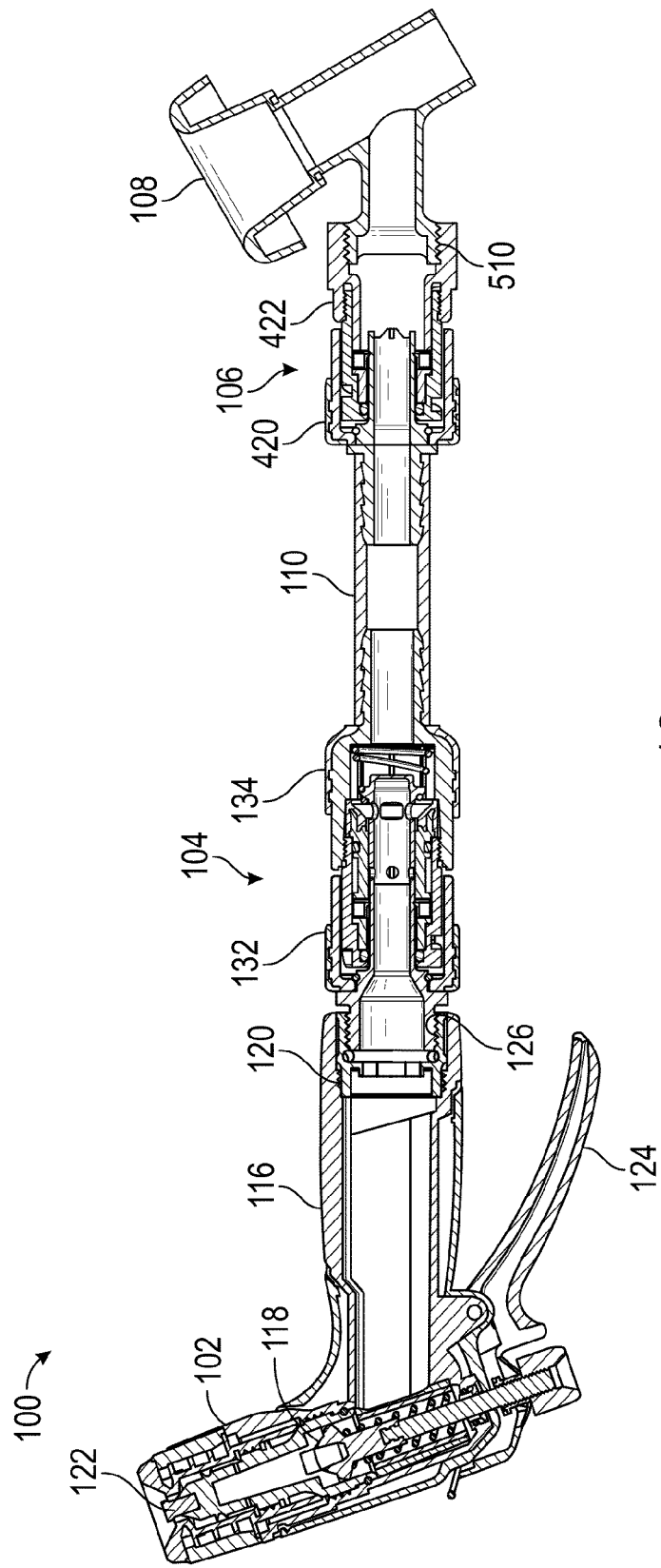
FIG. 10 is a cross sectional view of a fluid system, as described herein, including a nozzle, a first coupler system, a hose, a second coupler system, and a sillcock.

As shown in FIG. 10, a fluid system 100 includes a nozzle 102, a first quick connect/disconnect system, shown as a first coupler system 104, a second quick connect/disconnect system, shown as a second coupler system 106, and a sillcock 108. A fluid conductor or fluid conduit, shown as a hose 110, connects the first coupler system 104 to the second coupler system 106.

The nozzle 102 is an exemplary fluid conduit or fluid device that includes a body 116, a valve 118, and a shank 120. The valve 118 is shown in a closed position that prevents fluid flow through a tip 122 of the nozzle 102. The valve 118 is movable to an open position in response to movement of a handle 124 of the nozzle 102. The shank 120 is fixedly connected to a receiving end of the body 116 and defines a plurality of internal threads 126. Other forms of non-threaded ends for receiving the shank 120 are possible. The nozzle 102, which is also referred to herein as a fluid conductor, is representative of any fluid device, such as fluid sprinklers, pneumatic devices, wands, hydraulic devices, faucets, timers, vessels, tanks, accessories, wands, wheel reels, and any other fluid device as desired by those of ordinary skill in the art.

In FIG. 10, the coupler system 104 is connected to the nozzle 102 and to the hose 110. The coupler system 104 includes a male connector 132 and a female connector 134. The male connector 132 is connected to the nozzle 102 and is shown as being mated (connected) to the female connector 134. In another embodiment, the fluid device 102 is configured to connect to the female connector 134.

Figure 11:
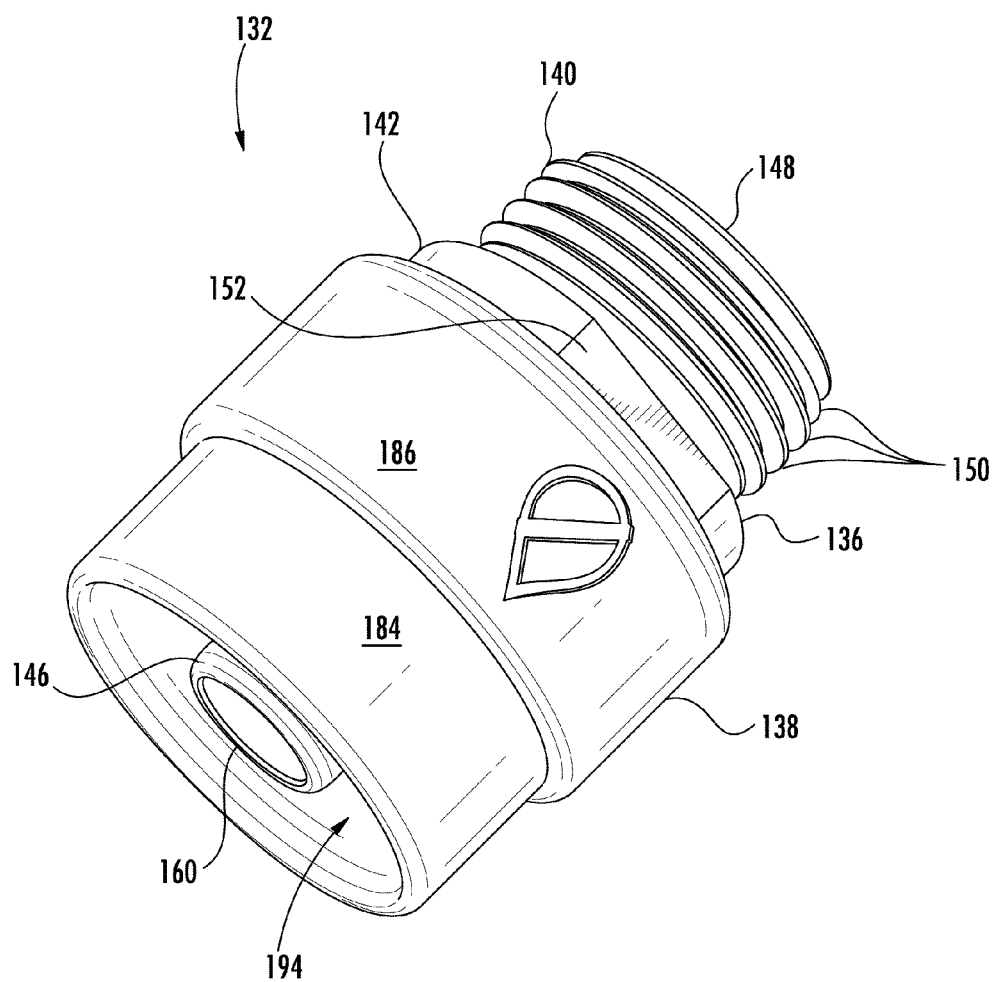
FIG. 11 is a perspective view of a male connector of the first coupler system of FIG. 10.
Figure 12:
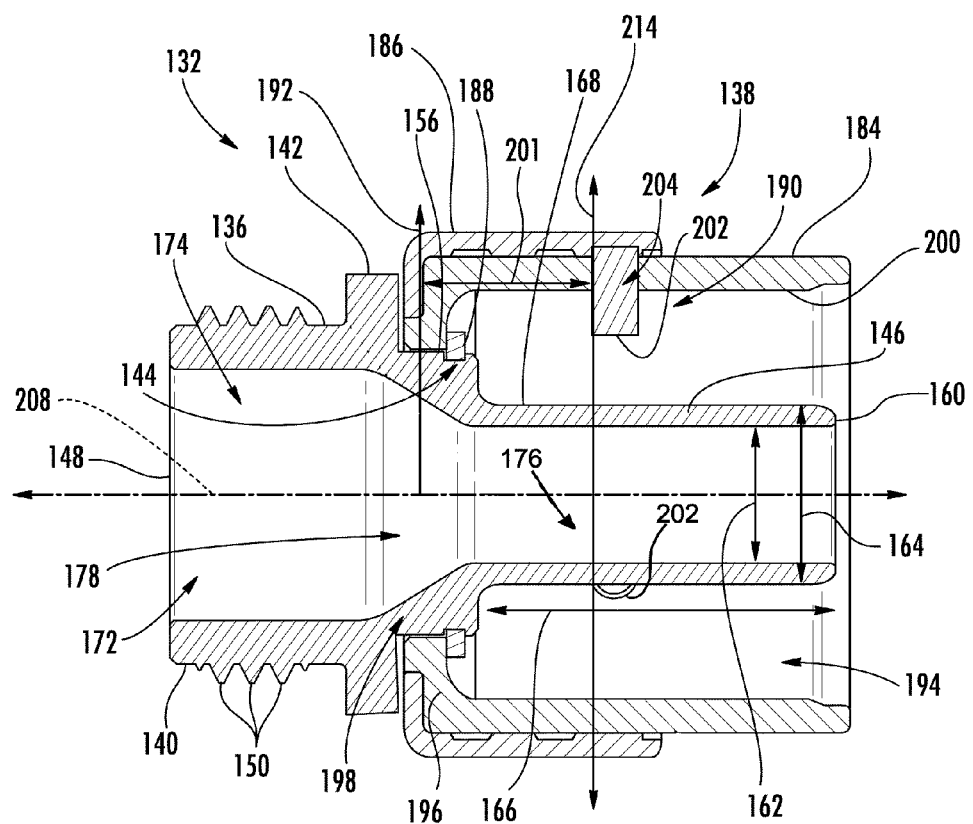
FIG. 12 is a cross sectional view of the male connector of FIG. 11.

With reference to FIGS. 11 and 12, the male connector 132 includes a body portion 136 and a rotating ring assembly 138. The body portion 136 includes a threaded coupling portion 140, a shoulder 142, a ring groove 144 (FIG. 12), and a tube coupling portion 146. The threaded coupling portion 140 is located at an end portion 148 of the body portion 136. The threaded coupling portion 140 defines a plurality of external threads 150 that are configured to engage, for example, the internal threads 126 of the shank 120. In another embodiment, the threaded coupling portion 140 includes a plurality of internal threads that are configured to engage, for example, a fluid device with external threads. In yet another embodiment, depending on the type of application or commonly adopted practice in the market/country, the coupling portion 140 does not require threaded features. For example, in Great Britain, the coupling portion 140 of the connector 132 is connected to the fluid system or vessel using a compression fitting method. Of course, other forms of fittings are possible. The external threads 150 extend approximately from the end portion 148 to the shoulder 142. In another embodiment, the external threads 150 do not extend all the way to the shoulder 142 from the end portion 148, assuming the shoulder is or is not designed into the application. As illustrated, the external threads 150 are sized to correspond to national hose thread; however, in other embodiments the external threads are any size, shape, and configuration as desired by those of ordinary skill in the art.

Figure 13:
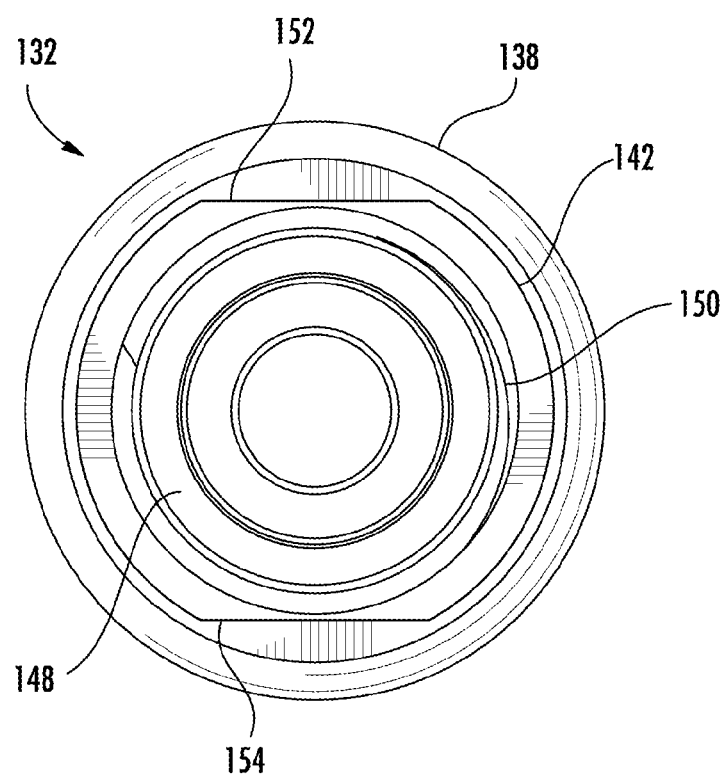
FIG. 13 is a rear elevational view of the male connector of FIG. 11.

The shoulder 142 is located between the threaded coupling portion 140 and the ring groove 144. As shown in FIG. 13, the shoulder 142 is substantially circular and includes a first wrench flat 152 and an opposite second wrench flat 154. The wrench flats 152, 154 are configured to receive a tool (not shown), such as a wrench or pliers, for rotating the body portion 136 or for fixing the position body portion. In another embodiment, the shoulder 142 is circular and does not include the wrench flats 152, 154.

With reference again to FIG. 12, the body portion 136 further defines a journal 156 located between the ring groove 144 and the shoulder 142. The journal 156 is a substantially circular portion of the body portion 136.

The ring groove 144 is located between the shoulder 142 and the tube coupling portion 146 and between the journal 156 and the tube coupling portion. The ring groove 144 is formed completely around the body portion 136.

The tube coupling portion 146 is an elongated cylinder that defines an axial center 208, which also referred to herein as a component axis. The tube coupling portion 146 is located at an opposite end portion 160 of the body portion 136 from the threaded coupling portion 140. The tube coupling portion 146 is shaped as a generally cylindrical tube. The tube coupling portion 146 defines an inside diameter 162 and an outside diameter 164. The diameters 162, 164 are approximately constant along a length 166 of the tube coupling portion 146, and an outer surface 168 of the tube coupling portion 146 is substantially free from abrasions or other irregularities. In another embodiment, instead of being generally cylindrical, the tube coupling portion 146 defines a cross section that is elliptical, triangular, square, rectangular, pentagonal, hexagonal, or any other shape as desired by those of ordinary skill in the art. Similar geometry may be used or applied in any elements of the system 100 as described herein, including elements in the system as depicted in FIG. 1 and the alternative embodiments such as FIG. 9. Furthermore, as shown in FIG. 12, the end portion 160 is substantially perpendicular to the axial center 208 of the male connector 132. In another embodiment, the end portion 160 defines an irregular surface, an angled surface, a notched surface, a curved surface, a keyed surface, or any other surface configuration as desired by those of ordinary skill in the art. Also, in another embodiment a debris barrier or an environmental barrier (not shown) is located in the tube coupling portion 146 and is configured to filter fluid passing therethrough. The tube coupling portion 146, in one embodiment, is formed entirely from an elastomeric material. In some embodiments, the tube coupling portion 146 includes a mix of elastomeric material and other materials or engineered materials.

The body portion 136 defines a fluid channel 172 extending from the end portion 148 to the opposite end portion 160. The fluid channel 172 includes a wide region 174, a narrow region 176, and a funnel region 178. The wide region 174 extends through the threaded coupling portion 140. The narrow region 176 extends through the tube coupling portion 146. The funnel region 178 fluidly couples the wide region 174 to the narrow region 176 and transitions in size accordingly. The body portion 136 is formed from aluminum, die cast aluminum, stainless steel, zinc die cast, brass, iron, plated steel, titanium, platinum, polypropylene, thermoplastic, or any other material desired by those of ordinary skill in the art that is suitable for the type of fluid selected to pass through the fluid channel 172. Additionally, in some embodiments the body portion 136 is one or more of anodized, plated, powder coated, painted, hardened, and/or coated with Teflon®. The body portion 136 is made according to a process that includes machining, forging, and/or engineering.

As shown in FIGS. 11 and 12, the rotating ring assembly 138 includes a coupling ring 184, an overmolded portion 186, a lock ring 188, and a mating feature 190 (FIG. 12). The coupling ring 184 is substantially cylindrical and extends about the end portion 160 of the body portion. The coupling ring 184 is supported by the body portion 136 at a first location 192 along the component axis 208.

The coupling ring 184 defines a cavity 194 and a seat structure 196 (FIG. 12). The coupling ring 184 extends beyond the tube coupling portion 146, such that the tube coupling portion is positioned completely within the cavity 194 to prevent damage to the tube coupling portion. The coupling ring 184 defines the component axis 208. The coupling ring 184 is formed from aluminum, die cast aluminum, stainless steel, zinc die cast, brass, iron, plated steel, titanium, platinum, polypropylene, thermoplastic or any other material as desired by those of ordinary skill in the art. Additionally, in some embodiments the coupling ring 184 is one or more of anodized, plated, powder coated, painted, hardened, and/or coated with Teflon®. The coupling ring 184 is made according to a process that includes machining, forging, and/or engineering.

The seat structure 196 defines an approximately circular seat opening 198 (FIG. 3) through which the body portion 136 is configured to extend into the cavity 194. In particular, the seat structure 196 is positioned against the shoulder 142 and the journal 156, and is configured for continuous rotation about the journal.

The overmolded portion 186 is positioned around the coupling ring 184. The overmolded portion 186 is configured to be gripped by a user. In an exemplary embodiment, the overmolded portion 186 is formed from Santoprene™, another thermoplastic vulcanizates (TPV), or any other elastomer material, as desired by those of ordinary skill in the art. In another embodiment, the male connector 132 does not include the overmolded portion 186 and the coupling ring 184 is knurled or otherwise textured.

The lock ring 188 is located in the ring groove 144 and is configured to rotatably connect the coupling ring 184 to the body portion 136. In particular, the lock ring 188 is configured to trap the seat structure 196 between the shoulder 142 and the lock ring. The lock ring 188 prevents movement of the coupling ring 184 toward the tube coupling portion 146, and the shoulder 142 prevents movement of the coupling ring toward the threaded coupling portion 140. The lock ring 188 is formed from synthetic rubber such as ethylene-propylene-diene monomer (EDPM), nitrile rubber (Buna-N), metal, silicon or any other suitable material as desired by those of ordinary skill in the art. Additionally, in some embodiments, the lock ring 188 is optionally coated with a low friction material, such as Teflon®. The lock ring 188 is resistant to heat, ozone, and hot and cold climates.

Figure 14:
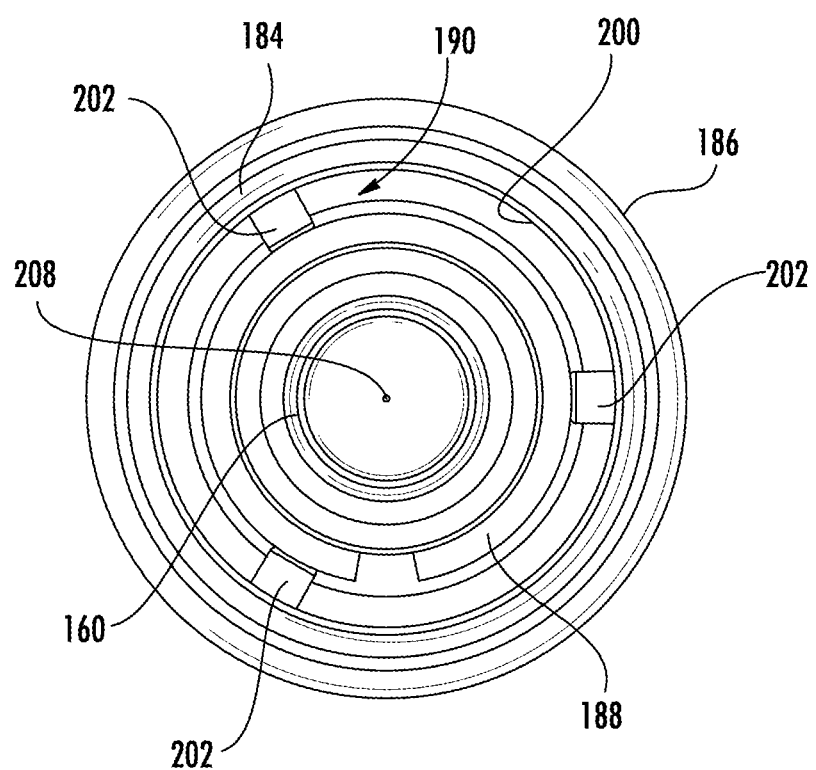
FIG. 14 is a front elevational view of the male connector of FIG. 11.

With reference to FIGS. 12 and 14, the mating feature 190 is formed on an internal surface 200 of the coupling ring 184. The mating feature 190 is spaced apart from the location 192 in a direction away from the threaded coupling portion 140 by a distance 201. The mating feature 190 includes a plurality of protuberances, provided as pins 202, inside the coupling ring. The mating feature 190 can be in other forms such as monolithic or added components to the surface. In yet another embodiment, the surface 200 may be altered or modified to form the mating feature 190. The pins 202 extend through passages 204 (FIG. 12) formed in the coupling ring 184 and are fixedly connected to the coupling ring. The overmolded portion 186 covers one end of the pins 202. In another embodiment, the pins 202 extend from the coupling ring 184 without extending through passages 204 formed in the coupling ring; accordingly, the pins and the coupling ring are an integrally formed monolithic part. In one embodiment, each pin 202 is referred to as a separate mating feature 190 of the connector 132. As illustrated in FIG. 10, the pins 202 are formed on the male connector while the groove 224 is formed on the female connector, however the fitting methods and designs of the groove 224 and the pins 202 can be reversed. For example, the groove 224 is formed on the male connector instead.

The pins 202 are formed from half hard brass, aluminum, stainless steel, or any other suitable material, as desired by those of ordinary skill in the art. The pins 202 have a generally rounded shape, but in other embodiments have any shape as desired by those of ordinary skill in the art. The mating feature 190 includes at least one of the pins 202 depending on the embodiment.

As shown in FIG. 14, the mating feature 190 includes three of the pins 202 equally spaced apart by approximately one hundred twenty degrees. The pins 202 extend toward a center axis 208 of the male connector 132. In one embodiment, the pins 202 extend from the coupling ring 184 for a distance of approximately three millimeters. The pins 202 are coplanar as shown by the plane 214 that extends through each pin 202. Depending on the function application, the dimension of the pins 202 can be configured to predetermined depths.

Figure 15:
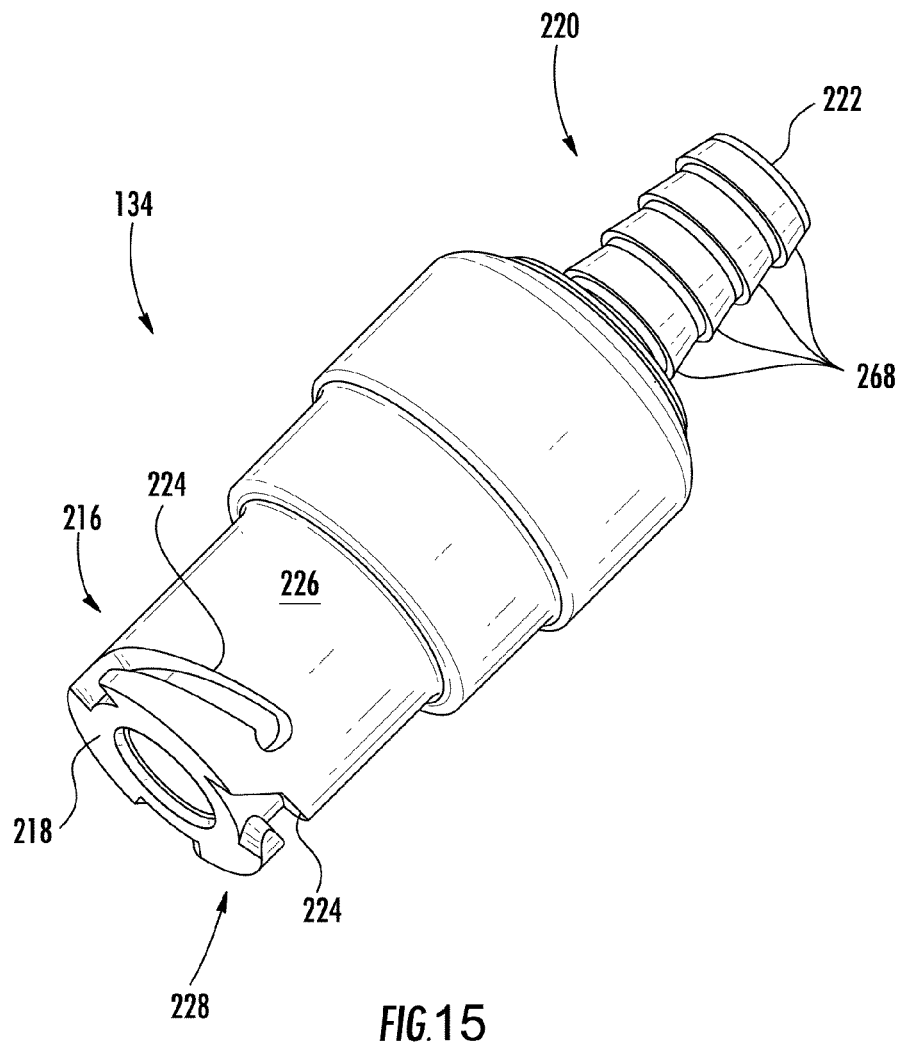
FIG. 15 is a perspective view of a female connector of the first coupler system of FIG. 10.
Figure 16:
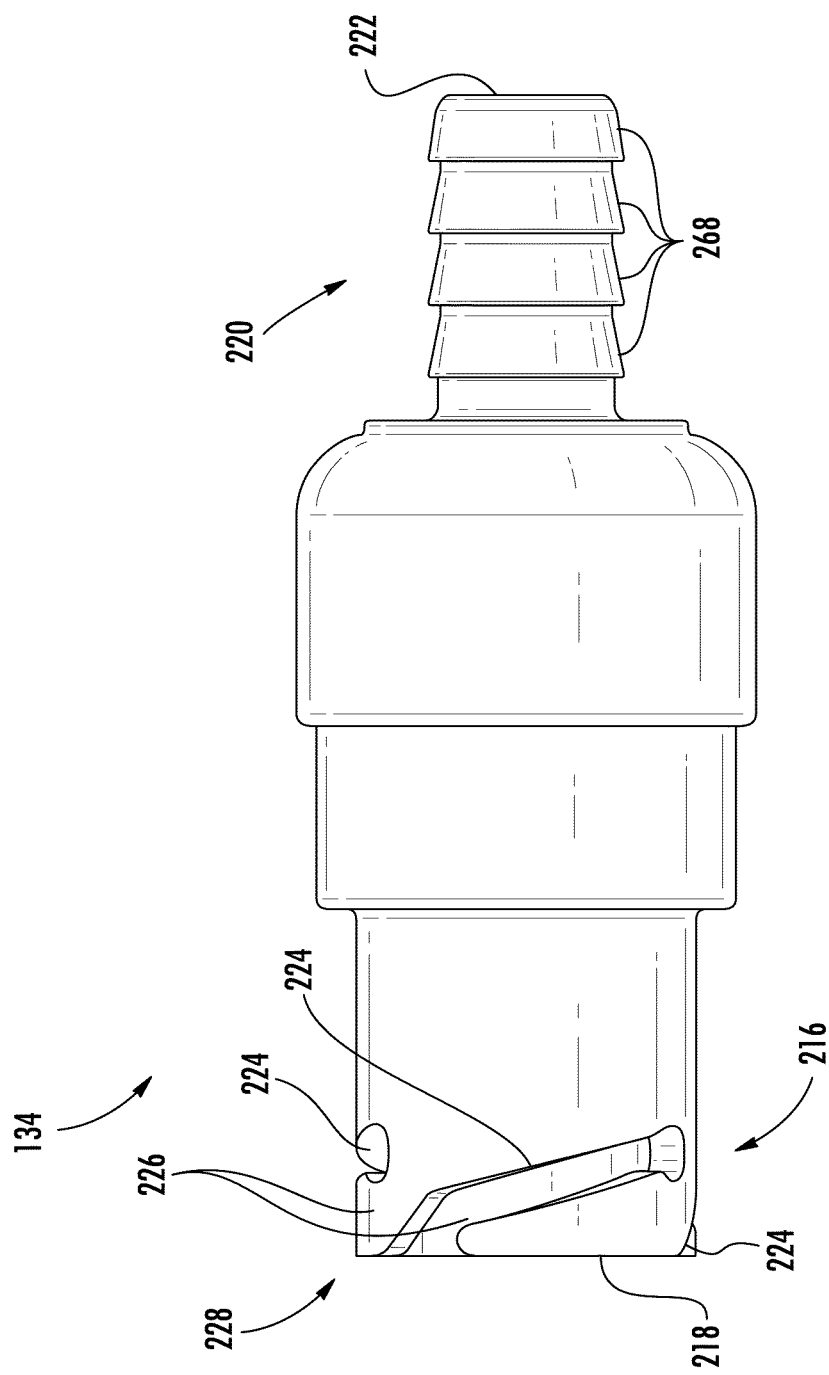
FIG. 16 is a side elevational view of the female connector of FIG. 15 showing a groove of the female connector.

As shown in FIGS. 15 and 16, the female connector 134 is generally cylindrical and includes a grooved coupling portion 216 at a first end portion 218 of the connector 134 and a barbed coupling portion 220 at an opposite end portion 222 of the connector 134. The grooved coupling portion 216 includes an external surface 226 having a mating feature 228 that is configured to couple to the pins 202 of the mating feature 190. The grooved coupling portion 216 defines at least as many grooves 224 as the number of pins 202 defined by the mating feature 190, three in the exemplary embodiment. In one embodiment, each groove 224 is referred to as a separate mating feature 228 of the female connector 134.

The helically shaped grooves 224 extend partially around the exterior surface 226 of the grooved coupling portion 216. The grooved coupling portion 216 includes at least one of the grooves 224 depending on the embodiment. Also, in another embodiment, the grooves 224 are generally "L" shaped, "J" shaped, or any other shape as desired by those of ordinary skill in the art. In yet another embodiment, the grooves 224 are formed on an internal surface female connector 134.

Figure 17:
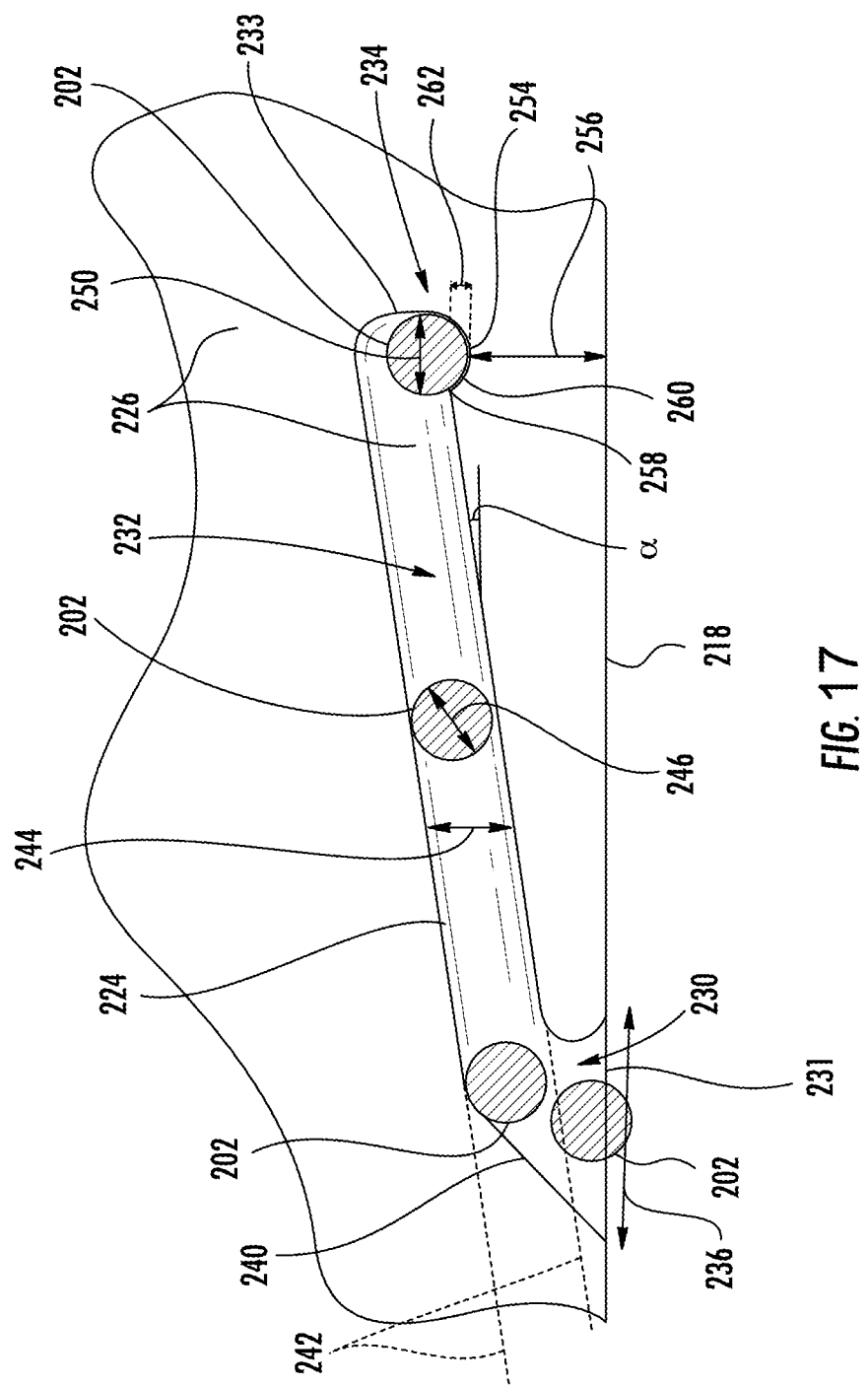
FIG. 17 is an elevational view of a portion of the female connector of FIG. 15 showing a groove.

As shown in FIG. 17, one of the grooves 224 is shown in a flattened view with a pin 202 shown in four different positions. The groove 224 extends from an entry region 230 at a proximal location 231, through a slide region 232, and to a seated region 234 at a distal location 233. The entry region 230 is formed at the end portion 218 of the grooved coupling portion 216. The entry region 230 defines a width 236 that is approximately 1.5 to 2.0 times as wide as the pins 202. Accordingly, the entry region 230 is configured to simplify aligning the pins 202 therewith.

The entry region 230 includes an angled wall 240 that angled with respect to the end portion 218 by approximately forty-five degrees. In another embodiment, the angled wall 240 may be configured to any desired angle. Depending on the function or application, the grooved coupling portion 216 does not require the angled wall 240. The angled wall 240 distinguishes the shape of the groove 224 from the shape of a screw thread as identified by the dashed lines 242.

The slide region 232 defines a height (pitch) 244 that is approximately equal to a diameter 246 of the pins 202. Accordingly, the slide region 232 is configured to enable the pins 202 to slide either towards or away from the seated region 234 in response to rotation of the coupling ring 184 relative to the female connector 134. The slide region 232 extends away from the end portion 218 toward the opposite end portion 222 (FIG. 16). The slide region 232 is formed at an angle α of approximately twenty-five degrees from the end portion 218. When the pins 202 are positioned in the entry regions 230 or the slide regions 232 the male connector 132 is engaged with the female connector 134. In another embodiment, the slide region 232 may be configured to any desired angle.

The seated region 234 extends from the slide region 232 away from the end portion 218 toward the distal location 233, and is configured to terminate the slide region 232. The seated region 234 is configured to receive/to seat the pins 202 when the male connector 132 is connected to the female connector 134. A width 250 of the seated region 234 is approximately equal to the diameter 246 of the pins 202. When the pins 202 are positioned in the seated regions 234 the male connector 132 is mated with the female connector 134. The grooves 224 define a distance between the end portion 218 and a bottom 254 of the seated region 234, which is referred to as a travel distance 256. The travel distance 256 is a maximum axial distance along the center axis 286 that the pins 202 travel during engagement and mating of the male connector 132 to the female connector 134. The distance 201 is at least as large as the travel distance 256.

The seated region 234 includes a knee region 258 and a locking face 260. The knee region 258 is located adjacent to the slide region 232 and is a rounded surface against which the pin 202 is configured to move. The locking face 260 is configured to contact the pin 202 when the pin is seated in the seated region 234. The locking face 260 defines a height 262 that is at least approximately a third of the diameter 246 of the pin. In another embodiment, the height 262 may be configured to conform to the mating feature 190. The locking face 260 is located an angle of approximately one hundred degrees from the end portion 218. In another embodiment, the locking face 260 is located at angle between approximately ninety to one hundred ten degrees. In another embodiment, the locking face 260 may be configured to any desired angle.

With reference again to FIGS. 15 and 16, the barbed coupling portion 220 includes a barbed mating feature 266 defining a plurality of barbs 268 and a bore 270. The barbs 268 are frustoconical shaped surfaces that are configured for placement within a fluid conductor, such as the hose 110 (as shown in FIG. 10). In another embodiment, any protrusion or indentation to form the coupling portion 220 is possible. When positioned in the hose 110, the barbs 268 grip the hose to prevent separation of the hose from the barbed coupling portion 220. In another embodiment, instead of the barbed coupling portion 220 the female connector 134 includes a deformable shank (not shown) or another connector configured to make a fluid tight connection with the hose 110, as desired by those of ordinary skill in the art.

Figure 18:
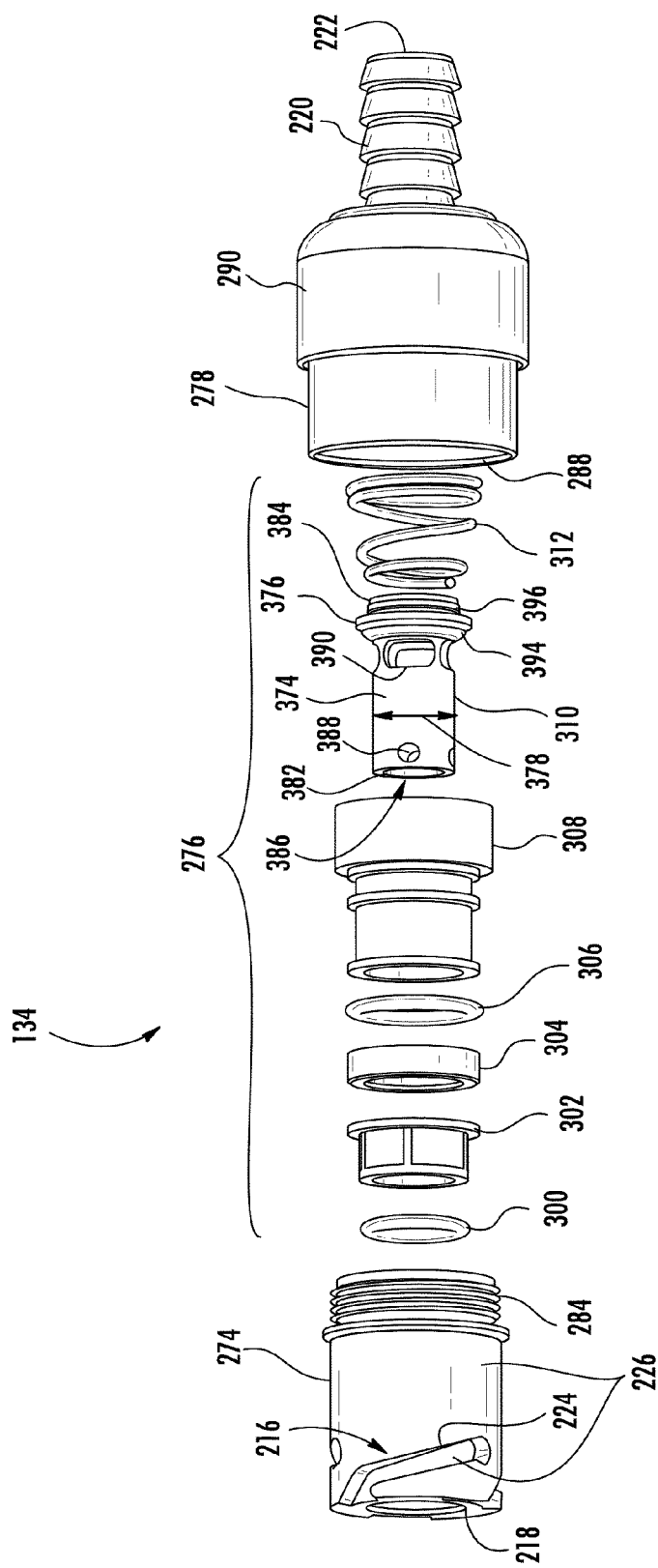
FIG. 18 is an exploded perspective view of the female connector of FIG. 15.
Figure 19:
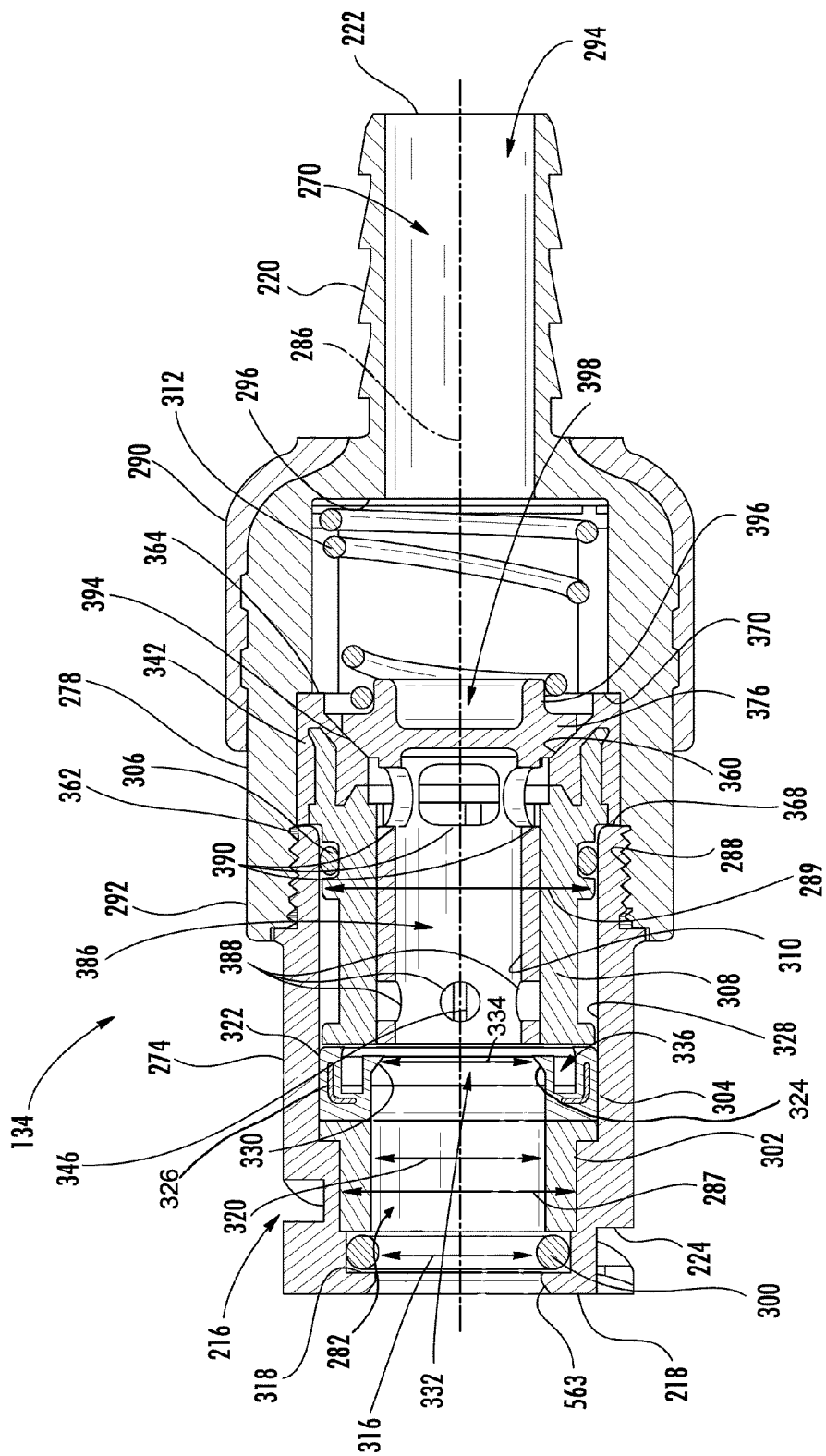
FIG. 19 is a cross sectional view of the female connector of FIG. 15.
Figure 20:
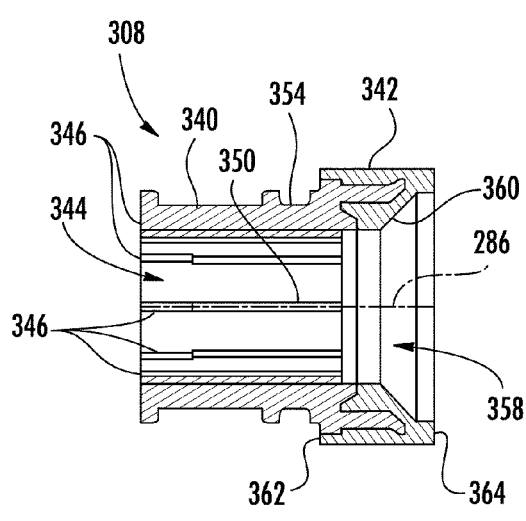
FIG. 20 is a cross sectional view of a shuttle guide structure of the female connector of FIG. 15.

As shown in FIGS. 18 and 19, the female connector 134 includes a left body portion 274, an internal assembly 276 (FIG. 18), and a right body portion 278. The left body portion 274 is connected to the right body portion 278. The left body portion 274 includes the grooved coupling portion 216 and defines a coupling channel 282 (FIG. 19) and a plurality of external threads 284 (FIG. 18). The coupling channel 282, which is also referred to herein as a fluid channel, extends completely through the left body portion 274 from the end portion 218 to the external threads 284. The coupling channel 282 is centered about an axial center 286 of the female connector 134. The coupling channel 282 is configured to receive the tube coupling portion 146.

The coupling channel 282 includes a first diameter portion 283 and a second diameter portion 285. The first diameter portion 283 extends from the end portion 218 to the second diameter portion 285. The first diameter portion 283 defines a maximum diameter 287. The second diameter portion 285 extends from the first diameter portion 283 toward barbed coupling portion 220. The second diameter portion 285 defines another maximum diameter 289. The maximum diameter 289 defined by the second diameter portion 285 is larger than the maximum diameter 287 defined by the first diameter portion 283. Additionally, the second diameter portion 285 is sized to receive a fluid passing structure, such as the tube coupling portion 146, of a body, such as the body portion 136, coupled to the left body portion 274.

The left body portion 274 is formed from aluminum. In another embodiment, the left body portion 274 is formed from stainless steel, brass, thermoplastic, or any other material as desired by those of ordinary skill in the art. In yet another embodiment, the grooved coupling portion 216 is formed from a metal or a metal alloy and the rest of the left body portion 274 is formed from another material, such as thermoplastic or any other material as desired by those of ordinary skill in the art.

The left body portion 274, including the exterior 226 and the grooved coupling portion 216, is anodized to make the grooves 224 resistant to wear from the pins 202. In one particular embodiment, the grooved coupling portion 216, including the knee region 258, is coated with a Type III hard coat anodized coating. In another embodiment, the left body portion 274 is hardened according to any other process as desired by those of ordinary skill in the art. Also in another embodiment, the left body portion 274 is at least one of painted, plated, hardened, and powder coated.

The right body portion 278 defines a plurality of internal threads 288 and the barbed coupling portion 220 and includes an overmolded portion 290. The internal threads 288 are configured to mesh with the external threads 284 of the left body portion 274 to connect the left body portion to the right body portion 278 and establish a fluid tight and leak free seal between the left body portion and the right body portion. In another embodiment, the threads 284 of the left body portion 274 are formed on an inner wall 328 of the left body portion 274 and in communication with the coupling channel 282 and the threads 288 are formed on an outer wall 292 of the right body portion 278. Other fitting methods such as a pressed fitting, a tapered fitting, a shrink fitting, a welded fitting, a snap fitting, or the like, or combination thereof are possible. In at least one embodiment, thread locker, thread sealer, epoxy, adhesive, or the like such as Loctite® 267 is applied to the threads 284, 288 to further establish a fluid tight and leak free seal between the left body portion and the right body portion. In another embodiment, any sealant desired by those of ordinary skill in the art is applied to the threads 284, 288. In some embodiments, the right body portion 278 is at least one of anodized, painted, plated, hardened, and powder coated.

The overmolded portion 290 is formed on the right body portion 278 and is configured to be gripped by a user. The overmolded portion 290 is formed from an elastomeric material, a rigid coating, or the like as desired by those of ordinary skill in the art. Thermoplastic vulcanizates (TPV) is one example of the elastomeric material. In another embodiment, the female connector 134 does not include the overmolded portion 290 and the right body portion 278 is knurled or otherwise textured.

The right body portion 278 further defines a fluid channel 294 and a shoulder 296. The fluid channel 294 extends through the right body portion 278 from the internal threads 288 to the barbed coupling portion 220. The fluid channel 294 is centered about the axial center 286 of the connector 134. The shoulder 296 extends about the fluid channel 294.

As shown in FIGS. 18 and 19, the internal assembly 276 (FIG. 18) includes an o-ring seal 300, a spacer structure 302, a lip seal member 304, an o-ring seal 306, a shuttle guide structure 308, a shuttle 310, and a biasing member 312. The o-ring seal 300 is a resilient seal member located in the first diameter portion 283 of the coupling channel 282 and configured to extend about the coupling channel. The o-ring seal 300 defines an inner diameter 316 that is slightly less than the outer diameter 164 (FIG. 12) of the tube coupling portion 146 and is configured to stretch to enable the tube coupling portion to pass therethrough. The o-ring seal 300 is located between a shoulder 318 of the left body portion 274 and the spacer structure 302.

The spacer structure 302 is located in the coupling channel 282 and is configured to extend about the coupling channel. The spacer structure 302 defines an inner diameter 320 that is slightly larger than the outer diameter 164 of the tube coupling portion 146 and is configured to enable the tube coupling portion to pass therethrough. The inner diameter 320 is slightly larger than the inner diameter 316 of the o-ring seal 300. The spacer structure 302 simplifies manufacturing of the left body portion 274 by eliminating a machining step of cutting a groove for the o-ring seal 300.

The lip seal member 304, also referred to herein as a lip seal or a resilient seal member, is located in the second diameter portion 285 of the coupling channel 282 between the spacer structure 302 and the shuttle guide structure 308 and is configured to extend about the coupling channel. The lip seal 304 defines a "U" shaped cross section and includes an outer seal 322 and an inner seal 324. The outer seal 322 abuts the inner wall 328 defining the second diameter portion 285. The outer seal 322 includes a rigid ring provided as a ring member 326 located therein. The ring member 326 is rigid and resists deformation as the lip seal 304 is press fit into the left body portion 274. When the lip seal 304 is press-fit into the left body portion 274 the lip seal abuts the spacer structure 302, and the outer seal 322 is prevented from moving in the axial direction along the axial center 286. Accordingly, the fixed location of the lip seal 304 prevents movement of the spacer structure 302. In some embodiments, instead of being press fit into the left body portion 274, the outer seal 322 is connected to the left body portion with any form of attachment such as an adhesive.

The inner seal 324 of the lip seal 304 is radially spaced apart from the outer seal 322 and is resiliently movable relative to the outer seal 322. The inner seal 324 includes a beveled portion 330 that defines a circular passage 332 having a diameter 334. The diameter 334 is slightly less than the outside diameter 164 of the tube coupling portion 146. Accordingly, the inner seal 324 is configured to stretch slightly in response to the tube coupling portion 146 extending therethrough, such that at least a portion of the inner seal moves closer to the outer seal 322 in response to the tube coupling portion extending therethrough. As the inner seal 324 wears, the beveled edge 324 remains in contact with the tube coupling portion 146. In another embodiment, a biasing member (not shown) at least partially surrounds the inner seal 324 to bias the inner seal towards the axial center 286. An exemplary biasing member for surrounding the inner seal 324 is a spring having its first end connected to its second end. The length 166 of the tube coupling portion 146 is selected such that when the mating feature 190 is mated with the mating feature 228, the tube coupling portion engages the o-ring seal 300 and the lip seal 304.

The lip seal 304 defines a fluid cavity 336 between the inner seal 324 and the outer seal 322. The fluid cavity 336 is a "U" shaped cavity and is open on an upstream side of the lip seal 304. As described below, the fluid cavity 336 is configured to receive a supply of fluid (such as water) when the coupler system 104 is in use.

The shuttle guide structure 308 is partially located in the coupling channel 282 of the left body portion 274 and the fluid channel 294 of the right body portion 278. The shuttle guide structure 308 is configured to extend about the coupling channel 282 and the fluid channel 294 and is centered about the axial center 286.

Figure 33:
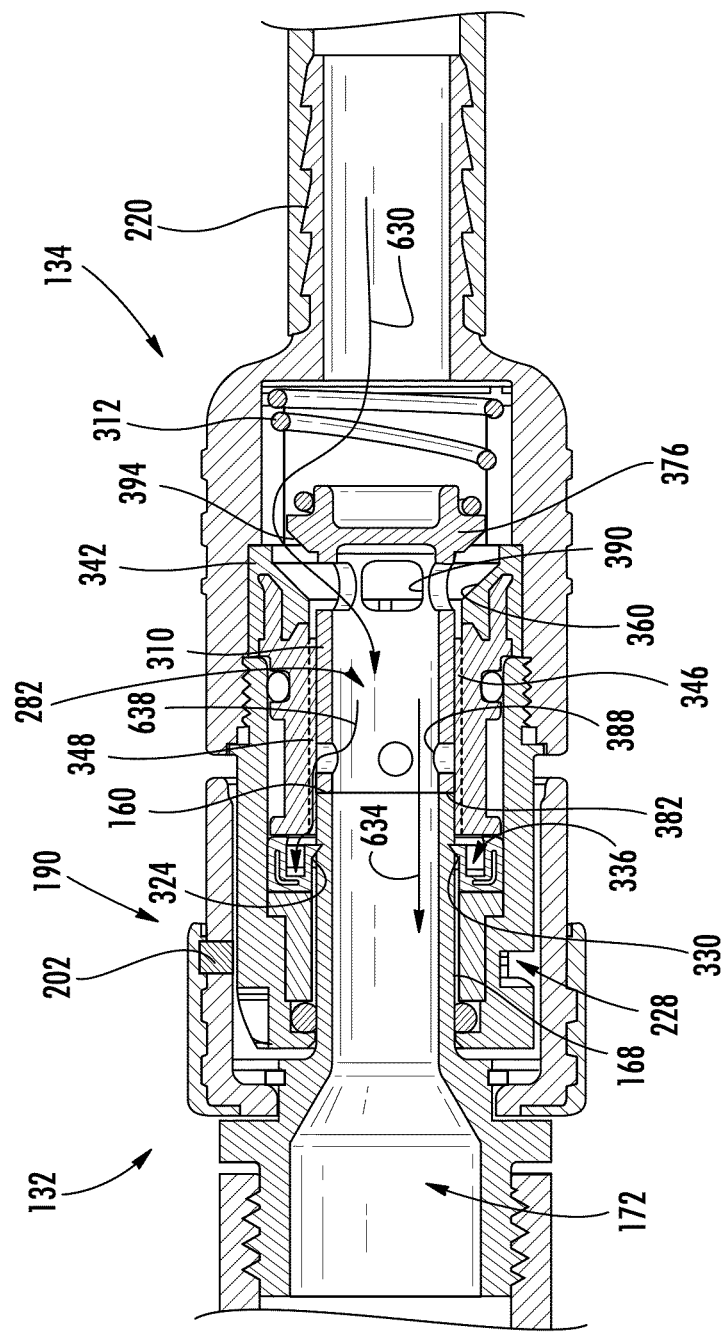
FIG. 33 is a cross sectional view of the male connector of FIG. 11 and the female connector of FIG. 15, with the male connector shown connected to the female connector.
Figure 34:
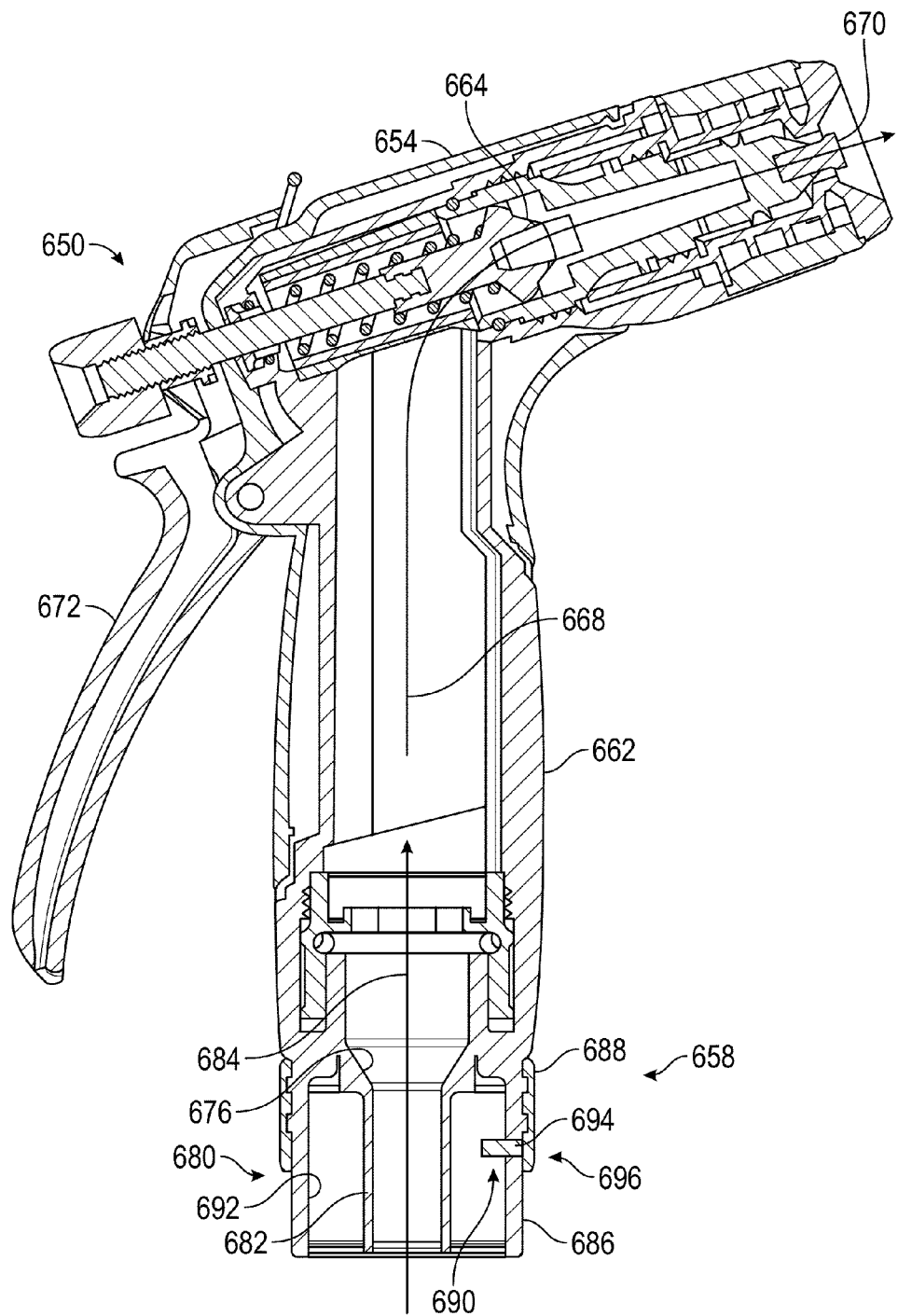
FIG. 34 is cross sectional view of a nozzle apparatus including a male connector integrally formed therewith.

As shown in FIGS. 33 and 34, the shuttle guide structure 308 includes a guide portion 340 and an overmolded seal 342. The overmolded seal 342 may be formed as a separate component, depending on the desired application, and is optionally connected to the structure 308. The guide portion 340 is at least partially positioned within the channel 282 on the upstream side of the lip seal 304. The guide portion 340 defines a cylindrical passage 344 from which a plurality of ribs 346 extends radially inward toward the axial center 286. In the exemplary embodiment, the guide portion 340 includes eight of the ribs 346, which are equally spaced apart from each other. Other numbers of ribs 346 are possible and do not limit the scope of the disclosure. In another embodiment, none of the ribs 346 are included. In yet another embodiment, the guide portion 340 is provided with either a guiding feature (not shown) in a formed or shape other than a rib or a guiding surface. A plurality of fluid channels 348 is defined between the ribs 346. The fluid channels 348 are generally arc shaped. A radially inner surface of each rib 346 defines a guide surface 350 configured to guide the shuttle 310. A guide diameter 352 is defined between diametrically opposite ribs 346. The guide portion 340 also defines an exterior seal groove 354 configured to receive the o-ring seal 306. The guide portion 340 is formed from thermoplastic, aluminum, brass, or any other material as desired by those of ordinary skill in the art.

The overmolded seal 342 is formed around and is connected to the guide portion 340. The overmolded seal 342 is formed from an elastomeric material, rigid coating, or the like as desired by those of ordinary skill in the art. Thermoplastic vulcanizates (TPV) is one example of the elastomeric material. The overmolded seal 342 or a separate component (not shown) that is either separate or integral to the shuttle guide structure 308 defines a fluid passage 358 through a beveled valve seat 360, a left annular seal surface 362, and a right annular seal surface 364. The beveled valve seat 360, also referred to herein as a valve seat surface, is free from gates, sink marks, flash, and parting lines and is substantially uniform. The beveled valve seat 360 is angled with respect to the axial center 286. Depending on the application, the seat 360 does not require a beveled surface, but is still able to restrict fluid flow.

As shown in FIG. 19, the left annular seal surface 362 contacts the left body portion 274 and the right body portion 278 and is configured to form a fluid tight and leak free connection therebetween. In particular, the left annular seal surface 362 is forced against an end surface 368 of the left body portion 274.

The right annular seal surface 364 is also configured to form a fluid tight and leak free connection between the left body portion 274 and the right body portion 278. The right annular seal surface 364 is biased against a shoulder 370 of the right body portion 278 to prevent fluid from flowing between the overmolded seal 342 and the right body portion.

With reference again to FIG. 18, the shuttle 310 is movable within the coupling channel 282, the passage 344 defined by the guide portion 340, and the fluid passage 358 defined by the overmolded seal 342. The shuttle 310 includes a cylindrical portion provided as an extending portion 374 and a flange 376. The extending portion 374 extends from the flange 376 in a downstream direction and is generally cylindrical and is sized to fit within the passage 344 of the guide portion 340. In particular, an outside diameter 378 of the extending portion 374 is slightly less than the diameter 352 of the passage 344 so that the extending portion is slidable against the guide surfaces 350 between a valve open position (FIG. 33) and a valve closed position (FIG. 19). Although the system 100 illustrated herein includes the shuttle 310 to shut off the fluid from entering into the fluid passage 358, it is understood that the system 100 can be designed without the shuttle 310 and yet maintain the leak free and fluid tight seal.

The extending portion 374 defines an first end portion provided as an open end portion 382, an opposite second end portion provided as a closed end portion 384, and a shuttle fluid passage 386 extending therebetween. In another embodiment, both the first end portion and the second end portion are closed, and the fluid bypasses the shuttle 310. In yet another embodiment, one of the first end portion and the second end portion may be open and the other end portion may be closed.

The extending portion 374 further defines a plurality of auxiliary ports 388 and a plurality of main ports 390. The auxiliary ports 388 are approximately circular passages through the extending portion 374 to the fluid passage 386. In the illustrated embodiment, four of the auxiliary ports 388 are evenly spaced apart from each other. In another embodiment, the auxiliary ports 388 are rectangular, rounded rectangular, triangular, or any other shape as desired by those of ordinary skill in the art. The auxiliary ports 388 are configured to enable fluid to flow from the fluid passage 386 to the fluid passages 348 defined by the ribs 346 and then to the cavity 336. In another embodiment, the ports 388 are optional and yet the shuttle 310 remains configured to feed the fluid therethrough via bypass.

The main ports 390 are rounded rectangle shaped passages through the extending portion 374 to the fluid passage 386. In the illustrated embodiment, four of the main ports 390 are evenly spaced apart from each other. In another embodiment, the main ports 390 are rectangular, rounded rectangular, triangular, or any other shape as desired by those of ordinary skill in the art. In another embodiment, the ports 390 are optional and yet the shuttle 310 remains configured to feed the fluid therethrough via bypass.

The flange 376 of the shuttle 310 extends radially outwardly from the extending portion 374 away from the axial center 286. The flange 376 includes a seal surface 394 and a spring surface 369 and defines a debris cavity 398 (FIG. 19). The seal surface 394 is a substantially annular surface that is angled with respect to the axial center 286. The angle of the seal surface 394 corresponds to the angle of the beveled valve seat 360. Accordingly, the shuttle 310 and beveled valve seat 360 form a valve configurable in the valve closed position (FIG. 19) and the valve open position (FIG. 33). In particular, the seal surface 394 is configured to form a fluid tight and leak free seal with the beveled valve seat 360 when the shuttle is in the valve closed position. In the valve open position, the seal surface 394 and the beveled valve seat 360 are configured to enable fluid to pass therebetween. Furthermore, the length 166 of the tube coupling portion 146 is selected such that when the mating feature 190 is mated with the mating feature 228, the tube coupling portion engages the shuttle 310.

The spring surface 396 extends approximately perpendicularly from the axial center 286 and is a generally flat annular surface.

The debris cavity 398 is formed on the closed end 384 of the shuttle 310. The debris cavity 398 is isolated from the fluid passage 386.

The biasing member 312 is located in the fluid channel 394 between the spring surface 396 and the shoulder 296. In the illustrated embedment, the biasing member 312 is shown as a compression spring. The biasing member 312 is configured to bias the seal surface 394 into sealing contact with the beveled valve seat 360 and to bias the male connector 132 away from the female connector 134, when the mating feature 190 and the mating feature 228 are mated. In another embodiment, the biasing member 312 is at least one of a conical spring, a wave spring, a straight spring, and a pneumatic biasing member, such as a bladder and the like. Accordingly, the biasing member 312 is any biasing member as desired by those of ordinary skill in the art. Also, in some embodiments, the female connector 134 does not include the biasing member 312. Additionally, in some embodiments, a second biasing member (not shown) is located on an opposite side of the spring surface 396 from the biasing member 312. The second biasing member is also configured to bias the shuttle 310 toward the beveled valve seat 360.

With reference again to FIG. 10, the coupler system 106 is connected to the hose 110 and to the sillcock 108. The coupler system 106 includes a male connector 420 and a female connector 422. The male connector 420 is mated to the hose 110 and to the female connector 422.

Figure 22:
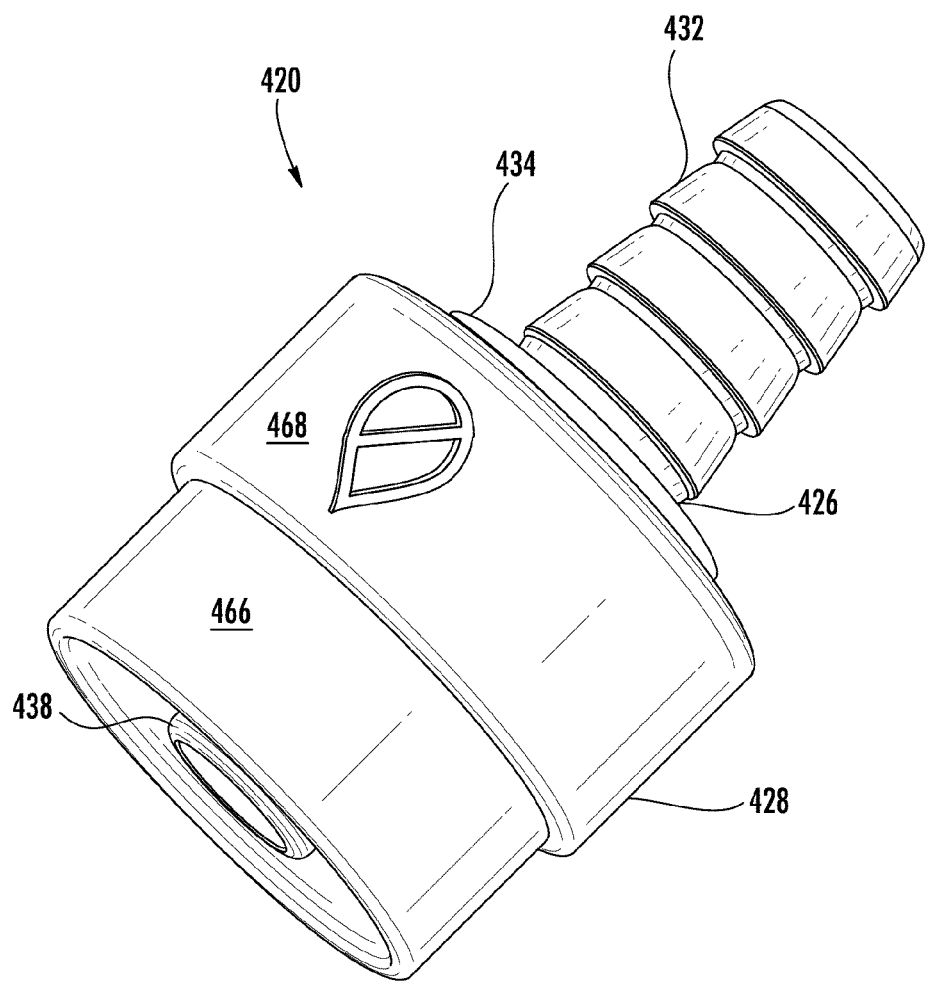
FIG. 22 is a perspective view of a male connector of the second coupler system of FIG. 10.
Figure 23:
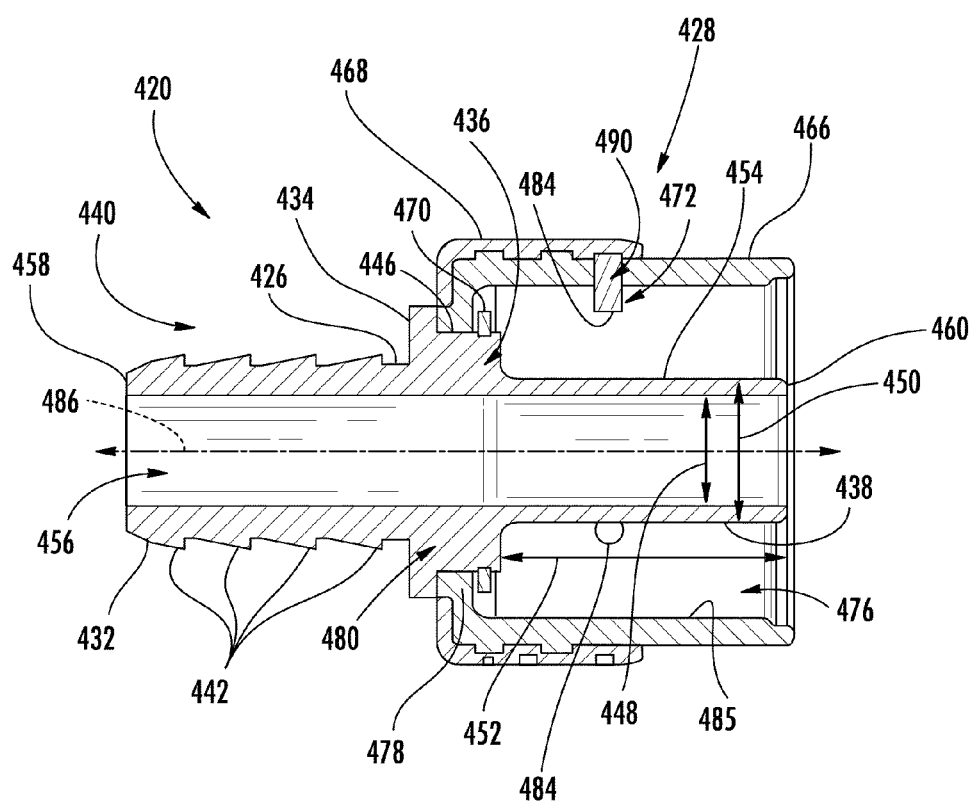
FIG. 23 is a cross sectional view of the male connector of FIG. 22.

With reference to FIGS. 22 and 23, the male connector 420 includes a body portion 426 and a rotating ring assembly 428. The body portion 426 includes a barbed coupling portion 432, a shoulder 434, a ring groove 436 (FIG. 23), and a tube coupling portion 438. The shoulder 434 and the ring groove 436 are optional and are not included in certain applications. The barbed coupling portion 432 includes a barbed mating feature 440 defining a plurality of barbs 442. In another embodiment, any protrusion or indentation to form the coupling portion 432 is possible. The hose available in other markets such as in Europe does not require a threaded feature or a barbed feature. Instead the connector 420 is mechanically connected to the hose or the fluid system using compression fitting method. Of course, other forms of fittings are possible. As illustrated, the body portion 426, the rotating ring assembly 428, and other optional features are formed as separate components. In another embodiment, the entire system is formed as a single unit.

The shoulder 434 is located between the barbed coupling portion 432 and the ring groove 436. The shoulder 434 is substantially circular.

The body portion 426 further defines a journal 446 located between the ring groove 436 and the shoulder 434. The journal 446 is a substantially circular portion of the body portion 426.

The ring groove 436 is located between the shoulder 434 and the tube coupling portion 438, and between the journal 446 and the tube coupling portion. The ring groove 436 is formed completely around the body portion 426.

The tube coupling portion 438 is located opposite from the barbed coupling portion 432. The tube coupling portion 438 is shaped as a generally cylindrical tube. The tube coupling portion 438 defines an inside diameter 448 and an outside diameter 450. The diameters 448, 450 are approximately constant along a length 452 of the tube coupling portion 438, and an outer surface 454 of the tube coupling portion 438 is substantially free from abrasions or other irregularities.

The body portion 426 defines a fluid channel 456 extending from an end portion 458 of the body portion to an opposite end portion 460 of the body portion. The body portion 426 is formed from aluminum, brass, thermoplastic, or any other material desired by those of ordinary skill in the art that is suitable for the type of fluid configured to pass through the fluid channel 456.

As shown in FIGS. 22 and 23, the rotating ring assembly 428 includes a coupling ring 466, an overmolded portion 468, a lock ring 470 (FIG. 23), and a mating feature 472 (FIG. 23). The coupling ring 466 is substantially cylindrical and extends about the end portion 460 of the body portion 426. The coupling ring 466 defines a cavity 476 and a seat structure 478. The coupling ring 466 extends beyond the tube coupling portion 438, such that the tube coupling portion is positioned completely within the cavity 476 to prevent damage to the tube coupling portion. The coupling ring 466 is formed from zinc, steel, bronze, titanium, aluminum, brass, stainless steel, thermoplastic or any other material as desired by those of ordinary skill in the art. In another embodiment, the rotating ring assembly 428 is not used to couple the connector 420 to the connector 422, 134. The barbed mating feature 440 and the tube coupling portion 438 is integrated into a single unit and is connected to the connector 422, 134. A secondary element (not shown) is then actuated to connect the single unit 440, 438 to the connector 422, 134 in place.

The seat structure 478 defines an approximately circular seat opening 480 through which the body portion 426 is configured to extend into the cavity 476. In particular, the seat structure 478 is positioned against the shoulder 434 and the journal 446, and is configured for continuous rotation about the journal.

The overmolded portion 468 is located on the coupling ring 466. The overmolded portion 468 is configured to be gripped by a user. In an exemplary embodiment, the overmolded portion is formed from an elastomeric material, rigid coating, or the like as desired by those of ordinary skill in the art. Thermoplastic vulcanizates (TPV) is one example of the elastomeric material. The elastomeric material can be multi layer, snap on by two or more similar materials, or solid material.

The lock ring 470 is located in the ring groove 436 and is configured to rotatably connect the coupling ring 466 to the body portion 426. In particular, the lock ring 470 is configured to trap the seat structure 478 between the shoulder 434 and the lock ring 470. The lock ring 470 prevents movement of the coupling ring 466 toward the tube coupling portion 438, and the shoulder 434 prevents movement of the coupling ring toward the barbed coupling portion 432.

The mating feature 472 includes a plurality of protuberances, provided as pins 484 extending towards an axial center 486 of the body portion 426 from the coupling ring 466. The mating feature 472 can be in other forms such as monolithic or added components to the surface. In yet another embodiment, an inner surface 485 of the coupling ring 466 may be altered or modified to form the mating feature 472. The pins 484 extend through passages 490 formed in the coupling ring 466 and are fixedly connected to the coupling ring. The overmolded portion 468 covers one end of the pins 484. In another embodiment, the pins 484 extend from the coupling ring 466 without extending through passages 490 formed in the coupling ring; accordingly, the pins and the coupling ring are an integrally formed monolithic part. The pins 490 are formed from half hard brass, brass, aluminum, stainless steel, or any other suitable material, as desired by those of ordinary skill in the art. The pins 484 have a generally rounded shape, but in other embodiments have any shape as desired by those of ordinary skill in the art. The mating feature 472 includes at least one of the pins 484, depending on the embodiment. As illustrated in FIG. 23, the pins 484 are formed on the coupling ring 466 while the grooves 216 are formed on the connector 134; however, the fitting methods and designs of the grooves 216 and the pins 484 can be reversed. For example in one embodiment, the grooves 216 are formed on the male connector 132 and the pins 484 extend from the connector 134. Similarly, the fitting methods and designs can also be incorporated in the system.

The mating feature 472 includes three of the pins 484 equally spaced apart by approximately one hundred twenty degrees (only two of the pins are shown in FIG. 23). The pins 484 extend from the coupling ring 466 toward the axial center 486. In one embodiment, the pins 484 from the coupling ring 466 approximately three millimeters.

Figure 24:
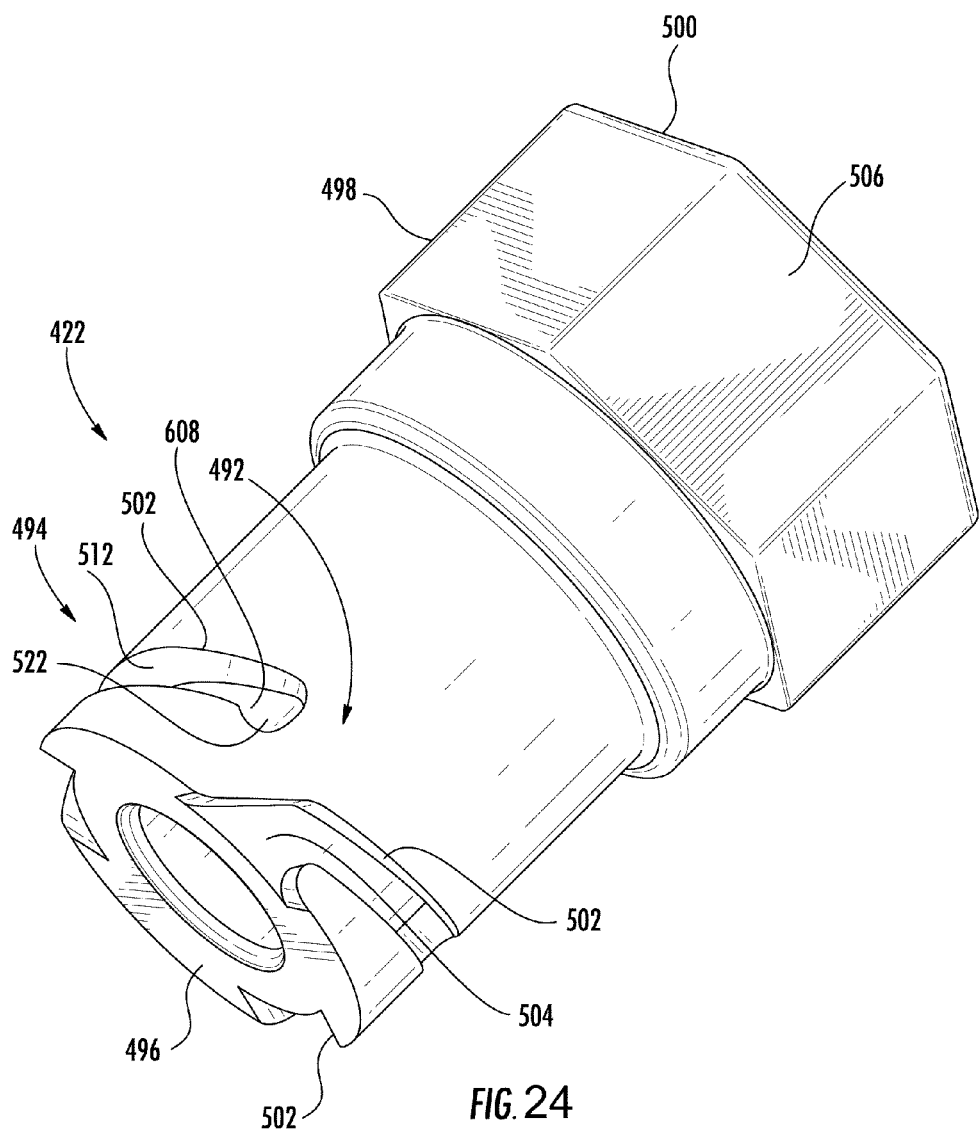
FIG. 24 is a perspective view of a female connector of the second coupler system of FIG. 10.
Figure 25:
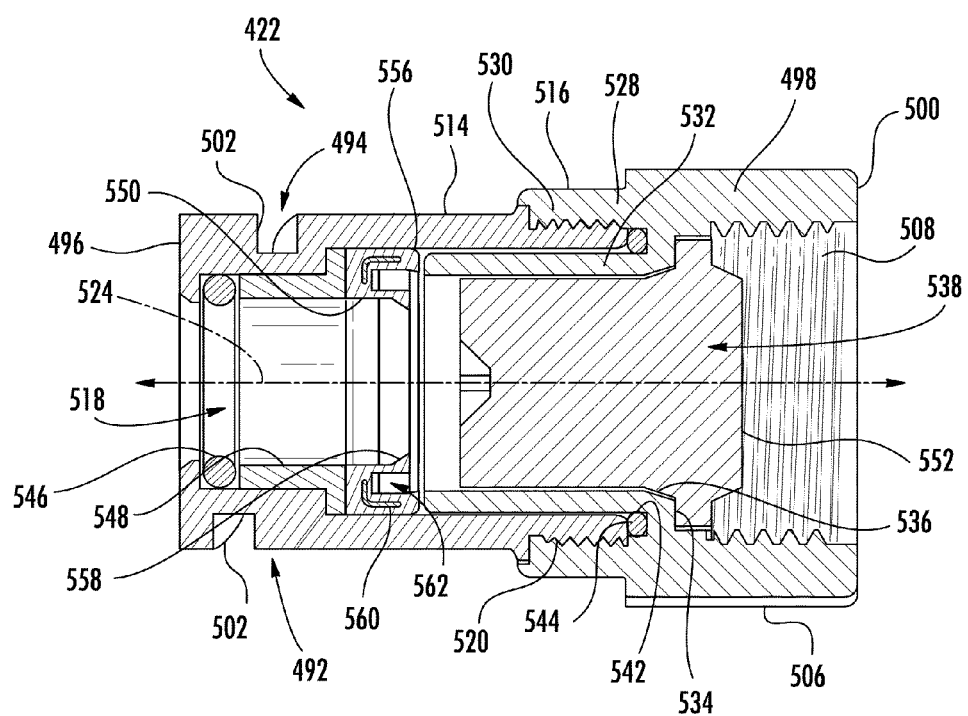
FIG. 25 is a cross sectional view of the female connector of FIG. 24.

As shown in FIGS. 24 and 25, the female connector 422 is generally cylindrical and includes a mating feature 492 including a grooved coupling portion 494 at a first end portion 496 and a threaded coupling portion 498 at an opposite second end portion 500. The grooved coupling portion 494 is configured to couple to the pins 484 of the mating feature 472. The grooved coupling portion 494 defines at least as many grooves 502 as the number of pins 484 defined by the mating feature 472, three in the exemplary embodiment. The helically shaped grooves 502 are identical to the grooves 224 and include an entry region 504, a slide region 512, and a seated region 522. In another embodiment, the grooves 502 are "L" shaped or any other shape as desired by those of ordinary skill in the art.

The threaded coupling portion 498 defines an exterior connection surface 506 and a plurality of internal threads 508. The exterior connection surface 506 is hexagonal and is configured to mate with an approximately sized wrench or spanner. The internal threads 508 are configured to mate with external threads 510 (FIG. 10) of the sillcock 108.

As shown in FIG. 25, the female connector 422 includes a left body portion 514 connected to a right body portion 516. The left body portion 514 includes the grooved coupling portion 494 and defines a coupling channel 518 and a plurality of external threads 520. The coupling channel 518 extends completely through the left body portion 514 from the end portion 496 to the external threads 520. The coupling channel 518 is centered about an axial center 524 of the connector 422. The left body portion 514 is formed from aluminum. In another embodiment, the left body portion 514 is formed from stainless steel, brass, thermoplastic, or any other material as desired by those of ordinary skill in the art. The left body portion 514 is identical to the left body portion 274 for at least reasons of ease of assembly and ease of manufacturing.

The right body portion 516 includes a body 528 that defines a plurality of internal threads 530 and a passage structure 532. The internal threads 530 are configured to mesh with the external threads 520 to connect the left body portion 514 to the right body portion 516 and to establish a fluid tight and leak free seal between the left body portion and the right body portion. In at least one embodiment, thread locker, thread sealer, epoxy, adhesive, or the like is applied to the threads 520, 530 and is used to connect the left body portion 514 to the right body portion 516 and to assist in establishing a fluid tight and leak free seal between the left body portion and the right body portion. In some embodiments, the right body portion 516 is at least one of anodized, painted, plated, hardened, and powder coated.

The passage structure 532 extends from the body 528 at a point between the internal threads 530 and the internal threads 508. The passage structure 532 defines a shoulder 534, a beveled edge 536, and a substantially cylindrical fluid passage 538 therethrough.

A pocket 542 is defined between the body 528 and the passage structure 532. An o-ring seal 544 is located in the pocket 542 and is configured to further establish a fluid tight and leak free seal between the left body portion 514 and the right body portion 516.

The right body portion 516 further includes an o-ring seal 546, a spacer structure 548, a lip seal member 550, and a flanged seal member 552. The o-ring seal 546 is located in the coupling channel 518 and is configured to extend about the coupling channel. The o-ring seal 546 is identical to the o-ring seal 300.

The spacer structure 548 is located in the coupling channel 518 and is identical to the spacer structure 302.

The lip seal 550, which is identical to the lip seal 304, is also located in the coupling channel 518 and is configured to extend about the coupling channel. The lip seal 550 defines a "U"-shaped cross section and includes an outer seal 556 and an inner seal 558. The outer seal 556 includes a ring member 560 located therein. The ring member 560 is rigid and resists deformation as the lip seal 550 is press fit into the left body portion 514. When the lip seal 550 is press-fit into the left body portion 514, the outer seal 556 is prevented from moving in the axial direction. Accordingly, the lip seal 550 prevents movement of the spacer structure 548. In some embodiments, instead of being press fit into the left body portion, the outer seal 556 is connected to the left body portion 514 with an adhesive.

The lip seal 550 defines a fluid cavity 562 between the inner seal 558 and the outer seal 556. The fluid cavity 562 is a "U" shaped cavity. As described below, the fluid cavity 562 is configured to receive a supply of fluid when the coupler system 106 is in use.

Figure 26:
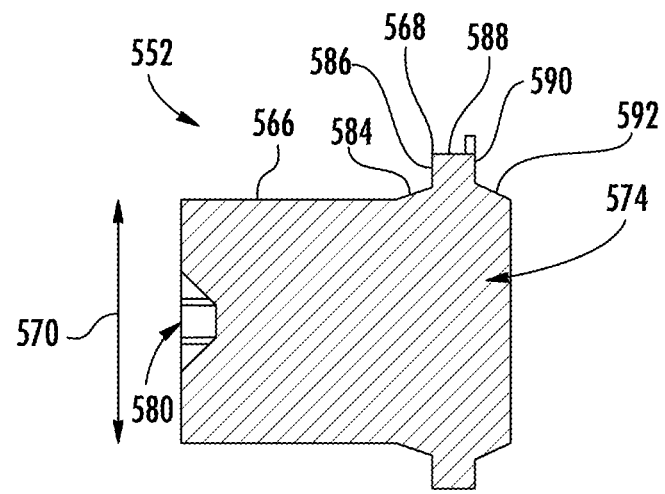
FIG. 26 is a cross sectional view of a flanged seal member of the female connector of FIG. 24.
Figure 27:
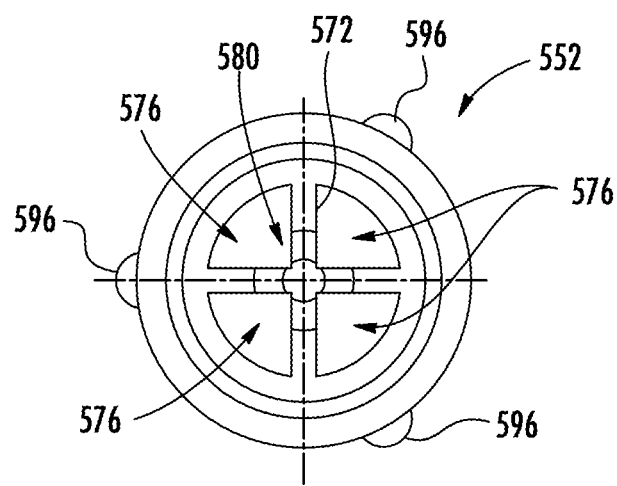
FIG. 27 is front elevational view of the flanged seal member of FIG. 26.

As shown in FIGS. 26 and 27, the flanged seal member 552 includes a cylinder portion 566 and a flange member 568. The cylinder portion 566 defines a diameter 570 that is greater than the outside diameter 450 of the tube coupling portion 438. The cylinder portion 566 extends from the flange member 568 and includes ribs referred to herein as a wall structure 572 that divides a passage 574 through the cylinder portion into sub-passages 576. In the exemplary cylinder portion 566 the wall structure 572 divides the passage 574 into four of the sub-passages 576. A notch space 580 is formed in the wall structure 572. The length 166 of the tube coupling portion 146 is selected such that when the mating feature 190 is mated with the mating feature 228, the tube coupling portion engages the cylinder portion 566. One or more sub-passage 576 may be configured, depending on the application. In another embodiment, the cylinder portion 566 does not include the sub-passages 576. In another embodiment, the flanged seal member 552 includes the wall structure 572, but does not include the surrounding cylinder portion 566. The flanged seal member 522 is overmolded in one example, and is formed as multiple pieces including structures described above.

The flanged seal member 522 is formed from a resilient elastomer material or any other material as desired by those of ordinary skill in the art. Accordingly, the flanged seal member 522 is configured to resist compression in the axial direction (i.e. in the direction of the axial center 524). In another embodiment the flanged seal member 522 and the left body portion 514 are an integral and monolithic part formed using at least a two-step molding process that makes the flanged seal member inseparable from the left body portion without destroying at least one of the flanged seal member and the left body portion. In yet another embodiment, the flanged seal member 522 is overmolded into the female connector 498.

The flange member 568 includes a left beveled surface 584, a left annular surface 586, an outer annular surface 588, a right annular surface 590, and a right beveled surface 592. The left beveled surface 584 is positioned against the beveled edge 536 of the passage structure 532. The left annular surface 586 abuts the shoulder 534 of the passage structure 532. The outer annular surface 588 is positioned against the body 528. The right annular surface 590 and at least a portion of the right beveled surface 592 are positioned against the sillcock 108, as shown in FIG. 10.

The flange member 568 further includes three bump members provided as tab members 596, which are configured to prevent rotation of the flanged seal member 522 within the fluid passage 538. The flange member 568 may include any number of the tab members 596. In some embodiments, the flange member 568 does not include the tab members 596.

Figure 28:
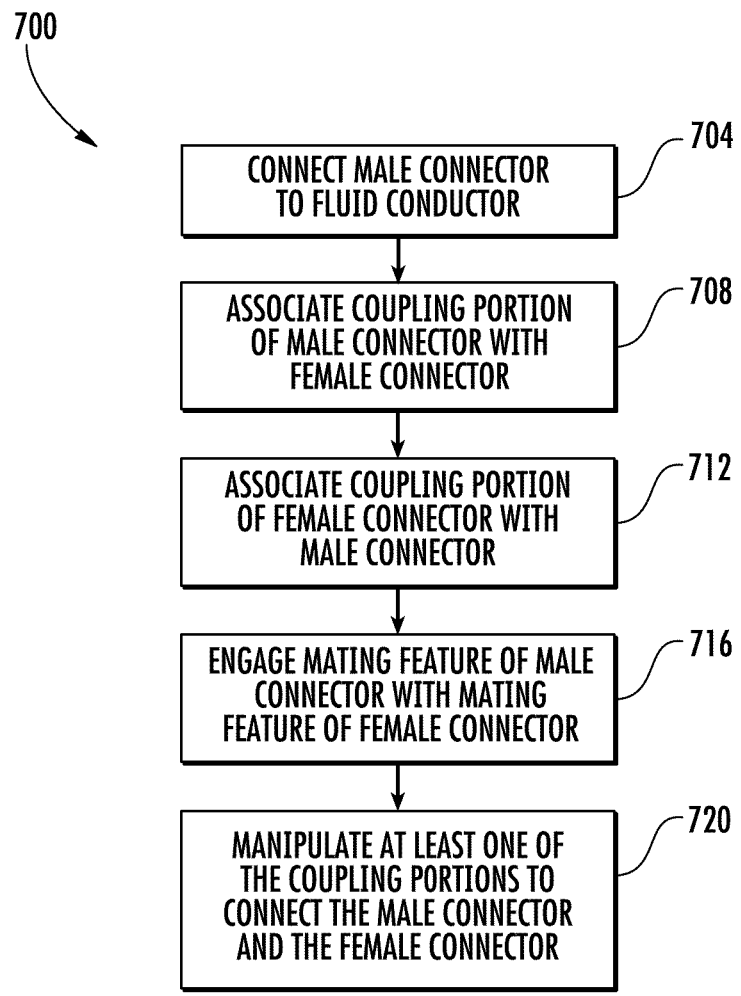
FIG. 28 is a flowchart illustrating a method of operating the fluid system of FIG. 10.
Figure 29:
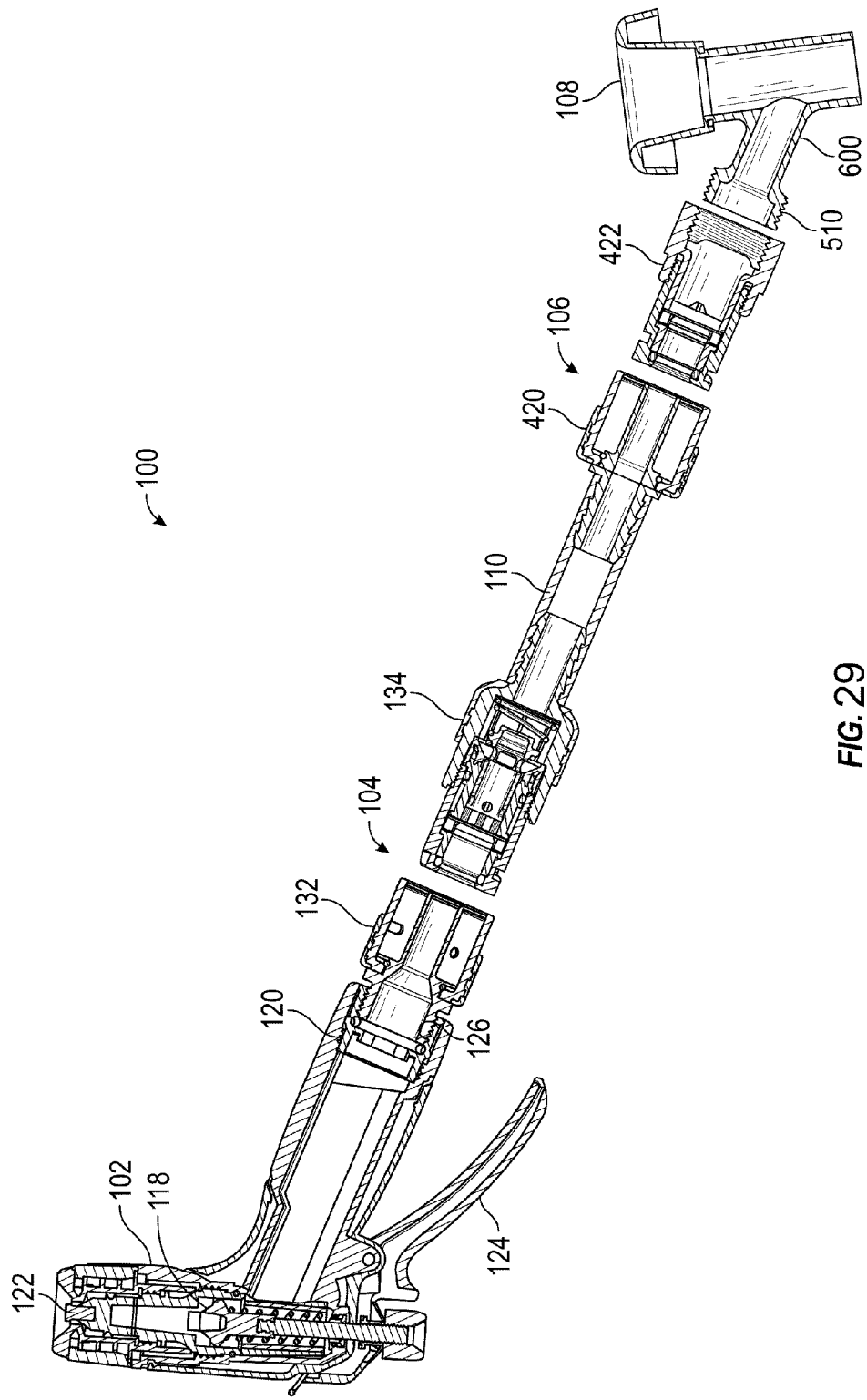
FIG. 29 is a cross sectional view of the fluid system of FIG. 10 shown in disconnected configuration.

In operation, the fluid system 100 is configured to perform a method 700 shown in FIG. 28, which includes a method of manipulating the coupler systems 104, 106. With reference to FIG. 29, the fluid system 100 is shown partially disconnected, with the sillcock 108 disconnected from the female connector 422, the male connector 420 disconnected from the female connector 422, and the female connector 134 disconnected from the male connector 132. The fluid system 100 is shown partially disconnected since the male connector 132 is shown, in this example, as being connected to the nozzle 102.

Figure 30:
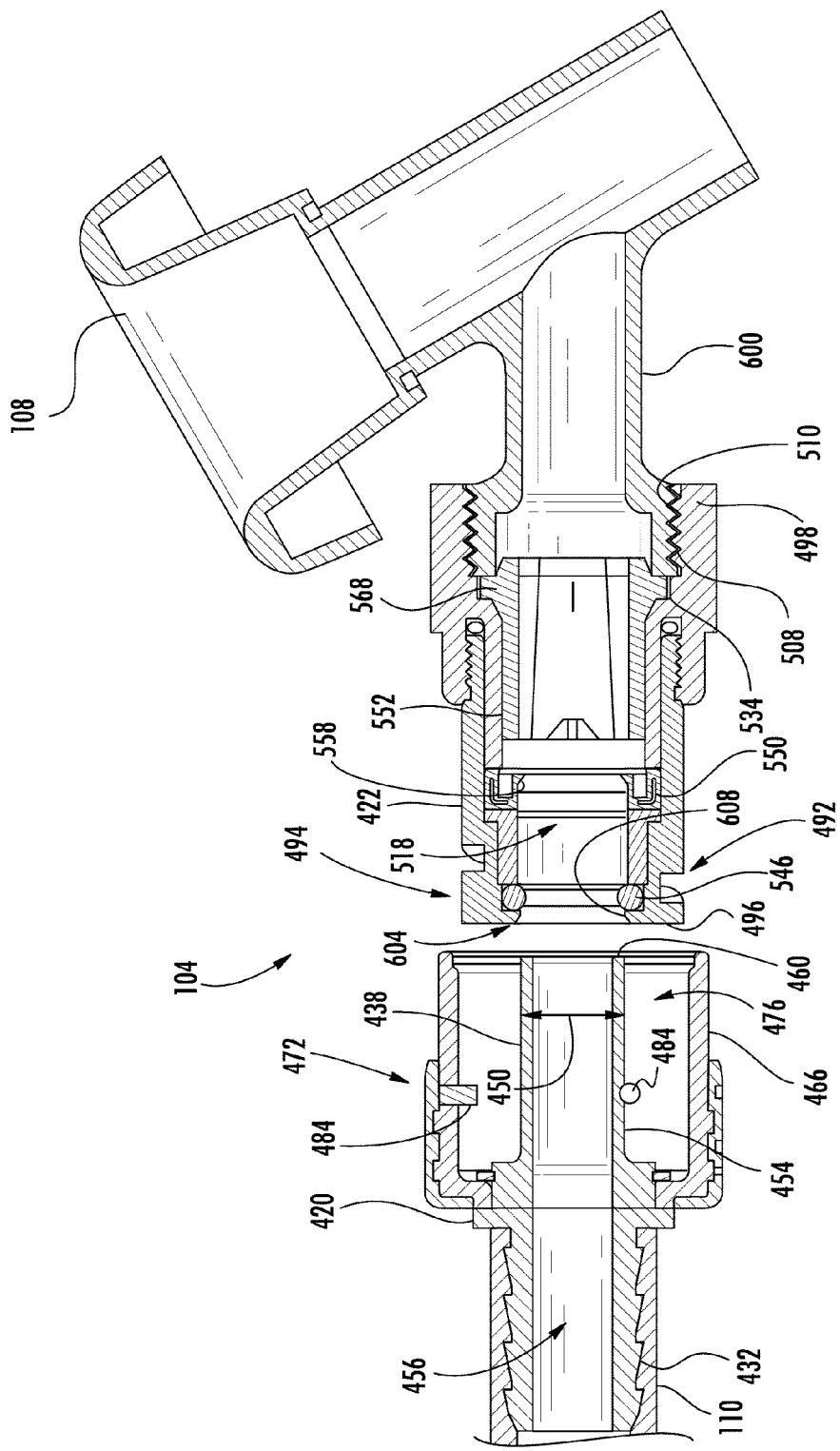
FIG. 30 is a cross sectional view of the male connector of FIG. 22 and the female connector of FIG. 24, with the male connector shown disconnected from the female connector and the female connector shown connected to the sillcock of FIG. 10.

With reference to FIG. 30, first the sillcock 108 is positioned in a closed configuration that prevents fluid from flowing through a bib portion 600 thereof.

Next, the female connector 422 is connected to the bib portion 600 by threading the internal threads 508 of the threaded coupling portion 498 onto the external threads 510 of the bib portion 600. When the threaded coupling portion 498 reaches the seated position shown in FIG. 30, the flange member 568 is compressed between the shoulder 534 and the bib portion 600 to establish a fluid tight and leak free seal between the bib portion and the threaded coupling portion. Additionally, the compression prevents axial movement of the flange member 568 along the axial center 524.

Then, as shown in block 704 of FIG. 28, the male connector 420 is connected to a fluid conductor, such as the hose 110 by inserting the barbed coupling portion 432 into the hose. The barbed coupling portion 432 establishes a fluid tight and leak free connection between the fluid channel 456 and the hose 110.

With reference to block 708, next the tube coupling portion 438 of the male connector 420 is associated with the female connector 422. In particular, the male connector 420 is moved axially in the direction of the bib portion 600 until the tube coupling portion 438 begins to enter the coupling channel 518 by passing through a mouth opening 604 formed in the end portion 496 and opening to the coupling channel 518. The end portion 496 includes a chamfer 608 to enable smooth passage and easy alignment of the tube coupling portion 438 with the mouth opening 604.

Then, the male connector 420 is moved further toward the bib portion 600 so that the tube coupling portion 438 is inserted into the coupling channel 518. Specifically, at this stage of the connection process, the tube coupling portion 438 is moved through the o-ring seal 546. Since, the o-ring seal 546 is slightly smaller in diameter than the outside diameter 450 of the tube coupling portion 438, the o-ring seal 546 forms a fluid tight seal against the tube coupling portion. Additionally, the o-ring seal 546 prevents debris on the tube coupling portion 438 from moving past the o-ring seal 546, which debris could potentially damage or wear the lip seal 550. The male connector 420 is moved in the direction of the bib portion 600 until the pins 484 of the mating feature 472 contact the end portion 496.

As shown in block 712, during the above movement of the tube coupling portion 438 into the coupling channel 518, the grooved coupling portion 494 of the female connector 422 is associated with the male connector 420. In particular, the grooved coupling portion 494 is inserted into the cavity 476 defined by the coupling ring 466 of the ring assembly 428.

Figure 31:
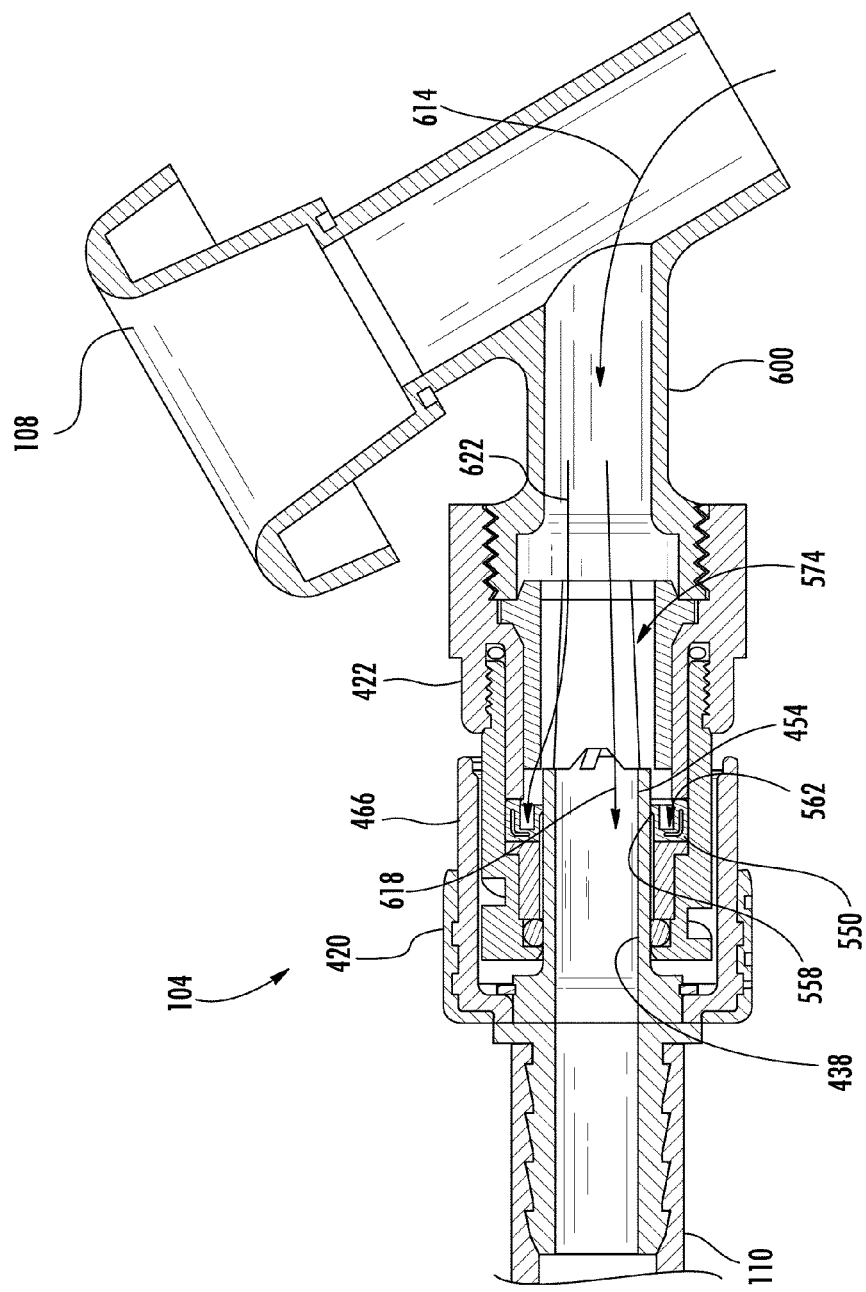
FIG. 31 is a cross sectional view of the male connector of FIG. 22 and the female connector of FIG. 24, with the male connector shown connected to the female connector and the female connector shown connected to the sillcock of FIG. 10.

With reference to block 716 and FIG. 31, next the coupling ring 466 is rotated to engage the mating feature 472 of the male connector 420 with the mating feature 492 of the female connector 422. To begin the engagement, the coupling ring 466 is rotated in a clockwise direction (in this embodiment) until the pins 484 are aligned with the entry regions 504 (FIG. 24) of the grooves 502. When the alignment occurs, pressure is applied to the male connector 420, which moves the male connector toward the bib portion 600 and causes the pins 484 to enter the entry regions 504. Additionally, the movement of the male connector 420 causes the tube coupling portion 438 to move through the inner seal 558 of the lip-seal 550, which establishes a fluid tight connection between inner seal and the outer surface 454 of the tube coupling portion 438.

Next, as shown in block 720, the coupling ring 466 is manipulated to connect the male connector 420 to the female connector 422. In particular, the coupling ring 466 is rotated relative to the female connector 422 in a connecting direction to cause the pins 484 enter the slide regions 512 (FIG. 24) of the grooves 502. The rotational force applied to the coupling ring 466 causes the male connector 420 to move axially toward the bib portion 600 as the pins 484 slide toward the seated regions 522 (FIG. 24), much the same way that a screw top bottle cap moves axially towards or away from the bottle in response to being rotated without any axially directed force from the user.

The above-described axial movement of the male connector 420 causes the tube coupling portion 438 to move within the coupling channel 518 towards the flanged seal member 552. During this movement the end portion 460 pushes against the cylinder portion 566 and compresses the cylinder portion.

The coupling ring 466 is rotated relative to the female connector 422 in the connecting direction until the pins 484 become seated in the seat regions 522 of the grooves 502. Accordingly, rotation of the coupling ring 466 causes the pins 484 to be positioned at knees 608 (FIG. 24) of the grooves 502 and compresses the flanged seal member 552. As the pins 484 are rotated past the knees 608 the flanged seal member 552 functions as a biasing member and the resiliency of the flanged seal member, pushes the male connector 420 away from bib portion 600 until the pins are seated in the seated regions 522 (see rightmost pin 202 in FIG. 17). The movement of the male connector 420 away from the bib portion 600 is rapid and causes the coupling system 106 to emit a sound as the pins 484 are quickly snapped against the grooves 502. The sound is audible to most users a "click" or a "snap" to alert the user that a connection has been established between the male connector 420 and the female connector 422. Additionally, when the pins 484 are snapped against the grooves 502 a vibration is felt by most users as tactile feedback to further alert the user that a connection has been established between the male connector 420 and the female connector 422.

With reference to FIG. 31, next, fluid 614 to the hose 110 is initiated by opening the sillcock 108. The fluid flows through the passage 574 in the cylinder portion 566 of the flanged seal member 552. In particular, a first flow path 618 of fluid flows through the passage 574, into the tube coupling portion 438, and then into the hose 110. A second flow path 622 of fluid flows through the passage 574 then flows outside of the tube coupling portions 438 and into the cavity 562 defined by the lip seal 550. The fluid in the cavity 562 develops a pressure that biases the inner seal 558 against the outer surface 454 of tube coupling portion 438 to further establish a fluid tight and leak free connection between the male connector 420 and the female connector 422.

Figure 32:
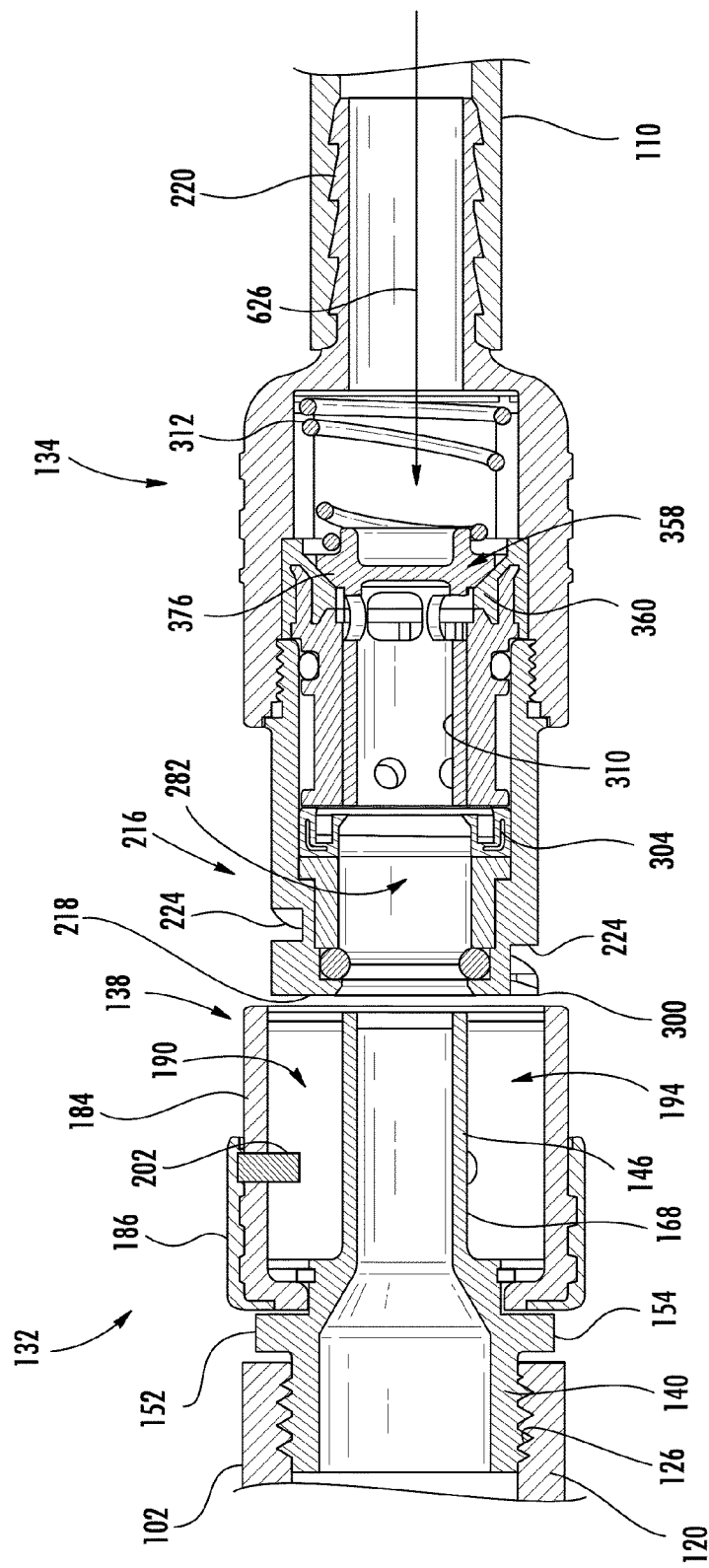
FIG. 32 is a cross sectional view of the male connector of FIG. 11 and the female connector of FIG. 15, with the male connector shown disconnected from the female connector.

As shown in FIG. 32, as the fluid flows through hose 110 it reaches the female connector 134, which is disconnected from the male connector 132. As shown by the fluid flow path 626, the fluid is prevented from flowing through the passage 358 in the overmolded seal 342, since the flange 376 of the shuttle 310 is sealed against the beveled valve seat 360 to close the valve defined by the shuttle and the overmolded seal. The biasing member 312 and the pressure of the fluid from the hose 110 forces the flange 376 against the beveled valve seat 360. As such, in the configuration shown in FIG. 10, when the female connector 134 is disconnected from the male connector 132, the female connector prevents fluid from flowing through the coupling channel 282 even though fluid is being supplied from the sillcock 108.

Next, the user selects a fluid conductor or fluid device, such as the nozzle 102, and then connects the male connector 132 to the fluid conductor. Specifically, the threaded coupling portion 140 is connected to the internal threads 126 of the shank 120. Typically, during the connection, the nozzle 102 is held stationary and the threaded coupling portion 140 is rotated. A wrench (not shown) may be used against the wrench flats 152, 154 to achieve a desirable level of tightness. A fluid tight and leak free connection is established between the threaded coupling portion 140 and the nozzle 102.

Thereafter, the male connector 132 is engaged and then mated to the female connector 134. To mate the connectors 132, 134, first the male connector 132 is moved toward the female connector 134 so that the grooved coupling portion 216 is received by the cavity 194 defined by the coupling ring 184. Thereafter, the male connector 132 is moved axially in the direction of the barbed coupling portion 220 until the tube coupling portion 146 beings to enter the coupling channel 282. In particular, the male connector 132 is moved axially in the direction of the bib portion 600 until the tube coupling portion 146 begins to enter the coupling channel 282 by passing through a mouth opening 563 formed in the end portion 218 and opening to the coupling channel 282. The mouth opening 563 is configured to receive the tube coupling portion 146.

Then, the male connector 132 is moved further toward the barbed coupling portion 220 so that the tube coupling portion 146 is moved through the o-ring seal 300. Since, the o-ring seal 300 is slightly smaller in diameter than the outside diameter 164 of the tube coupling portion 146, the o-ring seal 300 forms a fluid tight seal against the outer surface 168 tube coupling portion. Additionally, the o-ring seal 300 prevents debris on the tube coupling portion 146 from moving past the o-ring seal 300, which debris could potentially damage or wear the lip seal 304. The male connector 132 is moved in the direction of the barbed coupling portion 220 until the pins 202 of the mating feature 190 contact the end portion 218.

Rotating Coupling Ring

Next with reference to FIG. 33, the ring assembly 138 is rotated to engage the mating feature 190 of the male connector 132 with the mating feature 228 of the female connector 134. To begin the engagement, the ring assembly 138 is rotated in a clockwise direction (in this embodiment) until the pins 202 are aligned with the entry regions 230 (FIG. 17) of the grooves 224. In another embodiment, the ring assembly 138 is rotated counterclockwise. When the alignment occurs, pressure is applied to the male connector 132, which moves the male connector toward the barbed coupling portion 220 and causes the pins 202 to enter the entry regions 230, at which point the male connector is engaged with the female connector 134. Also, the movement of the male connector 132 causes the tube coupling portion 146 to move through the inner seal 324 of the lip seal 304 which establishes a fluid tight connection between lip seal and the outer surface 168 of the tube coupling portion 146. Furthermore, positioning the pins 202 in the entry regions 230 positions the end portion 160 of the tube coupling portion 146 against a non-fixed structure of the female connector 134 (i.e. the end portion 382 of the shuttle 310).

Next, the ring assembly 138 is rotated relative to the female connector 134 in a connecting direction to connect the male connector 132 to the female connector 134, to open the valve formed by the shuttle 310 and the overmolded seal 342, and to place the fluid channel 172 in fluid communication with the fluid channel 294. In particular, when the ring assembly 138 is rotated, the pins 202 enter the slide regions 232 (FIG. 17) of the grooves 224. The rotational force applied to the ring assembly 138 causes the male connector 132 to move axially toward the barbed coupling portion 220 as the pins 202 slide toward the seated regions 234 (FIG. 17).

The above-described axial movement of the male connector 132 causes the tube coupling portion 146 to move within the coupling channel 282 further towards the barbed coupling portion 220. During this movement, the tube coupling portion 146 pushes against the shuttle 310 and causes the shuttle to move towards the barbed coupling portion 220 against the force of the biasing member 312. As the shuttle 310 moves, the fluid tight seal between the flange 376 and the beveled valve seat 360 is broken as the flange moves away from the overmolded seal 342.

Feedback from Connectors when Mated

The ring assembly 138 is rotated relative to the female connector 134 in the connecting direction until the pins 202 become seated in the seat regions 234 of the grooves 224, as which point the male connector 132 is mated to the female connector 134 and the tube coupling portion 147 is engaged with the o-ring seal 300 and the lip seal 304. Accordingly, rotation of the ring assembly 138 compresses the biasing member 312 until the pins 202 are positioned at the knee regions 258 of the grooves 224. The compression of the biasing member 312 biases the male connector 132 away from the female connector 134.

As the pins are rotated past the knee regions 258, the biasing member 312 decompresses (and the fluid pressure, if fluid is supplied), pushes the male connector 132 away from barbed coupling portion 220 until the pins 202 are seated in the seated regions 234 and the male connector 132 is mated to the female connector 134. The biasing member 312 is aligned with the tube coupling portion 147 when mating feature 190 is mated with the mating feature 228. The movement of the male connector 132 away from the barbed coupling portion 220 is rapid and causes the coupler system 104 to emit a sound as the pins 202 are quickly snapped against the grooves 224. The sound is audible to most users a "click" or a "snap" that alerts the user that a connection has been established between the male connector 132 and the female connector 134. Additionally, when the pins 202 are snapped against the grooves 224 a vibration is felt by most users, as tactile feedback, to further alert the user that a connection has been established between the male connector 132 and the female connector 134.

Additionally, the o-ring seal 300 functions as a biasing member that is configured to bias the male connector 132 away from the female connector 134. In particular, as the tube coupling portion 146 is extended through the o-ring seal 300, friction between the outer surface 168 of the tube coupling 146 and the o-ring seal 300 causes at least a portion of the seal 300 to move slightly and to develop a biasing force in the direction of the end portion 218. The biasing force developed by the o-ring seal 300 contributes to causing the feedback that occurs when the male connector 132 is mated with the female connector 134. Furthermore, in embodiments of the female connector 134 that do not include the biasing member 312, the biasing force generated by the o-ring seal 300 generates the feedback described above.

The lip seal 304 also functions as a biasing member that is configured to bias the male connector 132 away from the female connector 134. In particular, as the tube coupling portion 146 is extended through the inner seal 324, the lip seal 304 develops a biasing force that tends to move the inner seal radially inward toward the axial center 286. When the biasing force acts upon the tube coupling portion 146, the force tends to move the male connector 132 away from the female connector 134. The biasing force developed by the lip seal 304 contributes to developing the feedback that occurs when the male connector 132 is mated with the female connector 134. Furthermore, in embodiments of the female connector 134 that do not include the biasing member 312, the biasing force generated by the lip seal 304 generates the feedback described above.

The grooved coupling portion 216 prevents the user from having to directly apply an axial force to move the shuttle 310 (i.e. open the valve). Instead, the grooves 224 offer the user a mechanical advantage, that reduces the force required to move shuttle 310 against the biasing force of the biasing member 312. Additionally, since the user is prevented from having to move the shuttle 310 with an axially directed force, a stiffer biasing member 312 is usable than would otherwise be suitable.

When the male connector 132 is mated with the female connector 134 the end portion 160 of the tube coupling portion 146 extends beyond the o-ring seal 300 and the lip seal 304 toward the ribbed coupling portion 220 and away from the threaded coupling portion 140.

Fluid Paths Through Shuttle and Shuttle Guide

As shown by the fluid flow path 630 of FIG. 33, when the connectors 132, 134 are connected the valve is opened and fluid is able to flow through the through the main ports 390 of the shuttle 310 past the seal surface 394 and the beveled valve seat 360. This flow of fluid in conjunction with the shape of the beveled valve seat 360 and the seal surface 394 removes any debris that may have collected on the beveled valve seat and the seal surface.

Next, the fluid takes one of two flow paths 634, 638. As shown by flow path 634, some fluid flows into the fluid passage 172 through the tube coupling portion 142. Some fluid, as shown by the flow path 638, flows though the auxiliary ports 388 and into the fluid channels 348 defined between the ribs 346 of the shuttle guide structure 308.

The fluid that flows into the fluid channels 348 flows into the cavity 336 defined by the lip seal 304. The fluid in the cavity 336 develops a pressure that biases the beveled portion 330 of the inner seal 324 against the outer surface 168 of tube coupling portion 146 to further establish a fluid tight and leak free connection between the male connector 132 and the female connector 134.

The fluid that takes the flow path 634 flows into the nozzle 102. When the valve 118 of the nozzle 102 is opened, the fluid exits the tip 122 of the nozzle. When the valve 118 of the nozzle 102 is closed, fluid is prevented from leaking at each junction of the system 100.

During usage of the nozzle 102, rotation of the ring assembly 138 in a disconnecting direction (opposite to the connecting direction) is prevented by the knee regions 258 of the grooves 224, such that undesired disconnection of the connectors 132, 134 is prevented. In particular, the knee regions 258 function as detents that prevent rotation of the coupling ring 184 in the disconnecting direction and hold the coupling ring in the connected position. The hold of the knee regions 258 is overcome by an increased rotational force that moves the male connector 132 toward barbed coupling portion 220 and compresses the biasing member 312 as the pins 202 slide on the knee regions 258 toward the slide regions 232.

When usage of the nozzle 102 is complete the user disconnects the nozzle from the hose 110 by disconnecting the male connector 132 from the female connector 134. Conveniently, during the disconnection process the hose 110 remains supplied with fluid. To begin, the ring assembly 138 is rotated in the disconnect direction which causes the pins 202 to move past the knee regions 258 and into the slide regions 232 (see FIG. 17). Continued rotation of the ring assembly 138 moves the male connector 132 away from the barbed coupling portion 220, which enables the biasing member 312 to bias the shuttle 310 against the beveled valve seat 360 and close the valve. When the valve is closed the supply of fluid from the female connector 134 is ceased. Further rotation of the ring assembly 138 positions the pins 202 in the entry regions 230, at which point the male connector 132 is moved away from the female connector 134 and the connectors are separated.

During the connection and disconnection processes the overmolded portions 186, 290, 468 offer some advantages. First, the overmolded portions 186, 290, 468 remain relatively cool to the touch when the system 100 has been left in the sun. Second, the overmolded portions 186, 290, 468 function as bumpers that prevent damage should the connectors 132, 134, 420 be dropped. Also, the overmolded portions 186, 290, 468 in some embodiments are provided in a particular color for the particular fluid that the connectors 132, 134, 420 are configured to channel. For example, in a cold water system the overmolded portions 186, 290, 468 are blue and in a hot water system the overmolded portions are red. Similarly, in a pneumatic system the overmolded portions 186, 290, 468 are a particular to distinguish from a liquid system. In a pneumatic system configured to channel oxygen, the overmolded portions 186, 290, 468 are green.

The fluid system 100 offers numerous other advantages. First, users can quickly and easily disconnect a fluid device, such as the nozzle 102, from the hose 100 without having to stop the flow of fluid through the hose at the sillcock 108, for example. This is convenient if the user is working at an extended from the sillcock. Second, the male connector 132, 420 and the female connector 134, 422 are quickly and easily connected and disconnected from each other. The ring assembly 138, 428 of the male connector 132, 420 is rotated less than a quarter turn to connect/disconnect the connectors 132, 134, 420, 422, thereby making the connectors easy to operate, even for users with dexterity issues. The male connector 132, 420 and the female connector 134, 422 offer a convenient approach for connecting a fluid conductor to the hose 110, without requiring the supply of fluid to the hose to be stopped.

As another advantage, when the male connector 132, 420 is connected to the female connector 134, 422 the body portion 136, 426 is rotatable relative to the coupling ring 184, 466, the female connector, and the hose 110 to reduce the tendency of the hose to develop bends and kinks during usage of the nozzle 102. Accordingly, when the male connector 132 is connected to the female connector and to the nozzle 102, the nozzle is rotatable relative to the hose 110.

Connected Coupler

As shown in FIG. 34, a nozzle assembly 650 includes a nozzle apparatus 654 and a male connector 658. The nozzle apparatus includes a body 662 and a valve 664. The body defines a fluid channel 668 therethrough. The valve 664 is shown in a closed position that prevents fluid flow through a tip 670 of the nozzle apparatus 654. The valve 664 is movable to an open position in response to movement of a handle 672 of the nozzle apparatus 654. The nozzle apparatus 654, is representative of any fluid device, such as water sprinklers, pneumatic devices, and any other fluid device as desired by those of ordinary skill in the art.

The male connector 658 extends from the nozzle apparatus 654 and includes a body portion 676 and a ring assembly 680. The body portion 676 is integrally formed with the body 662 of the nozzle apparatus, such that the body portion 676 and the body 662 are a monolithic part. The body portion 676 includes a tube coupling portion 682 and a plurality of pins 694 and defines a fluid channel 676 therethrough. The pins 694 are in a fixed relationship with the tube coupling portion 682. The tube coupling portion 682 is substantially identical to the tube coupling portion 146 of the male connector 132 (FIG. 3). The fluid channel 684 of the body portion 676 is fluidly coupled to the fluid channel 668 of the body 662. In another embodiment, the body portion 676 is permanently connected to the body 662.

The ring assembly 680 includes a coupling ring 686, an overmolded portion 688, and a mating feature 690. The coupling ring 686 is substantially cylindrical and extends about the body portion 676. The coupling ring 686 is integrally formed with the body 662 of the nozzle apparatus and the body portion 676, such that the coupling ring 686, the body portion 676, and the body 662 are a monolithic part. Accordingly, the coupling ring 686 is fixedly connected to the body portion 676 and, therefore, is rotatably fixed in position with respect to the body 662 and to the body portion 676. In another embodiment, the ring assembly 680 is permanently connected to the body 662.

The overmolded portion 688 is substantially identical to the overmolded portion 186 (FIG. 2). In another embodiment, the nozzle assembly 650 does not include the overmolded portion 686.

The mating feature 690 is formed on an internal surface 692 of the coupling ring 686 and includes a plurality of protuberances, provided as pins 694, encircling an inside of the coupling ring. The mating feature 690 can be in other forms such as monolithic or added components to the surface. In yet another embodiment, the surface 692 may be altered or modified to form the mating feature 690. The pins 694 extend through passages 696 formed in the coupling ring 686 and are fixedly connected to the coupling ring. The overmolded portion 688 covers one end of the pins 694.

Accordingly, the male connector 658 is configured to connect to the female connector 134, 422 in substantially the same way that the male connector 132 connects to the female connector 134, except that instead of rotating the coupling ring 686 relative to the body portion 676 and the female connector 134, 422 to engage the mating features 690, 288, 492, the entire nozzle assembly 650 (including the coupling ring 686) is rotated relative to the female connector 134, 422.

Figure 35:
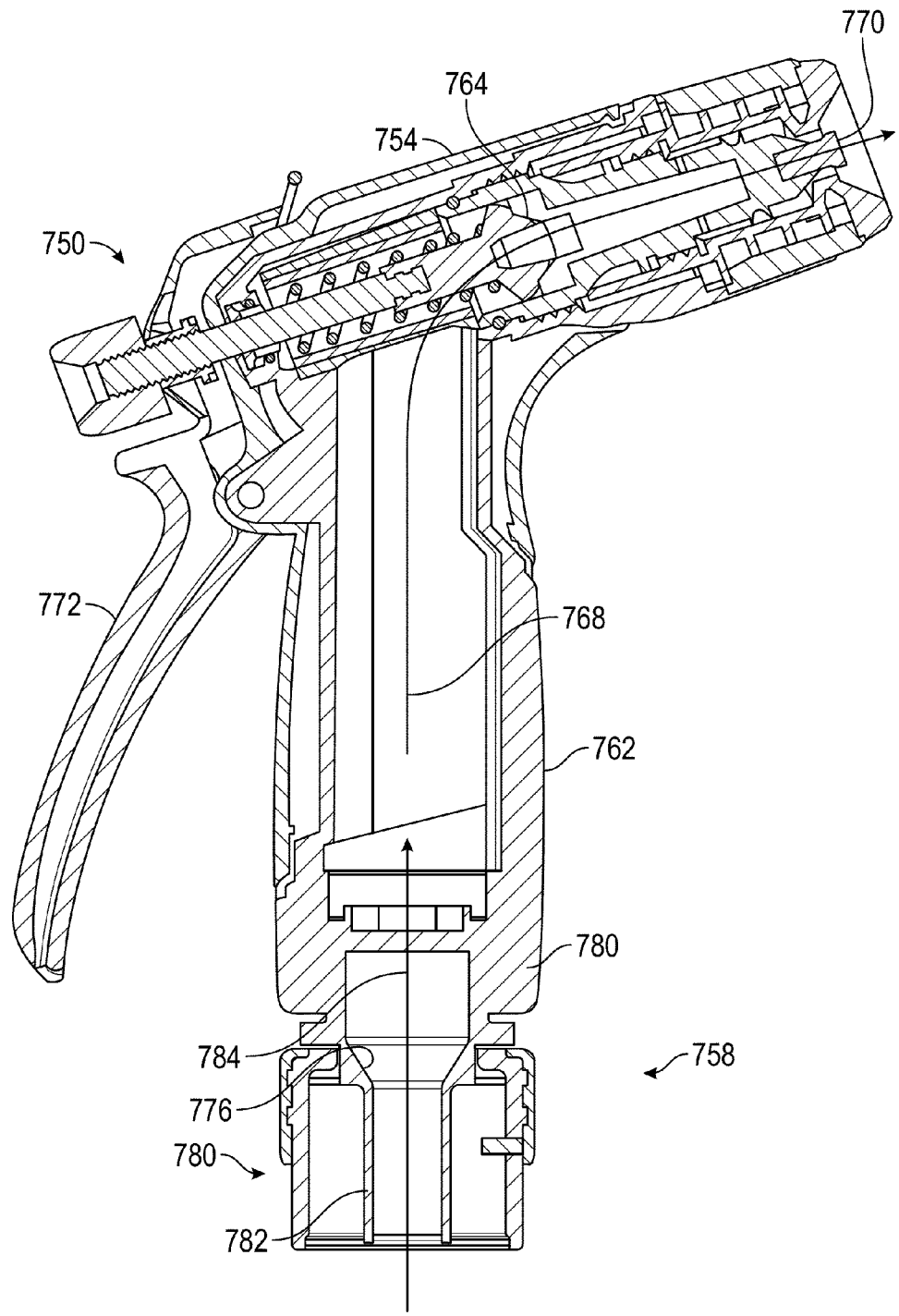
FIG. 35 is a cross sectional view of a nozzle apparatus including a male connector integrally formed therewith.

As shown in FIG. 35, another nozzle assembly 750 includes a nozzle apparatus 754 and a male connector 758. The nozzle apparatus includes a body 762 and a valve 764. The body 762 defines a fluid channel 768 therethrough. The valve 764 is shown in a closed position that prevents fluid flow through a tip 770 of the nozzle apparatus 754. The valve 764 is movable to an open position in response to movement of a handle 772 of the nozzle apparatus 754. The nozzle apparatus 754, is representative of any fluid device, such as sprinklers, pneumatic devices, and any other fluid device as desired by those of ordinary skill in the art.

The male connector 758 extends from the nozzle apparatus 754 and includes a body portion 776 and a ring assembly 780. The body portion 776 is substantially identical to the body portion 136 (FIG. 12) except that instead of including the threaded coupling portion 140, an end portion 780 of the body portion 776 is integrally formed with the body 762 of the nozzle apparatus 754, such that the body portion 776 and the body 762 are a monolithic part. The body portion 776 includes a tube coupling portion 782 and defines a fluid channel 776 therethrough. The tube coupling portion 782 is substantially identical to the tube coupling portion 146 of the male connector 132 (FIG. 12). The fluid channel 784 of the body portion 776 is fluidly coupled to the fluid channel 768 of the body 762. In another embodiment, the end portion 780 of the body portion 776 is permanently connected to the body 762.

The ring assembly 780 is identical to the ring assembly 138 (FIG. 12) and, therefore, is configured for rotation relative to the body portion 776 and the nozzle apparatus 754. Accordingly, the male connector 758 is configured to connect to the female connector 134, 422 in the same way that the male connector 132 connects to the female connector 134.

Flow Control

Figure 36:
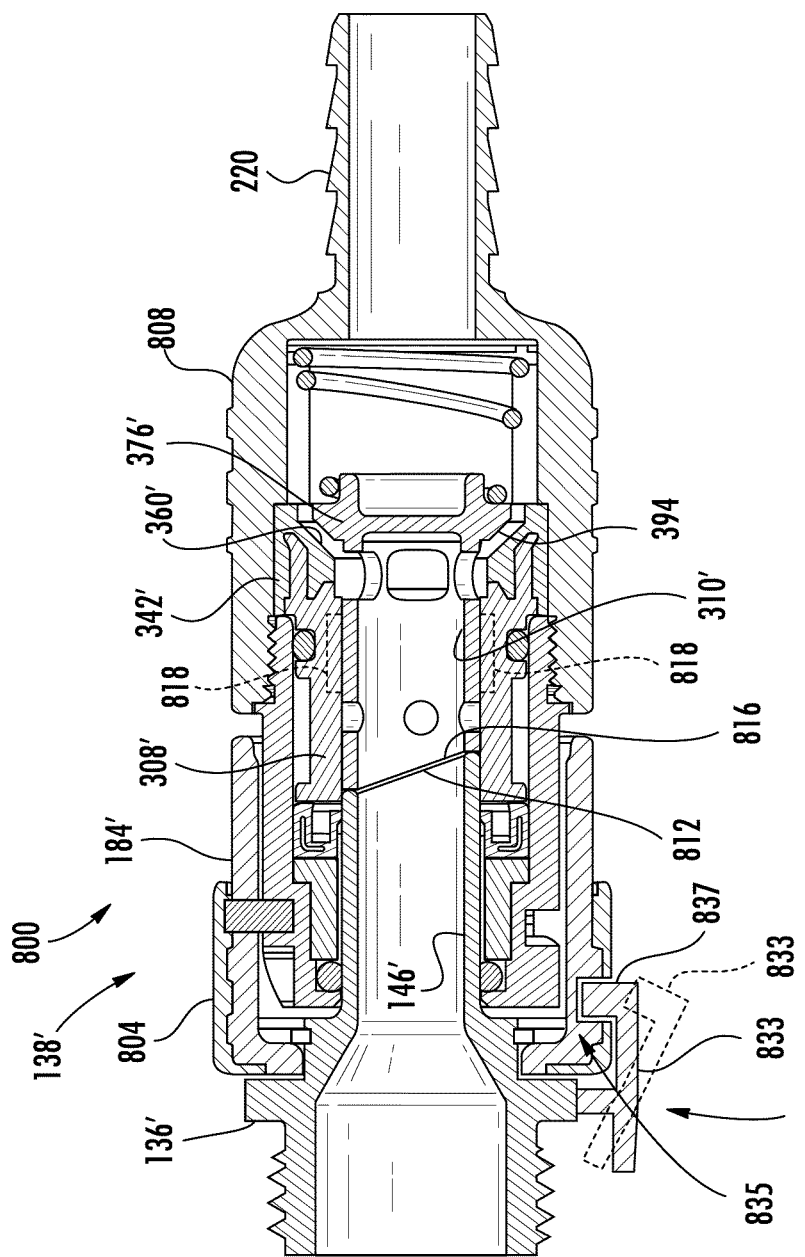
FIG. 36 is a cross sectional view of another embodiment of the first coupler system that is configured for flow control, the coupler system is shown in a position of low flow.
Figure 37:
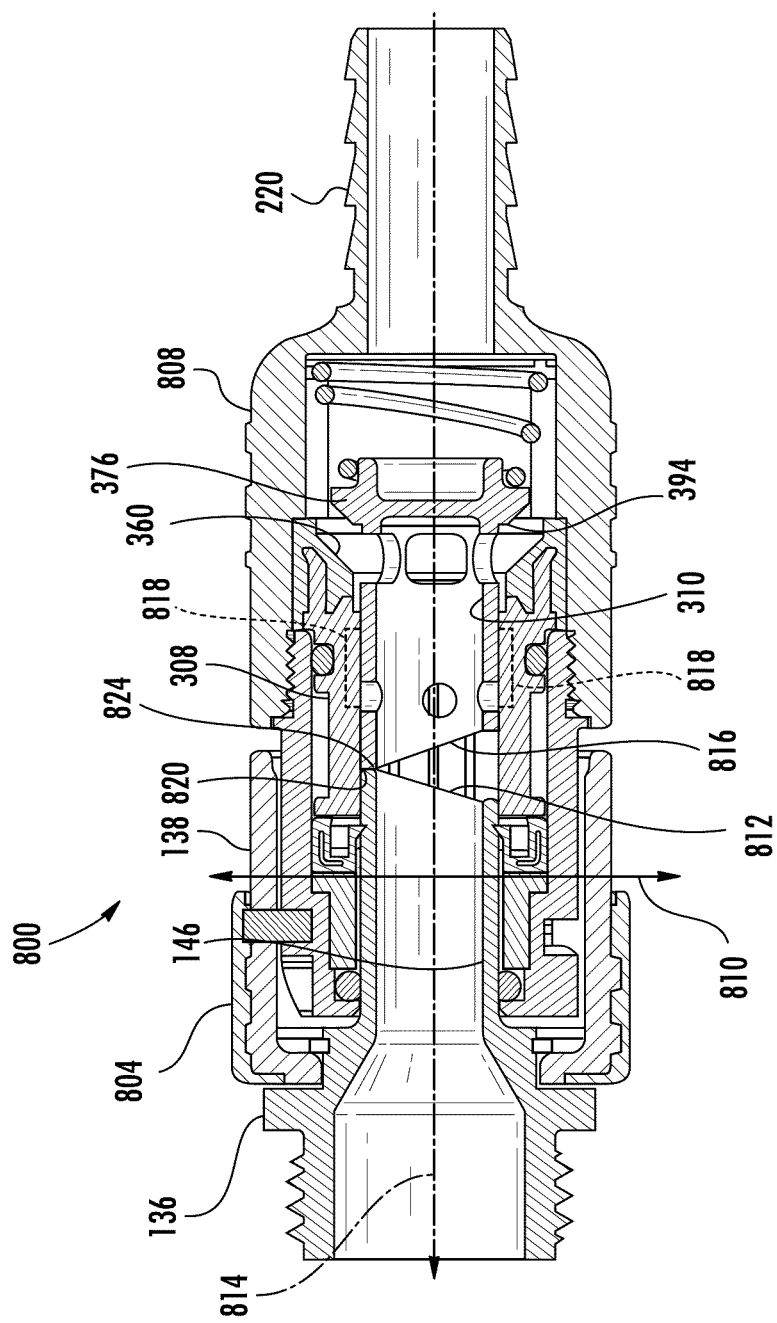
FIG. 37 is a cross sectional view the coupler system of FIG. 36 shown in a position of high flow.

As shown in FIGS. 36 and 37, in another embodiment a coupling system 800 is modified to enable flow control of the fluid through the coupling system 800 by controlling the axial position of the shuttle 310' relative to the shuttle guide structure 308'. The coupling system 800 includes a male connector 804 and a female connector 808. The male connector 804 is configured to control the shuttle 310' to each of a plurality of flow positions by positioning the tube coupling portion 146' in a respective one of a plurality of flow control positions. As described below, the tube coupling portion 146' is lockable in each of the plurality of flow control positions.

In one embodiment, the male connector 804 is identical to the male connector 132 except that the connector 804 includes an angled end portion 812 formed on the tube coupling portion 146'. The angled end portion 812 defines an angle other than zero degrees with respect to a plane 810 perpendicular to the center axis 814 of the tube coupling portion 146'. In one exemplary embodiment, the angle of the angled end portion 812 is approximately sixty degrees. In another embodiment, however, the angle of the angled end portion 812 is an angle having a magnitude between twenty and eighty degrees. In another embodiment, the angle is any magnitude and can be adjusted or modified for fluid control.

Figure 21:
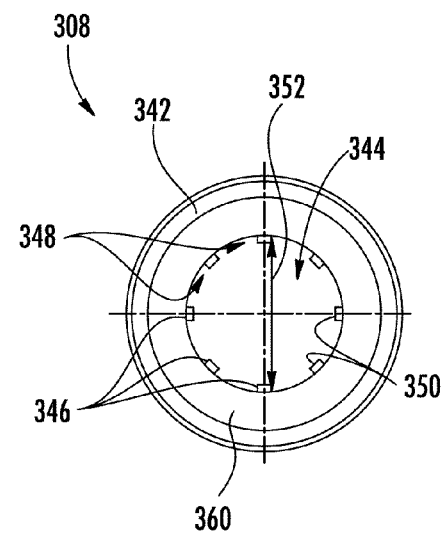
FIG. 21 is a front elevational view of the shuttle guide structure of FIG. 20.

The female connector 808 is identical to the female connector 134 except that the connector 808 includes a correspondingly angled end portion 816 formed on the shuttle 310'. The angled end portion 816 defines an angle other than zero degrees with respect to the plane 810. In one example, the angled end portion 816 is angled to be supplemental to the angled end portion 812. Accordingly, in an embodiment in which the angle of the angled end portion 812 is approximately sixty degrees, the angle of the angled end portion 816 is approximately one hundred twenty degrees. Additionally, in this embodiment the shuttle 310' is prevented from rotating relative to the shuttle guide structure 308. In particular, the shuttle 310' includes fins 818 (shown in phantom) that are positioned in the fluid channels 348 (FIG. 21) defined by the ribs 346 (FIG. 21). The fins 818 are configured to abut the ribs 346 to prevent rotation of the shuttle 310'. The contact surfaces of the end portions 812 and 816 can be face to face, face to point, point to point, face to edge, edge to edge or combination thereof.

As shown in FIG. 36, the connectors 804, 808 are shown in a connected position and the valve defined by the flange 376' and the overmolded seal 342' is open. In particular, the angled end portion 812 is substantially entirely positioned against the angled end portion 816, such that the angled end portion 812 engages the angled end portion 816. This configuration is referred to as a low flow configuration.

The body portion 136' of the male connector 804 is rotatable relative to the rotating ring assembly 138 and the female connector 808 (including the shuttle 310) to a plurality of rotational orientations configured to set the flow rate of fluid that passes through the valve defined by the flange 376' and the overmolded seal 342'. Each of the plurality of rotational orientations is a respective one of the plurality of flow control positions. As shown in FIG. 37, the body portion 136' has been rotated approximately one hundred eighty degrees to a position of high flow. Rotation of the body portion 136' has caused to angled end portion 812 to interact with the angled end portion 816 and to push the shuttle 310' further towards barbed coupling portion 220, such that less of the angled end portion 812 contacts the angled end portion 816. In particular, in the illustrated example only a tip portion 820 of the angled end portion 812 and a tip portion 824 of the angled end portion 816 are in contact and the rest of the angled end portions 812, 816 are spaced apart.

The movement of the shuttle 310' increases the distance between the flange 376' and the overmolded seal 342' and enables more fluid to flow therebetween. Accordingly, rotation of the body portion 136' causes the angled end portion 812 of the tube coupling portion 146' to move the shuttle 310' between a low flow position and a high position by changing the distance that the flange 376' is spaced part from beveled valve seat 360' of the overmolded seal 342'. The body portion 136' is rotatable to any position between those positions shown in FIGS. 47 and 48 to supply an intermediary flow of fluid that is greater than the low flow and less than the high flow. In one embodiment, the body portion 136' is rotated by rotating the nozzle 102 (FIG. 10) connected thereto relative to the ring assembly 138' and the female connector 808.

In some embodiments, the male connector 804 includes a locking member provided as a locking assembly 831. The locking assembly 831 is configured to fix the rotational position of the body portion 136' relative to the rotating ring assembly 138' and to lock the tube coupling portion 146' in a selected flow control position.

The locking assembly 831 includes a shaft 833 and a plurality of notches 835 (one of which is shown in FIG. 36). The shaft 833 extends from the body portion 136'. The shaft 833 is terminated with a detent 837. The plurality of notches 835 are formed in the coupling ring 184' of the ring assembly 138' and are sized to receive the detent 837.

The shaft 833 is configured to be movable between an unlocked condition (shown in phantom in FIG. 36) and a locked condition (shown in solid line in FIG. 36). In the unlocked condition the detent 837 is spaced apart from the notches 835 such that the body portion 136, including the tube coupling portion 146, is rotatable with respect to the ring assembly 138. In the locked condition the detent 837 is positioned in one of the notches 835 such that the body portion 136, including the tube coupling portion 146, is not rotatable with respect to the ring assembly 138. In one particular embodiment, the locking assembly 831 is fixedly connected to the tube coupling portion 146.

Figure 38:
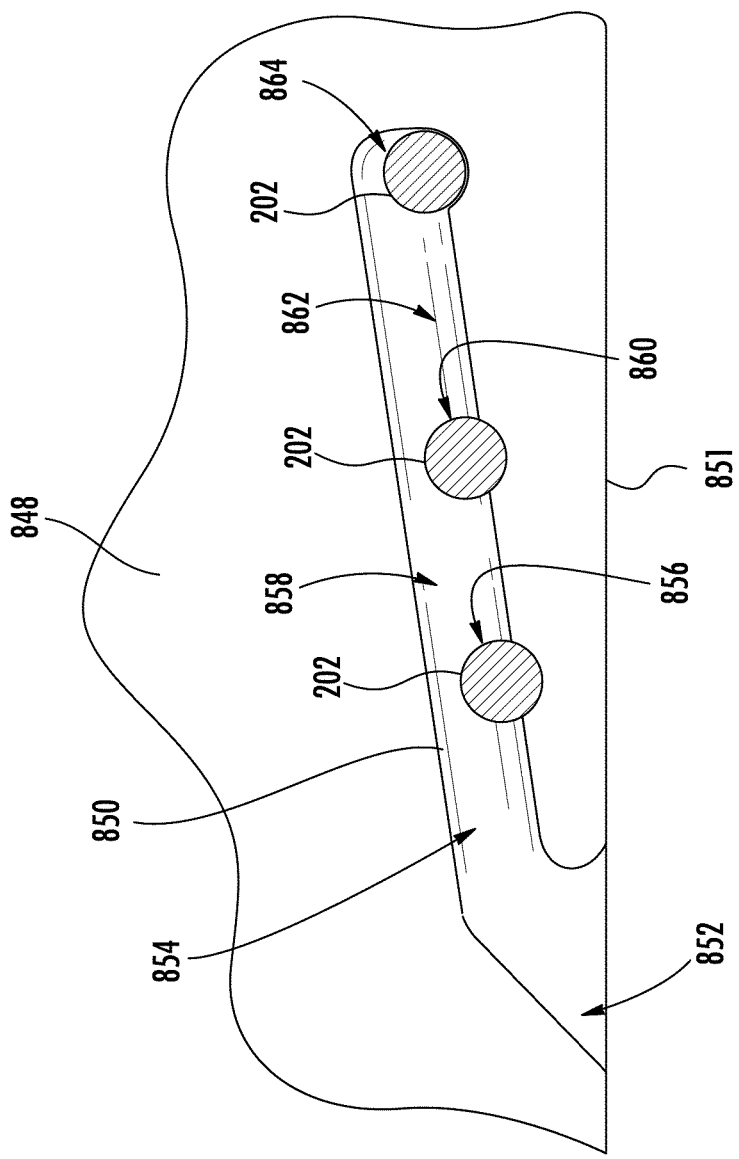
FIG. 38 is an elevational view of a portion of the female connector of FIG. 15 showing an alternative embodiment of the groove that is configured for flow control.

As shown in FIG. 38, another embodiment of a female connector 848 (partially shown) enables flow control of the fluid through the connector by controlling the axial position of the shuttle 310 relative to the shuttle guide structure 308 to each of a plurality of flow positions. To this end, an alternative embodiment of a groove 850 formed at an end portion 851 of the female connector 848 is shown that provides fluid flow control. The groove 850 includes an entry region 852, a first slide region 854, a first seated region 856 extending from the first slide region toward the end portion 851, a second slide region 858, a second seated region 860 extending from the second slide region toward the end portion 851, a third slide region 862, and a third seated region 864 extending from the third slide region toward the end portion 851.

The pins 202 are positionable in a selected one of the seated regions 856, 860, 864, which controls the axial distance that the flange 376 is spaced apart from the beveled valve seat 360 of the overmolded seal 342. Positioning the pins 202 in the seated regions 856 locks the tube coupling portion 146 in a flow control position that provides a low fluid flow by separating the flange 376 from the beveled valve seat 360 by a short axial distance. Positioning the pins 202 in the seated regions 860 locks the tube coupling portion 146 in a flow control position that provides an intermediary fluid flow by separating the flange 376 from the beveled valve seat 360 by a greater axial distance. Positioning the pins 202 in the seated regions 864 locks the tube coupling portion 146 in a flow control position that provides a high fluid flow by moving the flange 376 an even greater axial distance from the beveled valve seat 360.

Expansion Chamber

Figure 39A:
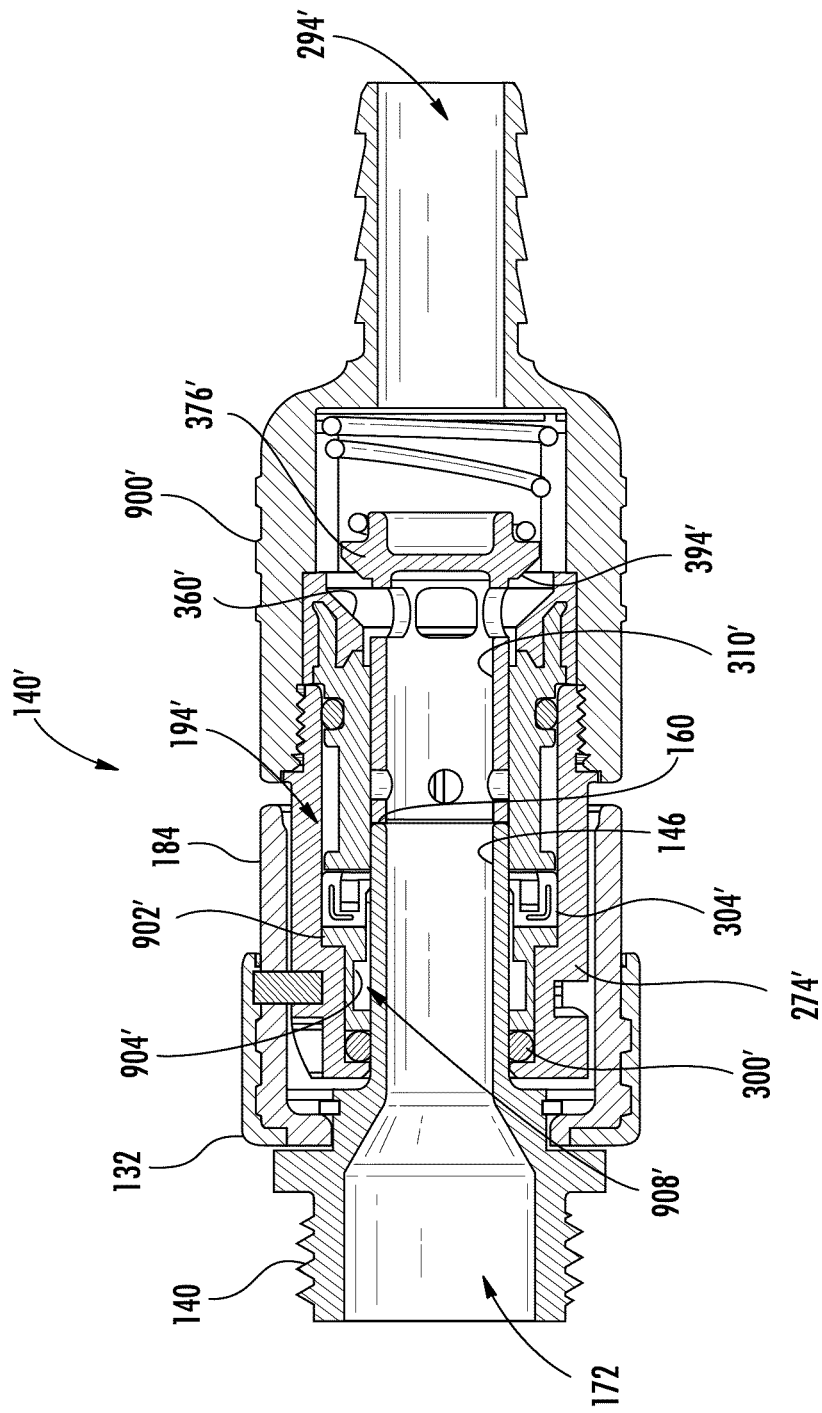
FIG. 39A is a cross sectional view of another embodiment of the first coupler system that includes an expansion chamber for relieving fluid pressure.

As shown in FIG. 39A, a coupler system 104' includes the male connector 132 and a female connector 900' that is substantially identical to the female connector 134, except that the female connector 900' includes a spacer structure 902' having a groove structure 904'. The groove structure 904' defines an annular expansion area referred to herein as an expansion chamber 908'. The expansion chamber 908' is an annular void that is positioned around the tube coupling portion 146. The expansion chamber 908' is positioned between the o-ring seal 300' and the lip seal 304'. In another embodiment, the expansion chamber 908' is formed internally, externally, wholly around, or partially around the tube coupling portion 146. Although one expansion chamber 908' is illustrated, the connector 134 may include multiple expansion chambers 908', depending on the desired applications.

In use, the expansion chamber 908' prevents fluid from exiting the cavity 194' defined by the coupling ring 184 when the male connector 132 is disconnected from the female connector 900'. In one exemplary embodiment, fluid and pressurized air are carried through the fluid channels 172, 294'. When disconnection of the connectors 132, 900' is desired, the male connector 132 is moved away from the female connector 900'.

As the male connector 132 is moved away from the female connector 900' the shuttle 310' remains biased against the end portion 160 until the seal surface 394' is seated against the beveled valve seat 360' and the valve is closed. Closing of the valve isolates the fluid channel 172 (which extends from the left side (in FIG. 39A) of the beveled valve seat 360' toward the threaded coupling portion 140) from the fluid and pressurized air carried by the fluid channel 294'. However, the fluid channel, in some configurations, may still contain pressurized fluid and air. When the end portion 160 is positioned to the right (in FIG. 39A) of the lip seal 304' the expansion chamber 908' is isolated from the fluid channel 172.

Continued movement of the male connector 132 away from the female connector 134 positioned the end portion to the left (in FIG. 39A) of the lip seal 304', but still within the female connector 134. At this point the expansion chamber 908' is fluid coupled to the fluid channel 172. When the expansion chamber 908' becomes fluidly coupled to the fluid channel 172, the pressurized fluid and air in the fluid channel expands into the expansion chamber, resulting in an overall lower air pressure within the fluid channel 172. The reduced pressure within the fluid channel 172 serves to prevent air and/or fluid from evacuating the cavity 194' when the male connector 132 is separated from the female connector 900'.

As shown in FIGS. 52B and 52C, a coupler system 104" includes a male connector 132" and a female connector 900". The male connector 132" includes a coupling ring 184" similar to the coupling ring 184 and a tube coupling portion 146" similar to the tube coupling portion 146. The coupling ring 184" defines a cavity 194".

The female connector 900" includes a left body portion 910" that is similar to the left body portion 274 and a right body portion 912" that is similar to the right body portion 278. The left body portion 910" defines a coupling channel 916" and includes a groove structure 904" positioned between an o-ring seal 920" and a lip seal 924". The o-ring seal 920" is positioned in a well 926" defined by the left body portion 910".

Figure 39B:
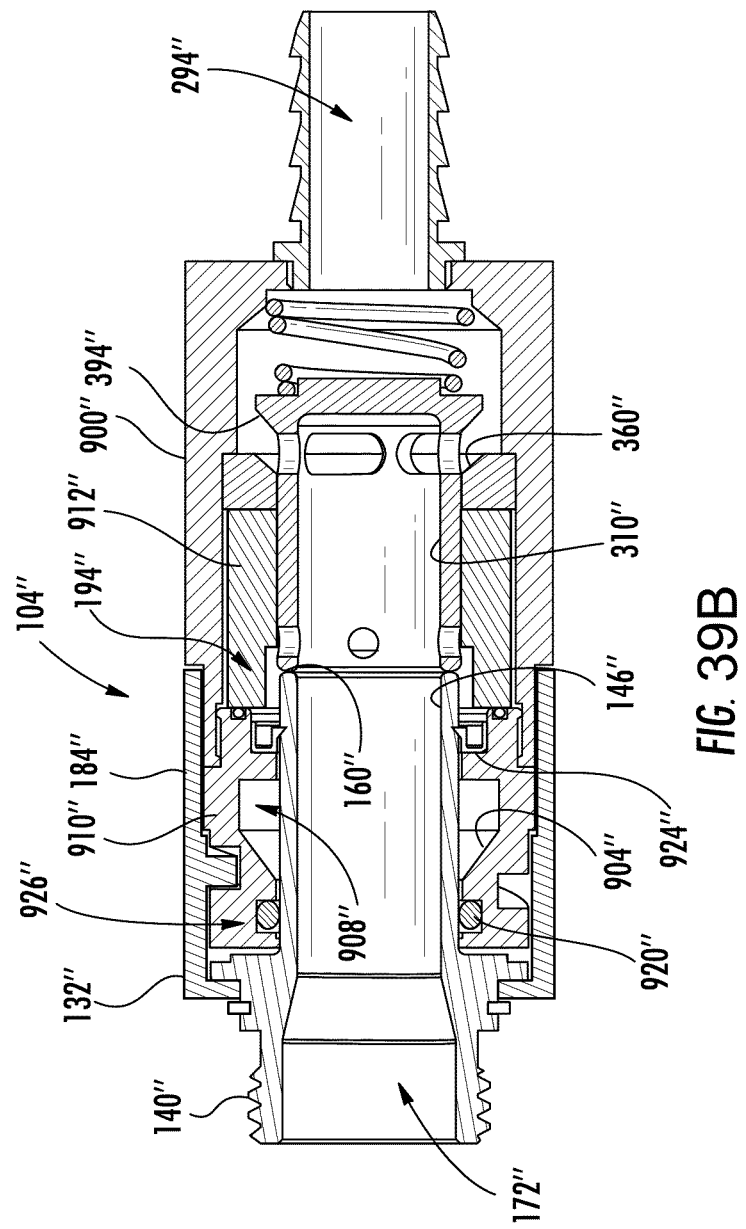
FIG. 39B is a cross sectional view of yet another embodiment of the first coupler system that includes an expansion chamber for relieving fluid pressure showing a male connector connected to a female connector.

The groove structure 904" defines an annular expansion area referred to herein as an expansion chamber 908". The expansion chamber 908" is a substantially annular void that is positioned around the tube coupling portion 146", as shown in FIG. 39B. The expansion chamber 908" is positioned between the o-ring seal 920" and the lip seal 924".

In use, the expansion chamber 908" prevents fluid from exiting the cavity 194" defined by the coupling ring 184" when the male connector 132" is disconnected from the female connector 900". In one exemplary embodiment, fluid and pressurized air are carried through the fluid channels 172", 294". When disconnection of the connectors 132", 900" is desired, the male connector 132" is moved away from the female connector 900".

Figure 39C:
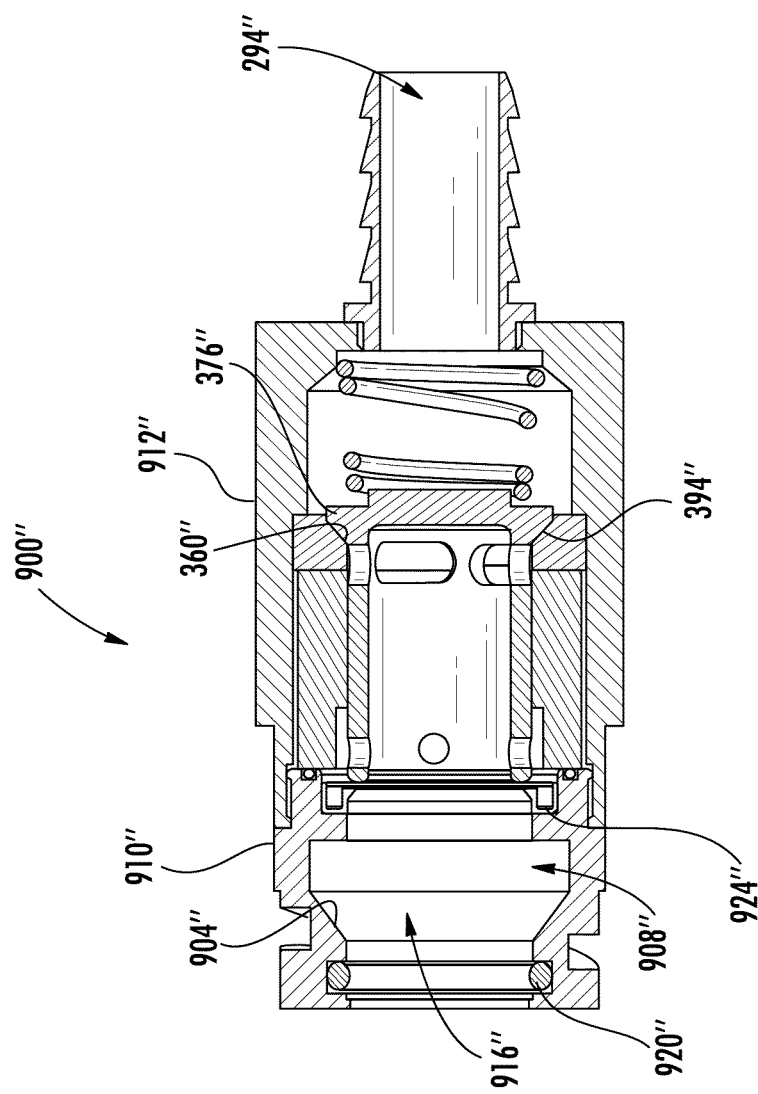
FIG. 39C is a cross sectional view of the female connector of FIG. 39B.

As the male connector 132" is moved away from the female connector 900" the shuttle 310" remains biased against the end portion 160" until the seal surface 394" is seated against the beveled valve seat 360" and the valve is closed. Closing of the valve isolates the fluid channel 172" (which extends from the left side (in FIGS. 39B and 39C) of the beveled valve seat 360" toward the threaded coupling portion 140") from the fluid and pressurized air carried by the fluid channel 294". However, the fluid channel, in some configurations, may still contain pressurized fluid and air. When the end portion 160" is positioned to the right (in FIGS. 39B and 39C) of the lip seal 304" the expansion chamber 908" is isolated from the fluid channel 172".

Continued movement of the male connector 132" away from the female connector 134" positioned the end portion to the left (in FIGS. 39B and 39C) of the lip seal 304", but still within the female connector 134". At this point the expansion chamber 908" is fluid coupled to the fluid channel 172". When the expansion chamber 908" becomes fluidly coupled to the fluid channel 172", the pressurized fluid and air in the fluid channel expands into the expansion chamber, resulting in an overall lower air pressure within the fluid channel 172". The reduced pressure within the fluid channel 172" serves to prevent air and/or fluid from evacuating the cavity 194" when the male connector 132" is separated from the female connector 900".

Adapter Apparatus

As shown in FIG. 40, a first block 954, a second block 958, a third block 962, and a fourth block 966 define a fluid channel 970 therethrough and used to describe various embodiments of an adapter apparatus. In a first embodiment, block 954 represents the female connector 134, block 958 represents the male connector 132, block 962 represents the male connector 132, and block 966 represents another female connector 134. Accordingly, in this embodiment the adapter apparatus 974 includes blocks 958 and 962 and is a male-male adapter that is used to connect the female connectors 134 of blocks 954 and 966.

In another embodiment, block 954 represents the male connector 132, block 958 represents the female connector 134, block 962 represents the female connector 134, and block 966 represents another male connector 132. Accordingly, in this embodiment the adapter apparatus 978 includes blocks 958 and 962 and is a female-female adapter that is used to connect the male connectors 132 of blocks 954 and 966.

In yet another embodiment, block 954 represents a fluid device such as the nozzle 102, block 958 represents the male connector 132 connected to the nozzle 102, block 962 represents the female connector 134, and block 966 represents any other type of connector, including propriety connectors, as desired by those of ordinary skill in the art. Accordingly, in this embodiment the adapter apparatus 982 includes blocks 962 and 966 and is referred to as a female-propriety adapter.

In a further embodiment, block 954 represents a fluid device such as the nozzle 102, block 958 represents the female connector 134 connected to the nozzle 102, block 962 represents the male connector 132, and block 966 represents any other type of connector, including propriety connectors, as desired by those of ordinary skill in the art. Accordingly, in this embodiment the adapter apparatus 986 includes blocks 962 and 966 and is referred to as a male-propriety adapter.

When the adapter apparatus 974, 978, 982, 986 is in use, block 954 is fluidly coupled to block 966 as shown by the fluid channel 970.

Filler Apparatus

Figure 41:
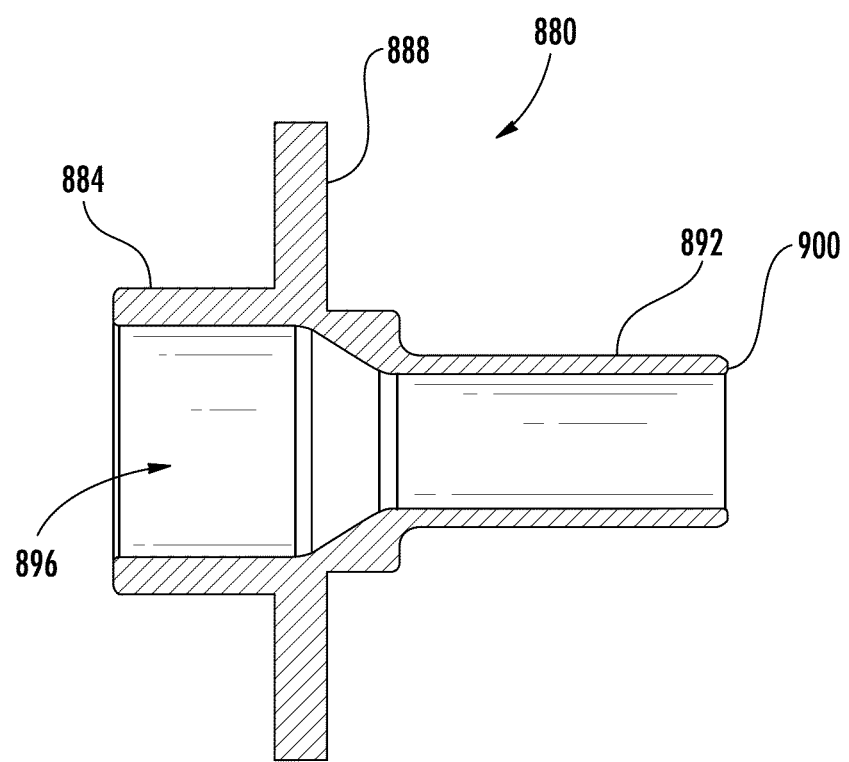
FIG. 41 is a cross sectional view of a filling apparatus for use with the female connector of FIG. 15.

As shown in FIG. 41, the system 100 is configured to function with a filler apparatus 880. The filler apparatus 880 includes an outlet 884, a grip member 888, and a tube coupling portion 892 that is identical to the tube coupling portion 146. A fluid passage 896 is defined through the tube coupling portion 892 to the outlet 884. The adapter 880 is formed from brass, aluminum, stainless steel, or any other suitable material, as desired by those of ordinary skill in the art.

In use, the tube coupling portion 892 is inserted into the female connector 134 until an end portion 900 of the tube coupling portion 892 contacts the shuttle 310. Then pressure is applied to grip member 888 to move the shuttle 310 toward the barbed coupling portion 220, thereby opening valve defined by the flange 376 and the overmolded seal 342. When the valve is open, fluid flows through the fluid passage 896 and out of the outlet 884.

The apparatus 880 is useful, for example, to extract fluid from the female connector 134 without connecting the male connector 132 thereto.

Other Embodiments

In another embodiment, the internal assembly 276 is combined into a single component. For example with reference to FIG. 18, the o-ring seal 300, the spacer 302, the lip seal 304, the shuttle guide structure 308, and the o-ring seal 306 are formed as a single component using at least a one stage molding process. In an exemplary multi stage molding process the o-ring seal 300, the lip seal 304, and the o-ring seal 306 are formed from a first material and the spacer 302 and the shuttle guide structure 308 are formed form a second material. The first material is then permanently connected to the second material to form the single component. During assembly is this embodiment, the single component is inserted into the left body portion 274 in a single step to save time and effort during assembly of the female component 134.

In another embodiment of the coupler system 106, the male connector 420 includes a latch assembly (not shown) that is configured to latch to the female connector 422 to further connect the male connector 420 to the female connector 422. The latch assembly is movable between a latched configuration and an unlatched configuration. In the latched configuration, the latch assembly is oriented in an over center position.

In yet another embodiment of the coupler system 104, 106, the grooved coupling portion 216, 494 is formed on an interior of the coupling ring 184, 466 and the pins 282, 484 extend radially outward from the left body portion of the female connector 134, 422. This embodiment of the coupler system 104, 106 operates substantially the same as the exemplary embodiment illustrated in FIG. 10.

As illustrated in FIG. 10, the hose 110 is terminated with a male connector 132 and a female connector 420. In another embodiment, the hose 110 is terminated with two of the male connectors 134 or two of the female connectors 420.

In another embodiment, the pins 202 are retractable and positionable directly in the seated regions 234 without traversing the slide regions 232.

In yet another embodiment of the coupler system 104, 106, the male connector 132, 420 includes a magnetic connection system (not shown) that is configured to connect the female connector 134, 422 to the male connector 420. The magnetic connection system includes a first magnetic element (not shown) associated with the male connector 132, 420 and a second magnetic element (not shown) associated with the female connector 134, 422. The magnetic elements are magnetically attracted to each other to connect the male connector 132, 420 to the female connector 134, 422. In one particular embodiment, the magnetic elements include correlated magnets (also referred to as programmed magnets).

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A quick connect/disconnect system comprising:
a male connector including:
a first body defining a first fluid channel therethrough, the first body having a first coupling portion at a first end portion and a male protrusion fixed relative to the first body at a second end portion; and
a first rotating ring assembly rotatably connected to the first body, the first rotating ring assembly extending about the second end portion and including a first mating feature on an internal surface of the rotating ring assembly;
a female connector including:
a third end portion defining a third coupling portion with a second fluid channel
a fourth end portion defining a fourth coupling portion configured to couple with the fixed male protrusion;
a second mating feature on an external surface of the fourth end portion configured to rotatably engage the first mating feature, such that when the fourth coupling portion is coupled with the fixed male protrusion and the second mating feature is rotatably mated with the first mating feature, the first fluid channel is in fluid communication with the second fluid channel;
a first coupling channel within the fourth end portion including a mouth configured to receive the fixed male protrusion and a lip seal recess spaced axially from the mouth, the first coupling channel extending from the mouth toward a seat portion;
a shuttle movable within the first coupling channel and including a flange configured to form a seal with the seat portion, and an extending portion extending within the first coupling channel;
a lip seal received within the lip seal recess between the shuttle and the mouth and including an outer seal received in the lip seal recess and an inner seal arranged to sealingly engage the male protrusion; and
a biasing member configured to bias the flange into sealing contact with the seat portion, wherein the fixed male protrusion and the extending portion are sized such that rotation of the first rotating ring assembly in a first direction while the first mating feature and the second mating feature are engaged forces the fixed male protrusion to move axially into contact with the extending portion thereby moving the shuttle to force the flange away from the seat portion.

2. The system of claim 1, wherein the first mating feature and the second mating feature are configured such that rotation of the first rotating ring assembly while the first mating feature and the second mating feature are engaged forces the first connecting member to move axially with respect to the second connecting member.

3. The system of claim 2, wherein:
the first mating feature is a protuberance; and
the second mating feature is a helical slot.

4. The system of claim 1, wherein the female connector further comprises:
a first resilient seal member extending about the first coupling channel;
a second resilient seal member extending about the first coupling channel; and
a spacer extending about the first coupling channel and located between the first resilient seal member and the second resilient seal member.

5. The system of claim 1, wherein the female connector further includes an o-ring seal positioned between the mouth and the lip seal and arranged to sealingly engage the male protrusion.

6. The system of claim 1, wherein the lip seal defines a "U" shaped profile.

7. The system of claim 1, wherein the inner seal includes a beveled edge.

8. A leakfree system comprising:
a male connector including:
a first body defining a first fluid channel therethrough, the first body having a first coupling portion at a first end portion and a male protrusion fixed relative to the first body at a second end portion;
a first rotating ring assembly rotatably connected to the first body, the first rotating ring assembly extending about the second end portion and including a first mating feature on an internal surface of the rotating ring assembly; and a female connector including:
  a third end portion defining a third coupling portion with a second fluid channel;
  a fourth end portion defining a fourth coupling portion configured to couple with the fixed male protrusion;
  a second mating feature on an external surface of the fourth end portion configured to rotatably engage the first mating feature, such that when the fourth coupling portion is coupled with the fixed male protrusion and the second mating feature is rotatably mated with the first mating feature, the first fluid channel is in fluid communication with the second fluid channel;
  a seat portion;
  a movable shuttle configured to form a seal with the seat portion;
  a lip seal received in a lip seal recess formed in the second fluid channel of the female connector between the movable shuttle and the fourth end portion and including an outer seal received in the lip seal recess, and an inner seal arranged to sealingly engage the male protrusion; and
  a biasing member configured to bias the shuttle into sealing contact with the seat portion, wherein rotation of the first rotating ring assembly in a first direction while the first mating feature and the second mating feature are engaged forces the fixed male protrusion to move axially into contact with the shuttle to move the shuttle away from the seat portion.

9. The leakfree system of claim 8, further comprising:
a first connecting assembly having a first seal member;
a second connecting assembly having a second seal member and the first connecting assembly being coupled to the second connecting assembly; and
a fluid device connected to one of the group consisting of the first and second connecting assemblies.

10. The leakfree system of claim 8, wherein the female connector further includes an o-ring seal positioned between the fourth end portion and the lip seal and arranged to sealingly engage the male protrusion.

11. The leakfree system of claim 10, wherein the female connector further includes a spacer positioned between the o-ring seal and the lip seal and arranged to maintain the lip seal in position relative to the fourth end portion.

12. The leakfree system of claim 8, wherein the lip seal defines a "U" shaped profile.

13. The system of claim 12, wherein the female connector further includes a spacer positioned between the o-ring seal and the lip seal and arranged to maintain the lip seal in position relative to the mouth.

14. The leakfree system of claim 8, wherein the inner seal includes a beveled edge.

* * * * *